United States Patent
Koyama et al.

(10) Patent No.: US 7,542,089 B2
(45) Date of Patent: Jun. 2, 2009

(54) CAMERA WITH OPTICAL AXIS BENDING OPTICAL SYSTEM

(75) Inventors: Takashi Koyama, Akiruno (JP); Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 591 days.

(21) Appl. No.: 11/447,957

(22) Filed: Jun. 7, 2006

(65) Prior Publication Data

US 2006/0262214 A1  Nov. 23, 2006

Related U.S. Application Data

(62) Division of application No. 10/086,196, filed on Mar. 1, 2002, now Pat. No. 7,079,185.

(30) Foreign Application Priority Data

| Mar. 2, 2001 | (JP) | 2001-058910 |
| Mar. 2, 2001 | (JP) | 2001-058911 |
| Mar. 2, 2001 | (JP) | 2001-058912 |
| Mar. 5, 2001 | (JP) | 2001-060499 |
| Mar. 5, 2001 | (JP) | 2001-060500 |
| Apr. 23, 2001 | (JP) | 2001-124612 |
| Apr. 23, 2001 | (JP) | 2001-124613 |
| May 29, 2001 | (JP) | 2001-160869 |
| May 29, 2001 | (JP) | 2001-160870 |

(51) Int. Cl.
*H04N 5/225* (2006.01)
*H04N 5/232* (2006.01)

(52) U.S. Cl. .................. 348/335; 348/345

(58) Field of Classification Search ............. 348/344; 396/272, 385, 376
See application file for complete search history.

(56) References Cited

U.S. PATENT DOCUMENTS 4,037,238 A * 7/1977 Leitz et al. ............ 396/351

(Continued)

FOREIGN PATENT DOCUMENTS

JP  09-116796  5/1997

(Continued)

*Primary Examiner*—David L Ometz
*Assistant Examiner*—Luong T Nguyen
(74) *Attorney, Agent, or Firm*—Pillsbury Winthrop Shaw Pittman, LLP

(57) ABSTRACT

A camera includes a first lens unit on which a light beam is incident from a subject, a reflective mirror for reflecting the light beam through the first lens unit, in a direction substantially perpendicular to the optical axis of the first lens unit, a first diaphragm member arranged on a surface of a lens of the first lens unit closest to the reflective mirror with the surface of the lens facing the reflective mirror, and which blocks unwanted rays of light other than the light beam that forms the image of the subject, a second lens unit on which the light beam reflected from the reflective mirror is incident, a second diaphragm member arranged between the first lens unit and the second lens unit blocks unwanted rays of light that travel outside the outermost periphery at which the light beam traveling from the first lens unit to the reflective member intersects the light beam traveling from the reflective mirror to the second lens unit, and an unwanted ray-of-light reflection prevention member arranged on the reflective mirror to prevent rays of light from being reflected from a region thereof other than the region thereof on which the light beam forming the subject image is incident.

6 Claims, 32 Drawing Sheets

U.S. PATENT DOCUMENTS

| | | | |
|---|---|---|---|
| 5,448,319 A * | 9/1995 | Iuzawa | 396/419 |
| 5,933,186 A | 8/1999 | Ikari et al. | |
| 6,008,845 A | 12/1999 | Ohyoshi | |
| 6,041,195 A | 3/2000 | Honda et al. | |
| 6,809,772 B1 * | 10/2004 | Motta et al. | 348/344 |
| 6,829,011 B1 | 12/2004 | Higuchi et al. | |
| 6,970,201 B1 * | 11/2005 | Neil | 348/335 |
| 2002/0067426 A1 | 6/2002 | Nagata et al. | |
| 2004/0080656 A1 * | 4/2004 | Higuchi et al. | 348/335 |

FOREIGN PATENT DOCUMENTS

| | | |
|---|---|---|
| JP | 09-163206 | 6/1997 |
| JP | 09-281578 | 10/1997 |
| JP | 10-336496 | 12/1998 |
| JP | 11-196303 | 7/1999 |

* cited by examiner

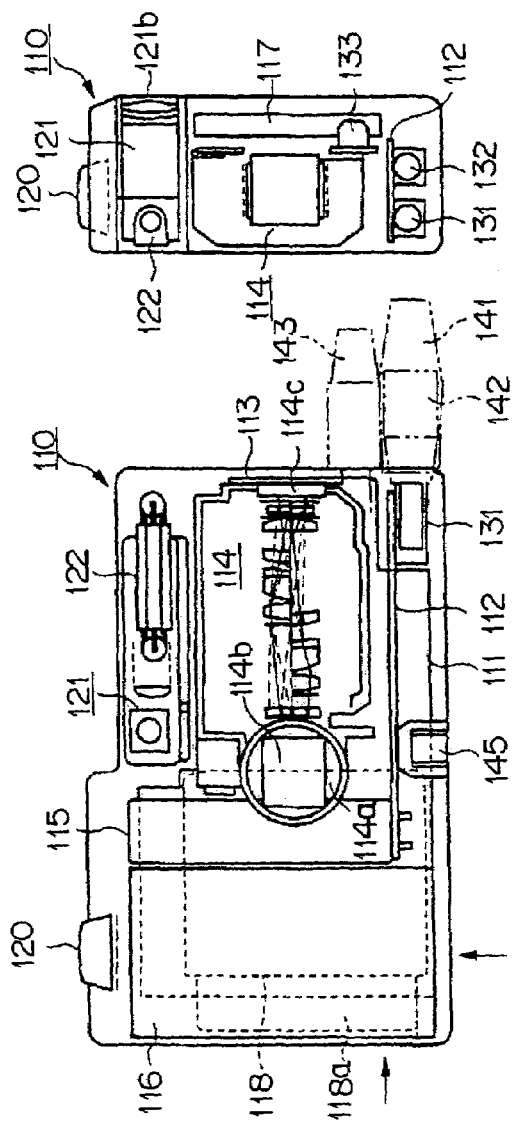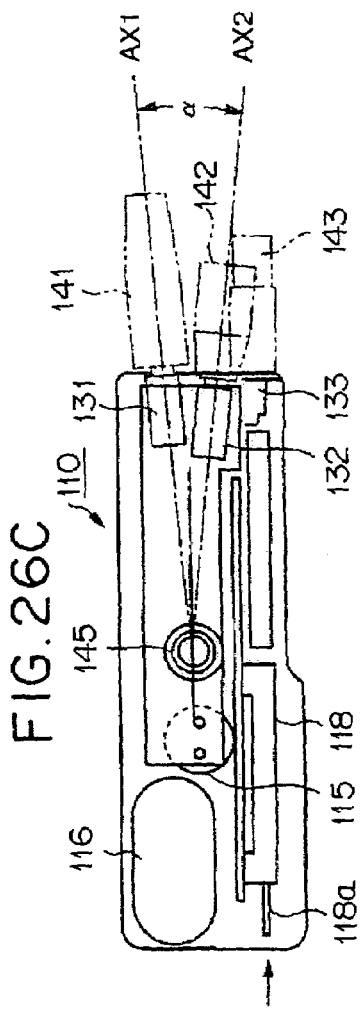

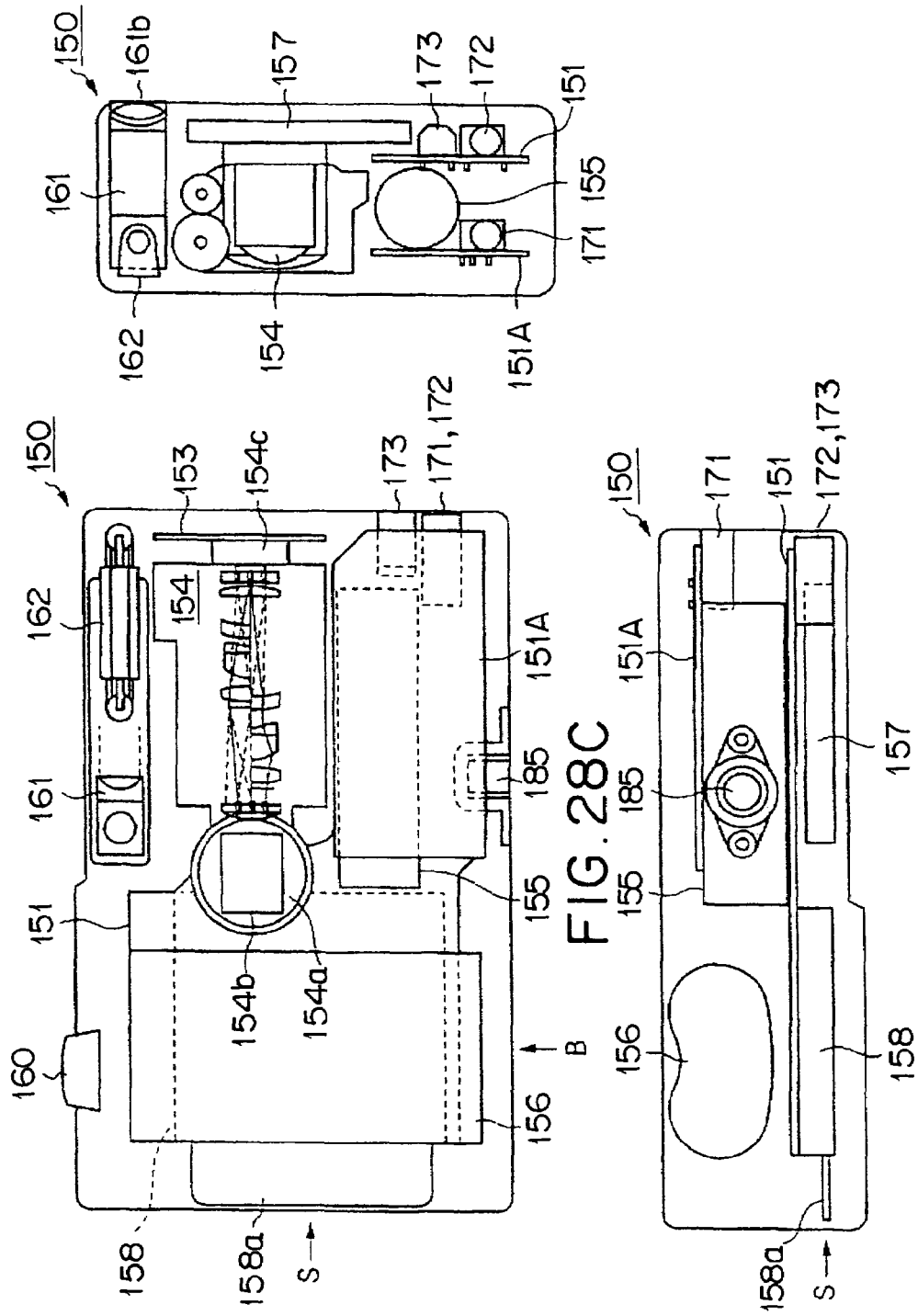

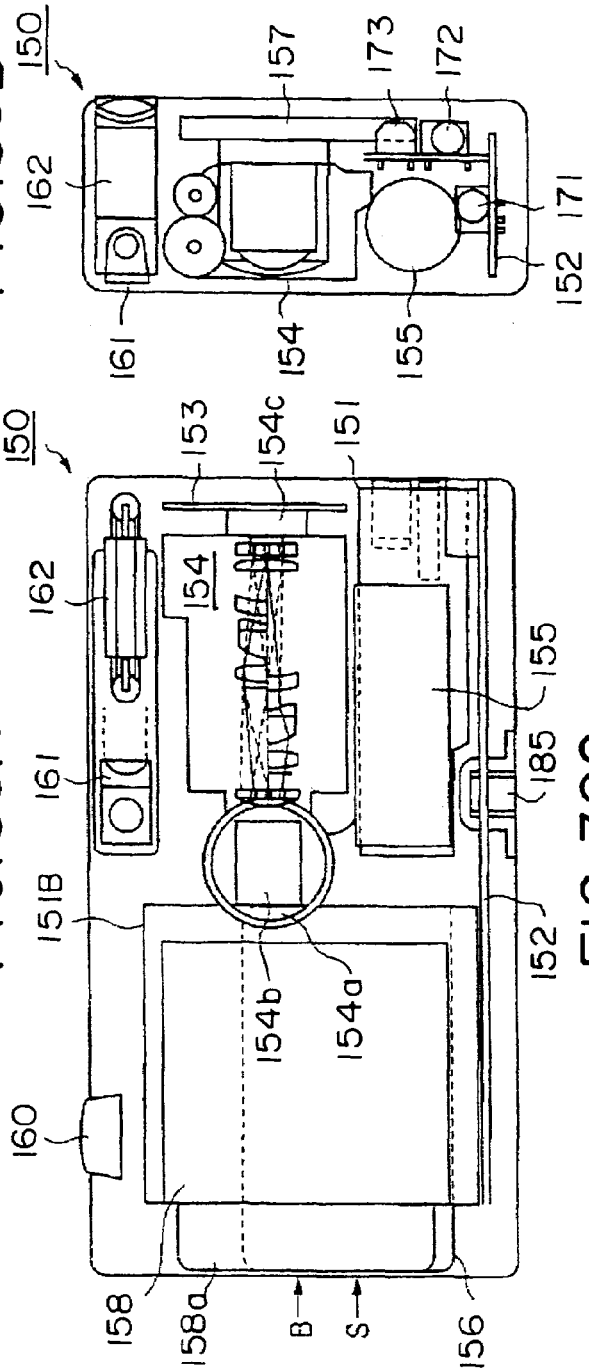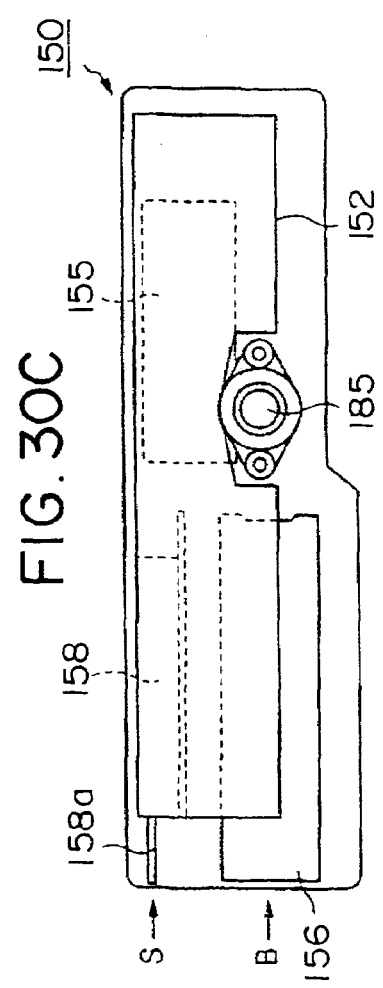

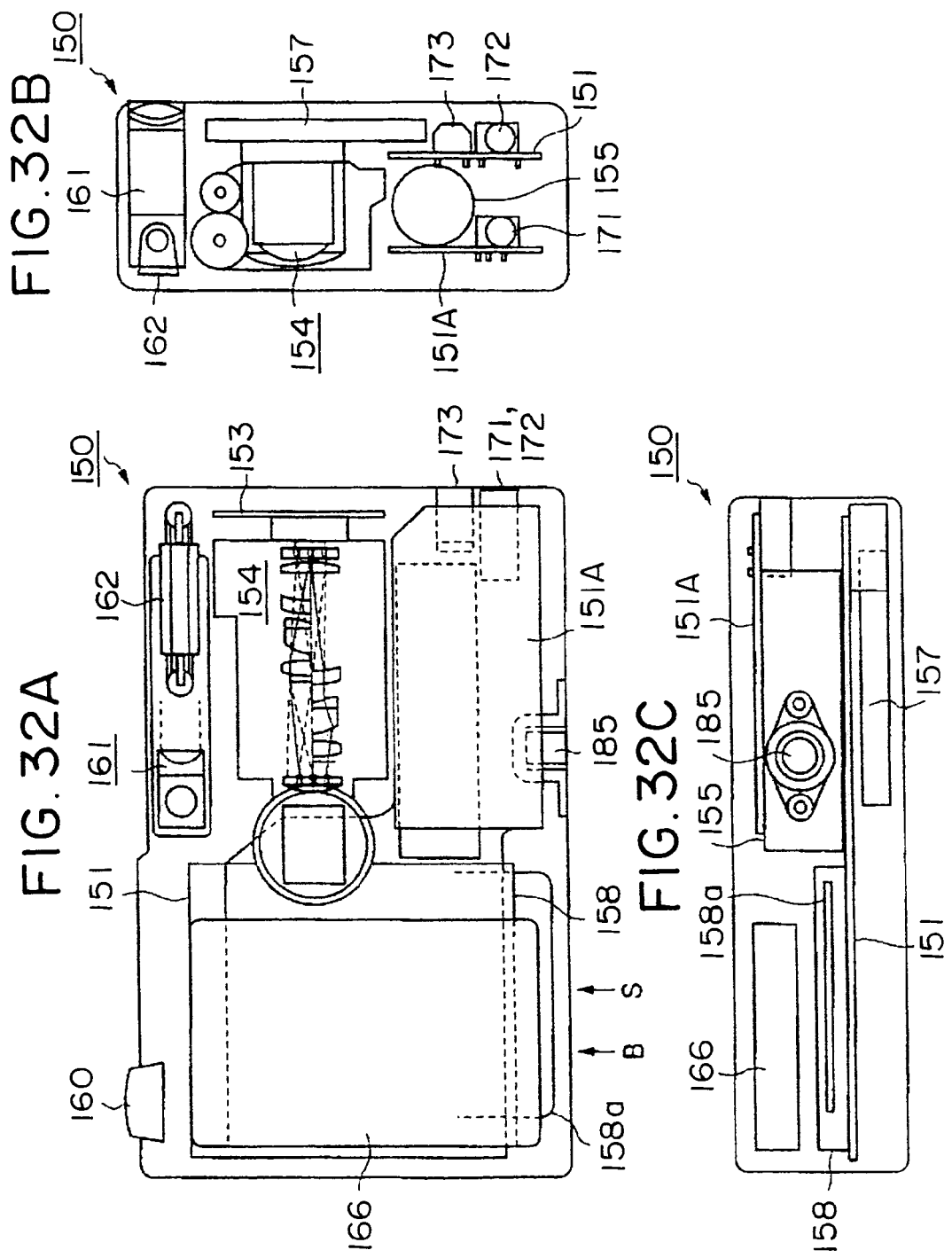

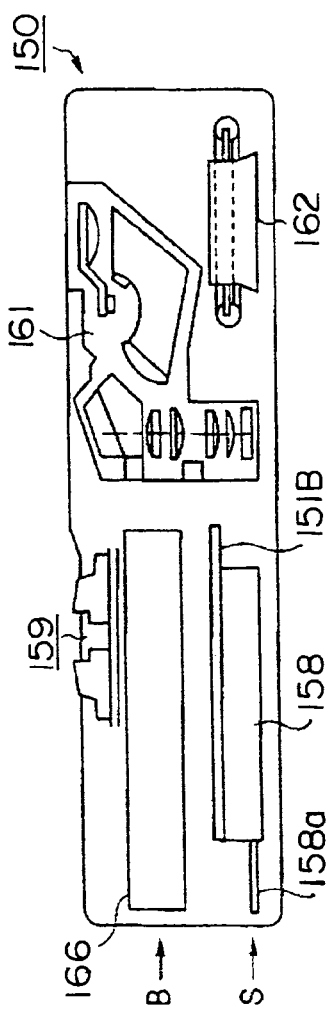
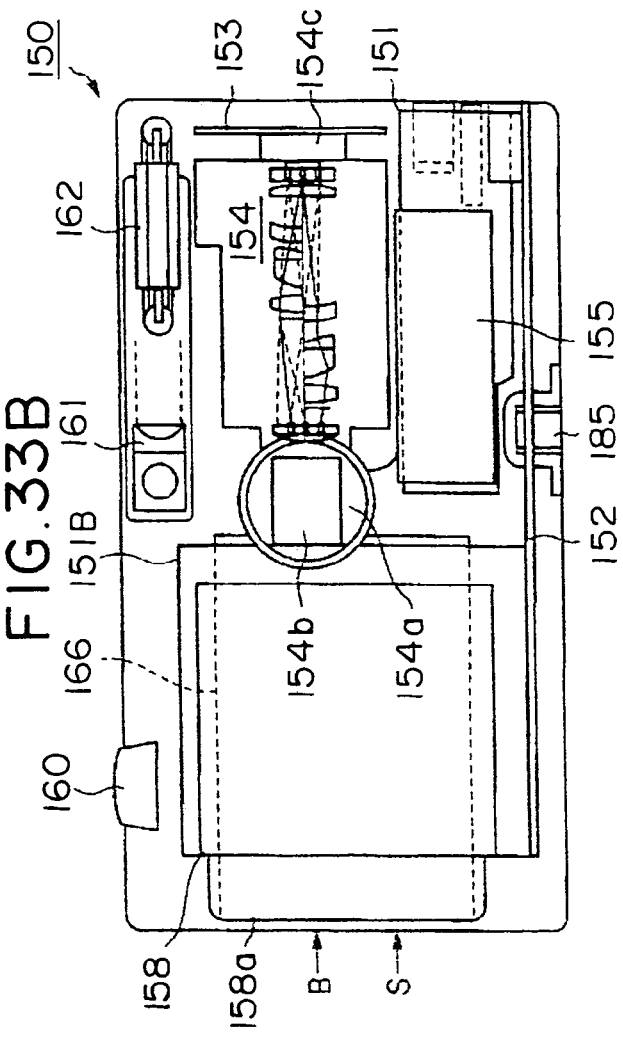
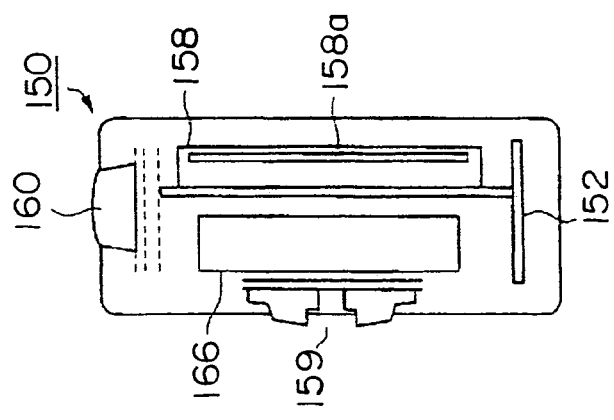

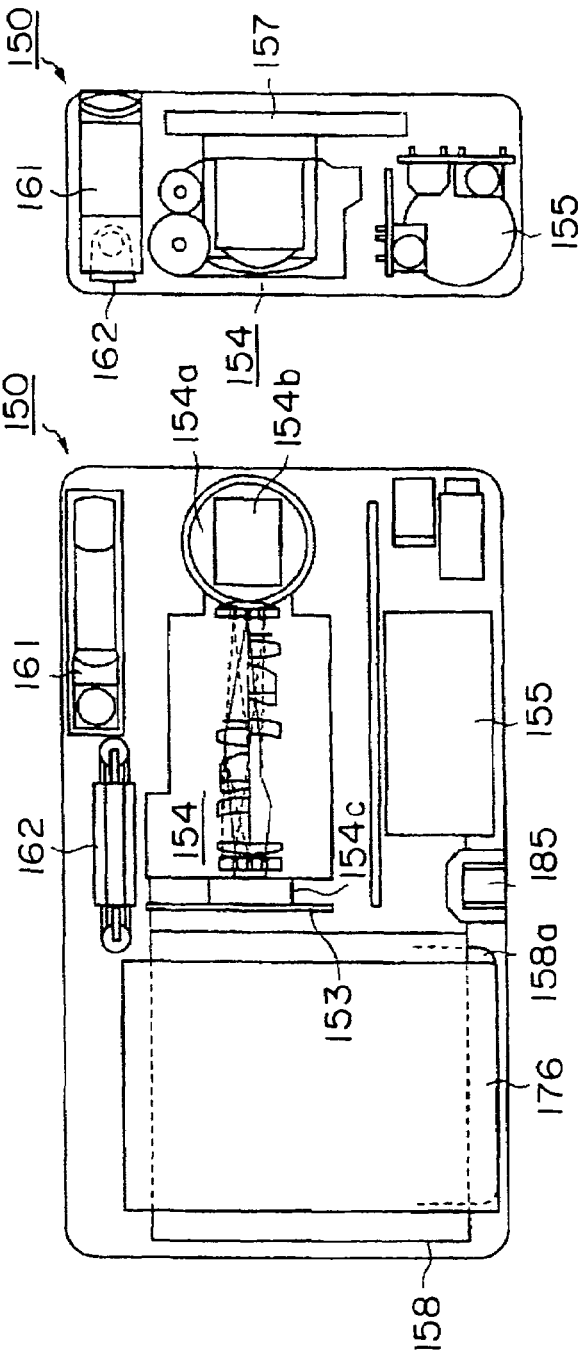
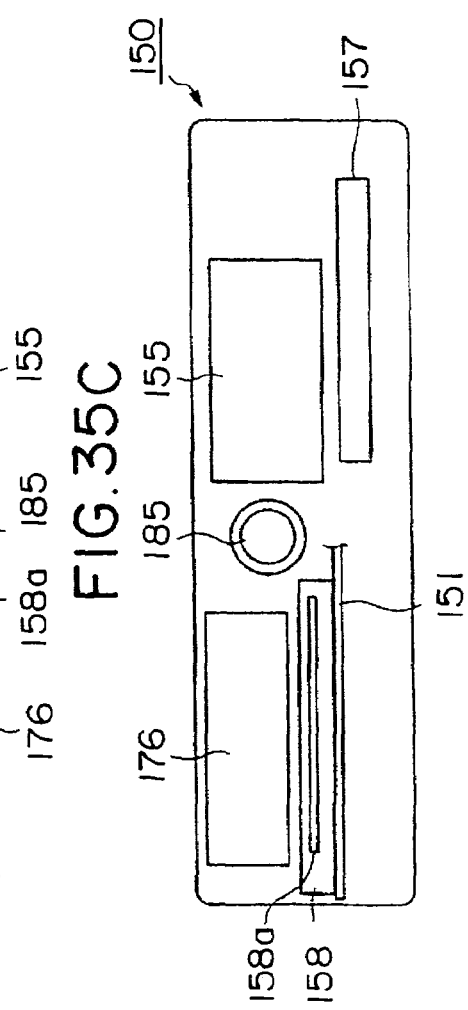

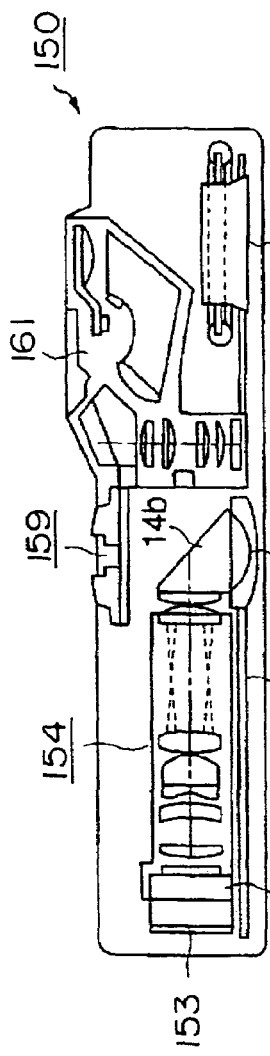
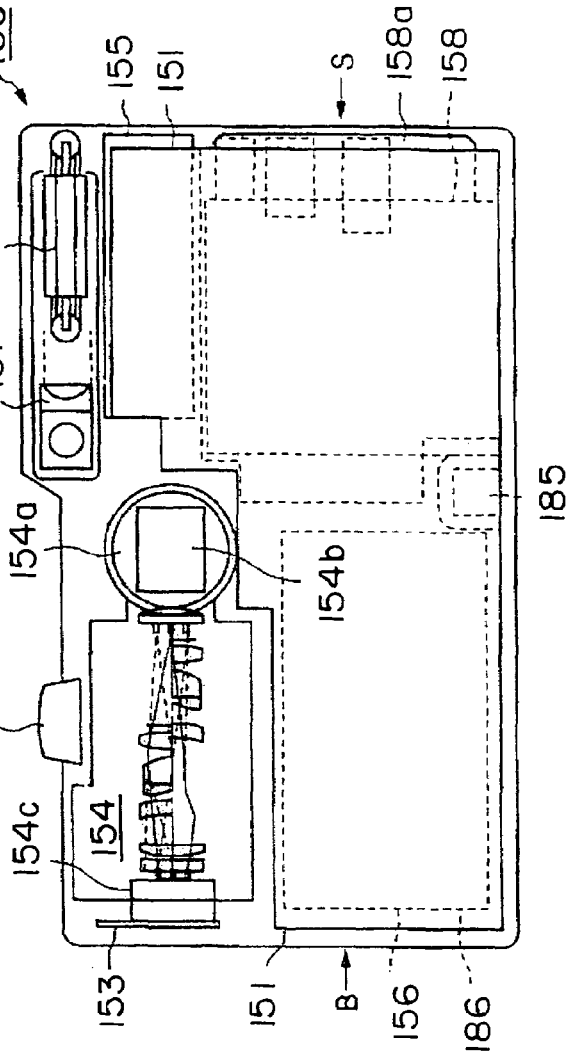
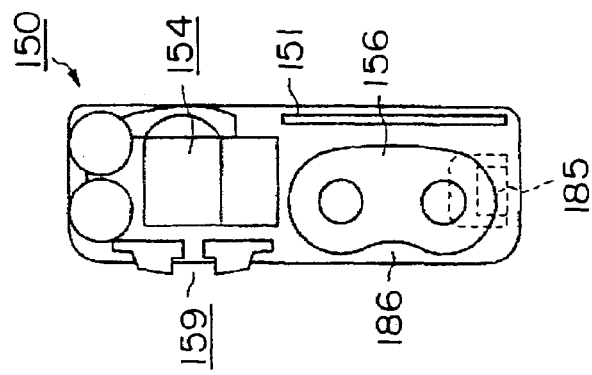

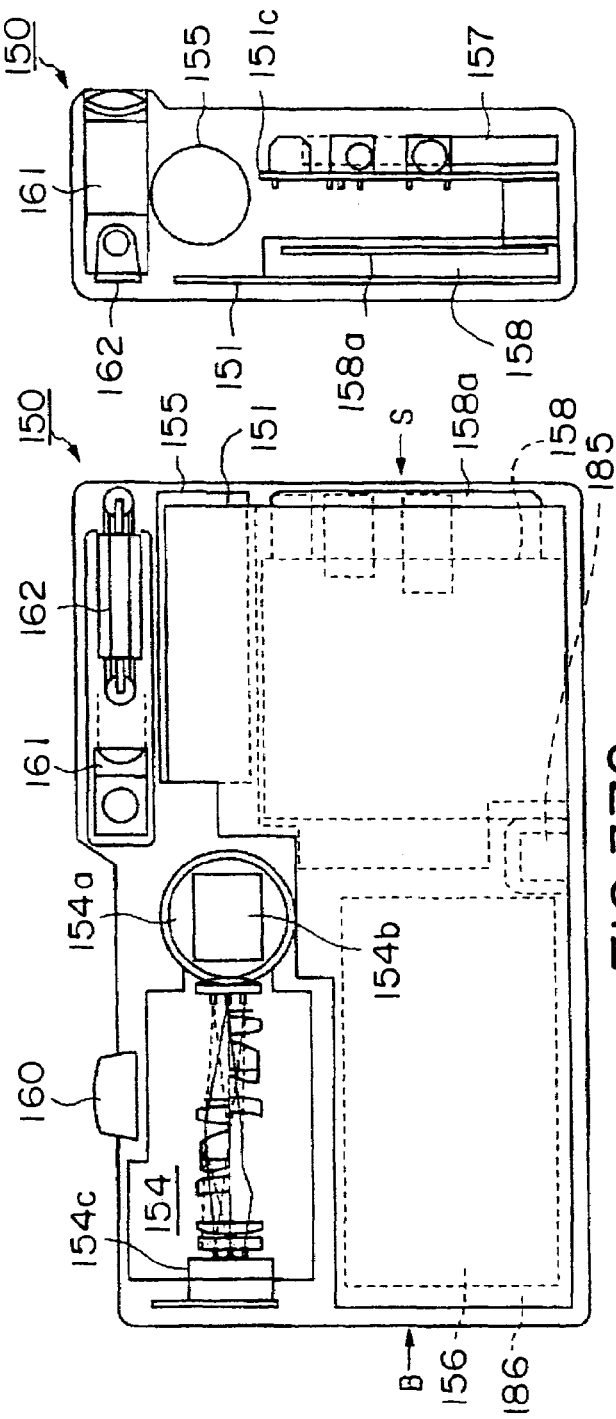

CAMERA WITH OPTICAL AXIS BENDING OPTICAL SYSTEM

This is a divisional application of U.S. patent application Ser. No. 10/086,196, filed Mar. 1, 2002, now U.S. Pat. No. 7,079,185 Issue Fee paid, which relies upon Japanese Application Nos.: 2001-58910 filed on Mar. 2, 2001, 2001-58911 filed on Mar. 2, 2001, 2001-58912 filed on Mar. 2, 2001, 2001-60499 filed on Mar. 5, 2001, 2001-60500 filed on Mar. 5, 2001, 2001-124612 filed on Apr. 23, 2001, 2001-124613 filed on Apr. 23, 2001, 2001-160869 filed on May 29, 2001, 2001-160870 filed on May 29, 2001, the contents of all of which are incorporated by reference in their entireties.

BACKGROUND OF THE INVENTION

1. Field of the Invention

The present invention relates to a camera and, more particularly, to a compact camera.

2. Description of the Related Art

Cameras, such as digital still cameras, digital video cameras, still picture cameras, and motion picture cameras, are commercialized and widely used. In these cameras, the image of a photogenic subject formed based on a light beam from the photogenic subject (hereinafter referred to as a subject light beam) incident on a picture taking optical system (hereinafter referred to as an image-pickup optical system) including a plurality of lens units is formed on subject image capturing means placed at a predetermined location, for example, on an image pickup device such as a charge-coupled device (CCD), or a photosensitive surface such as a camera film. A desired subject image is thus captured, and is then recorded in a predetermined recording medium in a predetermined form.

In these conventional cameras, a photographing optical system is typically formed of a plurality of lenses to form the subject image on a predetermined location.

A variety of photographing optical systems for conventional cameras are known. For example, in one photographing optical system, predetermined reflecting means such as a reflective mirror is arranged in an optical path to guide the subject light beam incident on the camera to a predetermined subject image capturing means such as the image pickup device or the camera film so that the optical path is bent to be aligned with a direction approximately perpendicular to the incident light optical path. A variety of cameras having a photographing optical system incorporating the so-called bending optical mechanism has been proposed, for example, in Japanese Unexamined Patent Application Publication No. 9-281578 and Japanese Unexamined Patent Application Publication No. 9-163206.

In the cameras disclosed in Japanese Unexamined Patent Application Publication No. 9-281578 and Japanese Unexamined Patent Application Publication No. 9-163206, reflective means is arranged in the optical path of the photographing optical system through which the subject light beam is transmitted so that the optical path of the subject light beam is bent in its way. This arrangement assures a required optical path length while incorporating a compact design in the camera itself.

The so-called bending optical system with the reflective means arranged in the optical path thereof is advantageous in the miniaturization of the camera.

With electronic equipment such as personal computers in widespread use, the demand for the camera is expected to mount which captures and records the subject image formed by the image-pickup optical system using a CCD (Charge-Coupled Device), and then reproduces the subject image.

This type of camera obtains a video signal by picking up the subject image formed through the image-pickup optical system by the CCD, while displaying the subject image on the photographing screen such as a monitor display or an LCD (Liquid-Crystal Display) in response to the video signal. Some cameras incorporate a recording medium such as a memory card in a detachable manner to store the video signal obtained through an image pickup operation.

Thin design is required of such a camera in an attempt to promote the ease of use, and low-cost and compact design.

To meet the thin design requirement, a variety of techniques have been proposed, such as a thin-design digital camera disclosed in Japanese Unexamined Patent Application Publication No. 10-336496 and a recording and reproducing apparatus disclosed in Japanese Unexamined Patent Application Publication No. 9-163206.

In the technique disclosed in Japanese Unexamined Patent Application Publication No. 10-336496, the digital camera houses within a camera body, an image-pickup optical system, an image pickup apparatus, and a monitor. If the camera body is viewed in the optical axis of the image-pickup optical system, the image pickup apparatus and the monitor do not overlap each other. In other words, a unit having the largest depth dimension is the image-pickup optical system. A thin design is incorporated by arranging no units that stack on the image-pickup optical system in the direction of depth.

Japanese Unexamined Patent Application Publication No. 9-163206 discloses a video camera in which the optical axis of the subject light beam incident on a front lens is bent at a right angle to be guided into a solid-state image pickup device. As discussed in connection with another embodiment with reference to FIG. 4 in that disclosure, an arrangement is disclosed in which an optical system and a circuit board of a VTR do not overlap each other when viewed from the subject end. In this way, the depth, length and height dimensions of the video camera are reduced, thereby generally miniaturizing the video camera.

Japanese Unexamined Patent Application Publication No. 9-116796 has proposed an electronic still camera in which an subject light beam is photoelectrically converted and is then recorded on a thin recording medium. The electronic still camera includes a photographing optical system unit, a photoelectrical conversion unit, and a recording unit in that order from front to back in the center of a camera body which has a width dimension larger than a depth dimension, and a recording medium is housed in the recording unit with the planar surface of the recording medium aligned to be perpendicular to the fore-aft line of the camera body. Furthermore, other camera components are arranged beside these components within the camera body. Specifically, first and second circuit boards as signal processing boards and the recording unit are stacked within the camera to miniaturize the camera.

Because of its high power consumption, an electronic camera must use a large battery, and the fact presents difficulty in the miniaturization of the camera.

To improve portability with compact and light-weight design, the battery must be compact. However, a compact battery means lower power capacity, and its service life is short. In view of a sequence of the camera, at a peak power consumption when a plurality of calculations and actuator driving operations are concurrently performed, the voltage of a power supply significantly drops. The voltage, which has dropped below a predetermined threshold, can be determined as a battery voltage drop, and a normal picture taking operation cannot be performed any longer.

The peak power consumption occurs at a limited timing in the operation sequence of the camera. The battery power is thus determined to be insufficient even if there is still power remaining in the battery in terms of overall battery power.

Photographing optical systems of the camera in general have a photographing optical axis aligned with the fore-aft line of a camera body (in the direction of depth). The overall length of the photographing optical system is the main factor that determines the thickness of the camera body. The longer the overall length of the photographing optical system, the larger the thickness of the camera body. A zoom camera in particular uses a number of lenses, and the overall length of the photographing optical system thereof increases. The thickness of the camera body naturally increases.

The inventors of this invention have proposed that a thin design is implemented by incorporating an axis bending type photographing optical system into a camera body. As disclosed in Japanese Unexamined Patent Application Publication No. 11-196303, a reflective surface, arranged in the optical axis bending type photographing optical system, bends the photographing optical axis so that the optical axis of the light beam reflected from the reflective surface is aligned with the direction of width of the camera. The overall length of the photographing optical system is thus shortened.

The assembly method of the camera needs to be simplified to miniaturize the camera at low costs.

In conventional assembly methods of cameras, a chassis is arranged, a circuit board and an image-pickup optical system are then mounted on the chassis, and then camera outer housings are then mounted to cover these components. This method is widely adopted because of its easiness and because each component in its mounted state on the chassis is easily tested. However, space for the chassis is required. To promote miniaturization and compact design, there is a need for the elimination of the space for the chassis.

To meet such a need, circuit boards may be stacked one on another within outer housing members, and finally, the outer housing members are secured each other. Such a camera has already been proposed.

In view of circuit boards, since an electronic camera has a large scale circuit, a plurality of circuit boards, rather than a single circuit board, are required even if the maximum projectable area of the camera is used. A plurality of circuit boards are thus stacked within the camera. The circuit boards are mutually electrically connected using connectors. Since the number of lines is very large, a board-to-board connector having a number of connection terminals mounted on the surface of each circuit board is useful.

This type of connector has the merit of connecting a number of lines at a time. However, since this connector fixes also mechanical positions between circuits at the same time, the dimensional accuracy of the assembly becomes a concern, particularly during assembly.

Specifically, when a circuit board is fixed inside the outer housing of a camera using screws, an image-pickup optical system unit must also be fixed using screws within the same outer housing. The image-pickup optical system unit typically has an image pickup device adjusted and fixed thereto beforehand. The image pickup device is mounted on an image pickup board. In other words, the circuit board and the image pickup board are assembled and fixed within the camera outer housing. The circuit board must be electrically connected to the image pickup board. The mounting positions of the two boards are typically subject to variations. The two circuits have been conventionally electrically connected to each other using a flexible board to accommodate positional variations of the two circuits.

The photographing optical system using the above-mentioned bending optical mechanism has a structure that allows unwanted rays of light to easily reach a predetermined image-formed position. The unwanted rays of light may include internal reflections of light that take place when a subject light beam incident on a lens is reflected from the inner surface of a retainer of the lens, rays of light excessively obliquely incident on a lens closest to the subject end, and rays of light which are reflected from reflective means in undesired directions.

These unwanted rays of light create noise such as ghost and flare in a captured image, thereby resulting in an image degradation. The camera photographing optical system having an axis bending optical mechanism thus needs means (unwanted rays of light prevention means) for blocking or preventing the unwanted rays of light that cause the image degradation.

However, there is no mention of such unwanted ray-of-prevention means in Japanese Unexamined Patent Application Publication No. 9-281578 and Japanese Unexamined Patent Application Publication No. 9-163206. This suggests that no sufficient consideration has conventionally given to the unwanted rays of light in the photographing optical system having an axis bending optical mechanism.

Specifically, in an ordinary photographing optical system in the conventional camera having no reflective means in which the optical path of the subject light beam is not bent in the photographing optical system, one or a plurality of diaphragm members suffice to block or prevent the unwanted rays of light. The conventional axis bending type optical system thus has unwanted ray-of-light prevention means similar to that employed in the ordinary photographing optical system with the optical path thereof not bent.

The ordinary photographing optical system typically requires a focus adjustment mechanism to focus the subject image at a predetermined position. The focus adjustment mechanism is a mechanism that moves a predetermined lens, out of a plurality of lenses forming the photographing optical system, along the optical axis to move the image-formed position of the subject image.

A reduction in the dimension of the camera in the fore-aft direction, namely, a thin design is preferably implemented in the photographing optical system having the axis bending optical system. To this end, it is effective to shorten a portion of the optical path of a plurality of lenses upstream of the bending point of the optical path, namely, the distance between a front lens unit arranged closest to the subject end and the reflective means.

If a focus adjustment operation is performed by moving the front lens unit arranged upstream of the bending point of the optical path of the subject light beam in the photographing optical system having an axis bending optical mechanism, the number of lens elements in each lens unit and the number of lens units increase. In this arrangement, the thin design is difficult to implement in the camera.

To thin the fore-aft dimension of the camera, the front lens unit is preferably arranged to have a required light collection capability with the minimum number of lens elements.

To meet this requirement in the photographing optical system having an axis bending optical mechanism, it is contemplated that the lens elements in the front lens unit may be set to be stationary in the relative positions thereof, and that a focus adjustment operation is performed by varying the distance between the reflective means and a predetermined component, for example, subject image capturing means such as an image pickup device or a camera film.

In a camera employing an image pickup device as the subject image capturing means, a number of electrical components and circuit boards including connection lines are mounted on the image pickup device. These are typically integrated into a unitary structure.

When the image pickup device is moved with respect to a fixed photographing optical system to perform a focus adjustment operation, components associated with the image pickup device must be mechanically moved together with the image pickup device.

When a camera film is moved to perform a focus adjustment operation with the photographing optical system stationary in a camera using the camera film as the subject image capturing means, a plurality of components for assuring flatness of the camera film must be mechanically moved integrally with the camera film.

In view of the above arrangements, the focus adjustment method by moving the subject image capturing means such as the image pickup device or the camera film in the optical axis of the photographing optical system is not appropriate.

There is no mention of a mechanism performing a focus adjustment operation in the photographing optical system having an axis bending optical mechanism in Japanese Unexamined Patent Application Publication No. 9-281578 and Japanese Unexamined Patent Application Publication No. 9-163206.

The conventional art disclosed in Japanese Unexamined Patent Application Publication No. 10-336496 and Japanese Unexamined Patent Application Publication No. 9-163206 will incorporate a thin design in the camera to some degree. If units are arranged in a manner with no portion overlapping each other, the area size of the camera, when viewed in the optical axis of the photographing optical axis, becomes large. The thin design is thus incorporated at the expense of the area size of the camera. The conventional art is thus not appropriate from the standpoint of promoting the ease of use and thin structure.

In addition to the thin design, a compact structure as a result of the thin design, the ease of assembly and a low-cost design are required of the camera. The above-referenced conventional arts satisfy not all these requirements.

Digital cameras consuming a large quantity of electrical energy are now discussed. Such a camera needs a large space for housing a battery. In the above disclosures, there is no mention of the mounting of a battery that occupies a large space, namely, no mention of any technique that substantially miniaturizes the camera in size.

A battery needs to be miniaturized in a conventional electronic camera to assure portability with compact and lightweight design incorporated. However, a compact camera means a reduction in battery capacity, and then a short service life of battery. In a sequence of camera operation, in a typical control method, the voltage, which has dropped below a predetermined threshold at a peak power consumption timing, can be determined as a battery voltage drop, and the battery power is thus determined to be insufficient even if there is still significant portion of the overall battery power remaining in the battery. A normal picture taking operation cannot be performed any longer.

In Japanese Unexamined Patent Application Publication No. 9-116796, there is no mention of any technique to preclude a problem taking place on a small battery during a peak power consumption. The disclosure also fails to detail any arrangement that is intended to achieve miniaturization, weight balance and the ease of assembly of the camera.

The camera body thickness is thinned using an optical-axis bending type photographing optical system. The use of the optical system alone fails to reduce the width dimension of the camera. The entire camera cannot be reduced in size. To miniaturize the entire camera, not only the thickness thereof but also the width and vertical length thereof (height dimensions) need to be reduced. To this end, other components mounted in the vicinity of the optical axis bending type photographing optical system, for example, a stroboscopic capacitor having a relatively large volume, needs to be effectively mounted in the camera body.

Since a connector using a flexible board, typical of the conventional connection method, has a number of lines as already discussed, the connector itself becomes bulky. The connector is not durable, and is not a reliable connection option. The connector is thus far from improving the reliability and the ease of assembly thereof. The use of the connector does not serve the purpose of the miniaturization of the camera.

Japanese Unexamined Patent Application Publication No. 9-116796 fails to detail the assembly method of the camera. The use of the above-mentioned connector is not satisfactory in terms of the reliability, miniaturization, and the ease of assembly of the camera.

In view of the above problems, the present invention has been developed. The present invention has the following objects.

It is an object of the present invention to provide a camera which includes a photographing optical system with an axis bending optical mechanism using reflective means in the optical path thereof, and forms a subject image in an excellent state thereof on a predetermined image-forming surface by blocking unwanted rays of light, out of light beams incident thereof, unnecessary to form a subject image.

It is another object of the present invention to provide a camera which employs a photographing optical system including an axis bending optical mechanism, and has a compact design with a thin structure in the fore-aft direction of the camera.

It is yet another object of the present invention to provide a camera which features a thin, compact and low-cost structure, and a small projection area size when viewed in the projecting optical axis, and presents the ease of assembly and the ease of use of the camera.

It is still another object of the present invention to provide a camera which is low-cost, generally compact, thin-structured, and easy to use with the projection area size viewed in the projecting optical axis minimized by skillfully arranging a circuit board, an optical system apparatus, and a battery.

It is still further object of the present invention to provide a camera which is low-cost, generally compact, thin-structured, and easy to use with the projection area size viewed in the projecting optical axis minimized by adeptly arranging various types of circuit boards.

It is still another object of the present invention to provide a camera which is compact, and thin, and stable in operation and has an excellent weight balance by arranging a high-capacitance and flat electrical-double-layer capacitor in an layout appropriate for miniaturization.

It is still yet another object of the present to provide an electronic camera having the following advantages.

(a) The height dimension of the camera having an optical axis bending type photographing optical system is reduced.

(b) The camera which is already reduced in size by mounting an optical axis bending type photographing optical system is even further miniaturized.

(c) Dead space in the body of the camera having an optical-axis bending type photographing optical system is effectively utilized.

In accordance with the present invention, a board-to-board type connector is employed in a camera which employs no chassis. The reliability of the connector is therefore enhanced. The electronic camera is thus compact, low-cost, and increases the ease of assembly.

SUMMARY OF THE INVENTION

To achieve the above objects, a camera of the present invention comprising: a first lens unit, formed of a plurality of lenses, on which a light beam is incident from a subject; a reflective member for reflecting a light beam, which has come from the subject and has been transmitted through the first lens unit, in a direction substantially perpendicular to the optical axis of the first lens unit; a first diaphragm member which is arranged on a surface of a lens closest to the reflective member of the first lens unit with the surface of the lens facing the reflective member, and which blocks unwanted rays of light other than the light beam that contributes to the formation of the image of the subject on an image-forming surface; a second lens unit, formed of a plurality of lenses, on which the light beam reflected from the reflective member is incident; at least one of a second diaphragm member and an unwanted ray-of-light reflection prevention member, whereas the second diaphragm member being arranged between the first lens unit and the second lens unit, and blocking unwanted rays of light that travel outside the outermost periphery at which the light beam forming the subject image traveling from the first lens unit to the reflective member intersects the light beam forming the subject image traveling from the reflective member to the second lens unit, and the unwanted ray-of-light reflection prevention member being arranged on the reflective member to prevent rays of light from being reflected from a region thereof other than the region thereof on which the light beam forming the subject image is incident; and a third diaphragm member, arranged in the vicinity of a surface of a lens of the second lens unit closest to the reflective member with the surface of the lens facing the reflective member, for blocking unwanted rays of light other than the light beam contributing to the formation of the subject image.

A camera of the present invention includes: a first lens unit, formed of a plurality of lenses, on which a light beam is incident from a subject; a reflective member for reflecting a light beam, which has come from the subject and has been transmitted through the first lens unit, in a direction substantially perpendicular to the optical axis of the first lens unit; a subject image capturing device arranged at a location where the light beam reflected from the reflective member forms the subject image, and mounted integrally with a frame member; a focus adjusting mechanism which performs a focus adjustment operation for the subject image by varying the distance between the reflective member and the subject image capturing device, and a subject-image light beam incident window, formed in a housing member, and having an opening dimension that permits the light beam from the subject incident on the first lens unit to be transmitted therethrough, wherein the dimension of the window's long edge thereof is predetermined to permit the light beam incident on the first lens unit to be transmitted therethrough regardless of a case in which the distance between the reflective member and the subject image capturing device, which is varied in response to the focus adjustment operation, is set to be shortest, or a case in which the distance between the reflective member and the subject image capturing device is set to be longest.

A camera of the present invention includes: a flat and elongated casing; a battery holder for holding a battery, arranged near one end of the elongated casing, and having a portion thereof shortest in dimension aligned with the direction of depth of the flat shape of the casing; a recording medium container with at least a portion thereof stacked on the battery holder in the direction of depth of the casing, and with a portion thereof shortest in dimension aligned with the direction of depth of the casing; a photographing optical system, arranged near the other end of the elongated casing, for bending an incident light beam from a subject and forming an image on an image pickup surface; an operation switch; and a display, wherein at least a portion of at least one of the operation switch and the display is stacked on the photographing optical system in the direction of depth of the casing, and the operation switch and the display are not stacked on each other in a plane of the casing when viewed from the subject.

A camera of the present invention includes: a flat and elongated casing; a battery holder for holding a battery, arranged near one end of the elongated casing, and having a portion thereof shortest in dimension aligned with the direction of depth of the flat shape of the casing; a photographing optical system, arranged near the other end of the elongated casing, for bending an incident light beam from a subject and forming an image on an image pickup surface thereof; an image pickup board which is arranged in parallel with an image pickup surface of an image pickup apparatus and receives an output signal from the image pickup apparatus, wherein the image pickup surface of the image pickup apparatus is arranged in the image pickup surface of the photographing optical system; and a circuit board having an outer shape that is stacked on the battery holder in the direction of depth of the casing, but is not stacked on the photographing optical system in the direction of depth of the casing, and substantially coextends with the plane of the casing when viewed from the subject.

A camera of the present invention includes: a flat casing; a battery holder for holding a battery, arranged near one end of the casing, and having a portion thereof shortest in dimension aligned with the direction of depth of the flat shape of the casing; a photographing optical system, arranged near the other end of the casing, for bending an incident light beam from a subject and forming the image on an image pickup surface thereof; a first circuit board having an outer shape that is stacked on the battery holder in the direction of depth of the casing, but is not stacked on the battery holder in the direction of depth of the photographing optical system, and generally coextends with the plane of the casing when viewed from the subject; and a second circuit board having a shape not stacked on the battery holder and the photographing optical system in the direction of depth of the casing.

A camera of the present invention includes: a flat casing; a battery holder arranged inside the casing; a circuit board arranged with at least a portion thereof stacked on the battery holder in the direction of depth of the casing; and a flat electrical-double-layer capacitor stacked and arranged with at least a portion thereof stacked on both the battery holder and the circuit board.

An electronic camera of the present invention includes: a camera body; an axis bending type photographing optical system having a reflective surface which is arranged in the vicinity of a light incident area of the camera body in a direction inclined with respect to the optical axis of an incident light beam so that the optical axis of the light beam reflected from the reflective surface is aligned with the direction of width of the camera body; and a stroboscopic capacitor arranged with a portion of an outer circumference thereof close to the back side of the reflective surface of the photographing optical system and with the length direction thereof aligned to be perpendicular to the bottom plane of the camera body.

An electronic camera of the present invention includes: a camera body, a photographing optical system having a reflective surface thereof, for bending an optical axis, in the vicinity of a light incident area of the camera body, and arranged in the camera body so that the length direction thereof, aligned with the optical axis of the light beam reflected from the reflective surface, is in parallel with the bottom plane of the camera, an optical finder arranged above the photographing optical system with the length direction of the optical finder aligned to be in parallel with the length direction of the photographing optical system; and a stroboscopic capacitor arranged below the photographing optical system with the length direction of the stroboscopic capacitor aligned to be in parallel with the length direction of the photographing optical system.

An electronic camera of the present invention includes: a casing; a photographing optical system, arranged in the casing, for capturing an image of a subject in front of the casing; an image pickup device integrally assembled with the photographing optical system, for picking up the subject image formed by the photographing optical system; an image pickup board connected to the image pickup device; and a first circuit board fixed to the casing with at least a portion thereof stacked on the image pickup board in the direction of depth of the casing, wherein the image pickup board is mounted in the casing subsequent to the mounting of the photographing optical system and the first circuit board in the casing, and the image pickup board is fixed to and connected to a terminal of the image pickup device.

The above and other objects, features and advantages of the invention will become more clearly understood from the following description referring to the accompanying drawings.

BRIEF DESCRIPTION OF THE DRAWINGS

FIG. 26A illustrates the structure of the electronic camera of the sixth embodiment of the present invention, viewed from the front thereof.

FIG. 26B illustrates the structure of the camera of the sixth embodiment of the present invention, viewed from the right-hand side thereof with respect to the front of the camera.

FIG. 26C illustrates the structure of the electronic camera of the sixth embodiment of the present invention, viewed from the bottom thereof.

FIG. 28A illustrates the structure of the camera of the seventh embodiment of the present invention, viewed from the front thereof.

FIG. 28B illustrates the structure of the camera of the seventh embodiment of the present invention, viewed from the right-hand side thereof with respect to the front of the camera.

FIG. 28C illustrates the structure of the camera of the seventh embodiment of the present invention, viewed from the bottom of the camera.

FIG. 30A illustrates the structure of the camera in accordance with the first modification of the seventh embodiment, viewed from the front thereof.

FIG. 30B illustrates the structure of the camera in accordance with the first modification of the seventh embodiment, viewed from the right-hand side thereof with respect to the front of the camera.

FIG. 30C illustrates the structure of the camera in accordance with the first modification of the seventh embodiment of the present invention, viewed from the bottom side of the camera.

FIG. 32A illustrates the structure of the camera in accordance with the second modification of the seventh embodiment of the present invention, viewed from the front thereof.

FIG. 32B illustrates the structure of the camera in accordance with the second modification of the seventh embodiment of the present invention, viewed from the right-hand side thereof with respect to the front of the camera.

FIG. 32C illustrates the structure of the camera in accordance with the second modification of the seventh embodiment of the present invention, viewed from the bottom thereof.

FIG. 33A illustrates the top structure of a camera in accordance with a third modification of the seventh embodiment of the present invention.

FIG. 33B illustrates the structure of the camera in accordance with the third modification of the seventh embodiment of the present invention, viewed from the front thereof.

FIG. 33C illustrates the structure of the camera in accordance with the third modification of the seventh embodiment of the present invention, viewed from the left-hand side thereof with respect to the front side of the camera.

FIG. 35A illustrates the structure of the camera in accordance with the fourth modification of the seventh embodiment of the present invention, viewed from the front thereof.

FIG. 35B illustrates the structure of the camera in the fourth modification of the seventh embodiment of the present invention, viewed from the right-hand side thereof with respect to the front of the camera.

FIG. 35C illustrates the structure of the camera in accordance with the fourth modification of the seventh embodiment of the present invention, viewed from the bottom thereof.

FIG. 36A illustrates the top structure of the camera in accordance with a fifth modification of the seventh embodiment of the present invention.

FIG. 36B illustrates the structure of the camera in accordance with the fifth modification of the seventh embodiment of the present invention, viewed from the front thereof.

FIG. 36C illustrates the structure of the camera in accordance with the fifth modification of the seventh embodiment of the present invention, viewed from the left-hand side thereof with respect to the front of the camera.

FIG. 37A illustrates the structure of the camera in accordance with the fifth modification of the seventh embodiment of the present invention, viewed from the front thereof.

FIG. 37B illustrates the structure of the camera in the fifth modification of the seventh embodiment of the present invention, viewed from the right-hand side thereof with respect to the front of the camera.

FIG. 37C illustrates the structure of the camera in accordance with the fifth modification of the seventh embodiment of the present invention, viewed from the bottom thereof.

DETAILED DESCRIPTION OF THE PREFERRED EMBODIMENTS

The embodiments with the drawings of the present invention will now be discussed.

First Embodiment

The camera of a first embodiment of the present invention is a digital still camera. In the digital still camera, the image of a subject formed based on a light beam from the subject (hereinafter referred to as a subject image light beam) incident on a photographing optical system including a plurality of lens units is formed on subject image capturing means placed at a predetermined location, for example, on the light receiving surface of an image pickup device such as a charge-coupled device (CCD), then the subject image is recorded on a predetermined recording medium as a predetermined image data. Such a camera includes a predetermined display device for displaying the image based on the image data after reading the image data recorded in the recording medium in a predetermined form. In the discussion that follows, the camera of the first embodiment is simply referred to as the camera.

Figure 1:
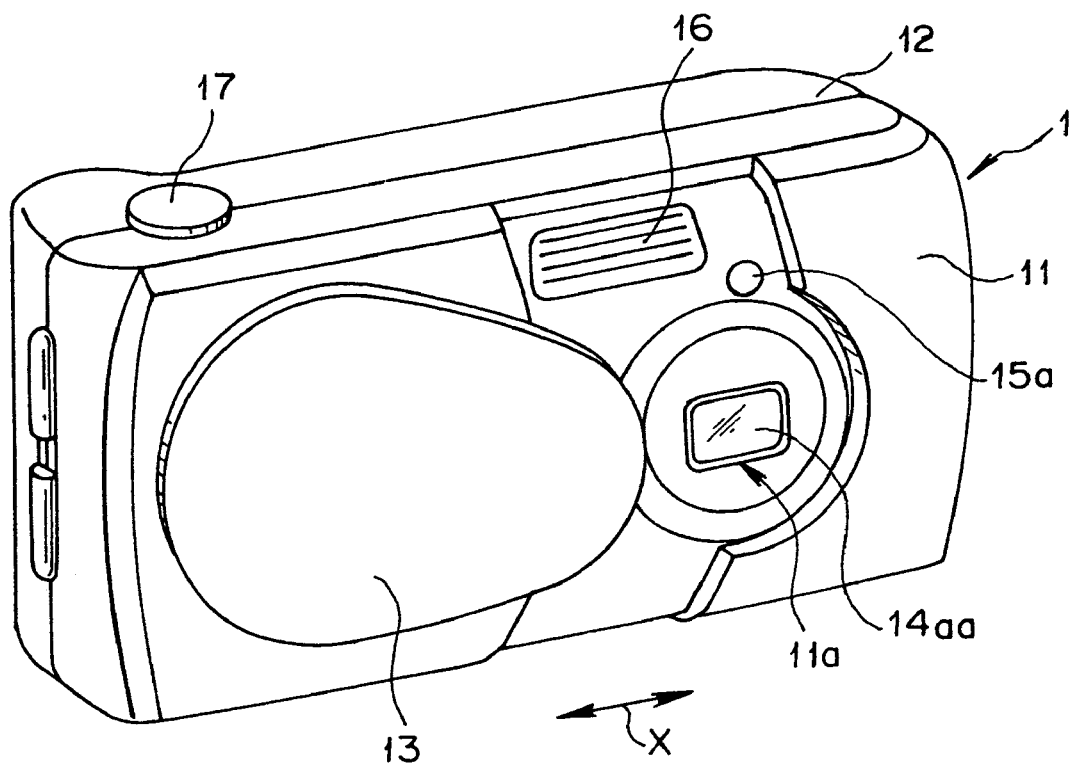
FIG. 1 is a perspective view of a camera in accordance with a first embodiment of the present invention.
Figure 2:
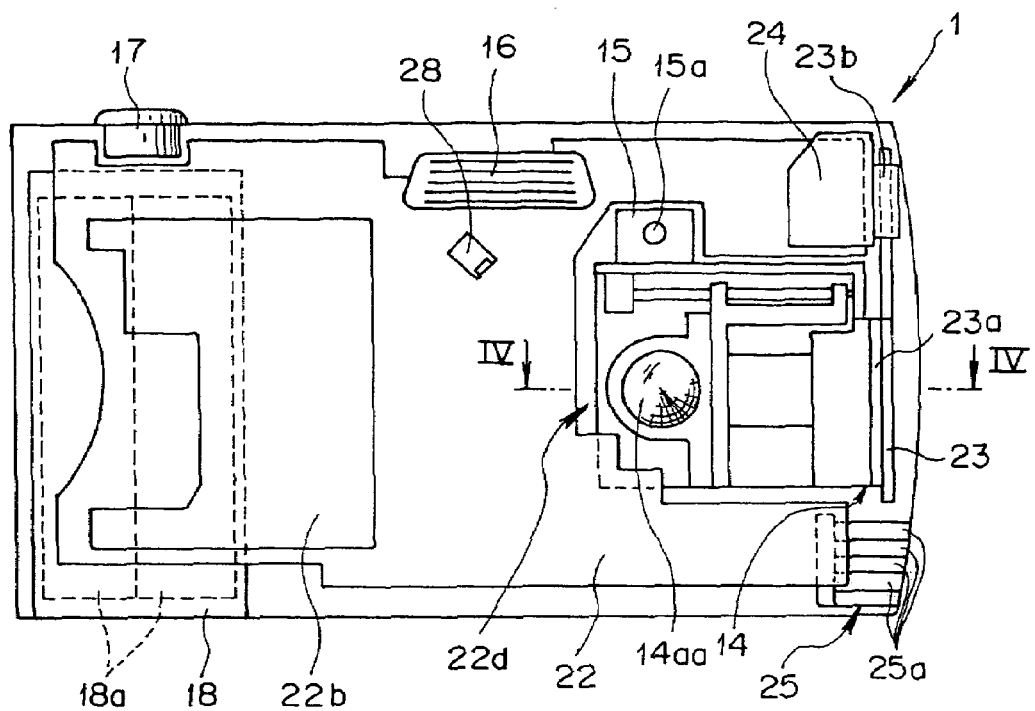
FIG. 2 is a layout view illustrating the layout of major components, in the camera illustrated in FIG. 1, viewed from the front thereof.
Figure 3:
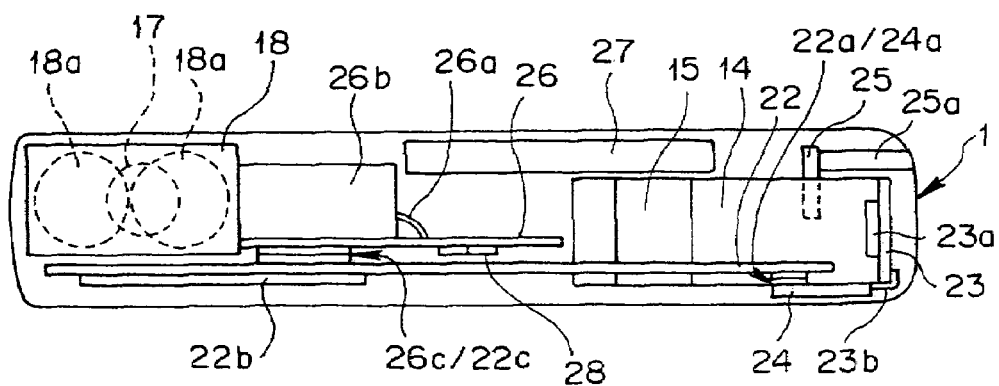
FIG. 3 is a layout view illustrating the layout of major components, in the camera illustrated in FIG. 1, viewed from top.

FIG. 1 is a perspective view of the camera in accordance with a first embodiment of the present invention. FIG. 2 and FIG. 3 illustrate the layout of major components inside the camera of the first embodiment of the present invention, FIG. 2 illustrates the layout of the components viewed from the front side of the camera, and FIG. 3 illustrates the layout of the components viewed from the top.

The construction of the camera is roughly described below with reference to FIGS. 1 through 3.

Referring to FIG. 1, a camera 1 of this embodiment includes a casing formed of a front cover 11 covering the front side of internal components (not shown in FIG. 1, and see FIG. 2 and FIG. 3), a back cover 12 covering the back of the camera 1, and an outer housing such as a barrier member 13 which is slidable with respect to the front cover 11 in a direction represented by an arrow X in FIG. 1.

The barrier member 13 is slidably disposed with respect to the front cover 11 of the camera 1 within a predetermined range, and is positioned movably between a closed position at which the barrier member 13 covers the front side of the camera 1, whereas a variety of components arranged in the vicinity of the center of the camera front, and a photographing position (for the state illustrated in FIG. 1) at which the front portion of the components are exposed. The barrier member 13 is interlocked with a main power switch 28 (see FIG. 2 and FIG. 3) which is mounted in the camera 1 and turns on and off the main power supply. By opening or closing the barrier member 13, the main power switch 28 interlocked therewith turns on and off the camera 1.

Arranged substantially in the center of the front cover 11 are a first lens 14aa, of a photographing optical system, forming part of a photographing lens unit 14 (not shown in FIG. 1, and see FIG. 2 and FIG. 3), an objective lens 15a, of a finder optical system, forming a part of a finder unit 15 (not shown in FIG. 1, and see FIG. 2 and FIG. 3), and a flash window 16 forming a portion of a flash emission device.

The front cover 11, out of the external housing members, includes a lens opening 11a (see FIG. 4), as a subject image light beam entry window having an opening dimension that allows the subject image light beam incident on a first lens unit 14a to pass therethrough, at a predetermined location facing the first lens 14aa of the photographing lens unit 14. The lens opening 11a is generally rectangular with the long sides thereof aligned with an arrow X in FIG. 1.

The front sides of these components (the first lens 14aa, the objective lens 15a, the flash window 16, etc:) are outwardly exposed when the barrier member 13 is placed at the photographing position shown in FIG. 1. When the barrier member 13 is placed at the closed position, these components are covered with the barrier member 13 and are thus protected from the outside.

A shutter release button 17 is arranged on the top of the camera 1 at a location close to one end of the camera 1. The shutter release button 17 is interlocked with a shutter release switch (not shown) in the camera 1.

A variety of operation members (not shown) and a display device 27 (see FIG. 3) are arranged on the back of the camera 1.

The layout of major internal components arranged in the camera 1 is discussed below with reference to FIG. 2 and FIG. 3.

The major internal components in the camera 1 are the photographing lens unit 14 including the photographing optical system, the finder unit 15 including the finder optical system, and a plurality of electronic circuit boards.

The photographing lens unit 14, from among these components, is arranged at a predetermined location near the one end of the casing of the camera 1, namely, at a predetermined location in the vicinity of the right-hand end of the camera 1 when viewed from the front of the camera 1. The finder unit 15 is integrally arranged with the photographing lens unit 14, at a predetermined location above the photographing lens unit 14.

A plurality of electronic circuit boards arranged inside the camera 1 includes a main board 22 arranged at a predetermined location close to the front surface of the camera 1, an image pickup board 23 arranged at a predetermined location along one end of the camera 1, and bearing an image pickup device 23a as subject image capturing means thereon, an interconnection board 24 for connecting the image pickup board 23 to the main board 22, an external interface board 25 on which a variety of connection terminals 25a for connecting the camera 1 with external peripheral devices is mounted, and a stroboscopic power supply board 26 arranged behind the main board 22 in a location corresponding to substantially the center of the main board 22.

The main board 22 is arranged in the predetermined location close to the front surface of the camera 1 as already discussed, and is partly cut away to form a cutout portion 22d. The cutout portion 22d is made to assure space accommodating the photographing lens unit 14, the finder unit 15, etc.

A memory card drive 22b is mounted on the surface of the main board 22 (on the front side of the camera 1) in the vicinity of the end portion thereof opposite from the other end where the cutout portion 22d is formed. The memory card drive 22b detachably load and unload the recording medium to the camera, which is for storing video data etc. captured by the camera 1, and may be a thin planar card memory (not shown). The memory card drive 22b stores (writes) video data onto the card memory loaded thereinto in a predetermined format and reads the video data from the card memory.

The main power switch 28 is mounted on the main board 22 facing the front side of the camera 1. The main power switch 28, which is interlocked with the movement of the barrier member 13 in the direction represented by the arrow X in FIG. 1 as already discussed, turns on and off the power supply of the camera 1.

The image pickup board 23 is arranged on the one side of the camera 1 as already discussed, and bears electronic components such as the image pickup device 23a, etc. thereon. The image pickup board 23 is integrated with the photographing lens unit 14 through the image pickup device 23a in a unitary structure.

The interconnection board 24 connects the image pickup board 23 and the main board 22. The image pickup board 23 is connected to the interconnection board 24 using a predetermined flat cable 23b, etc., and the main board 22 and the interconnection board 24 are respectively provided with the interconnect connectors 22a and 24a. The image pickup board 23 is thus connected to the main board 22 via the interconnect connectors 22a and 24a and the interconnection board 24.

The interface board 25 is a small circuit board on which electronic components such as connection terminals 25a for connecting the camera 1 to external peripheral devices using an interconnect cable are mounted. The external peripheral devices may include a power supply interface fed with power from an external power supply unit, in addition to a USB (Universal Serial Interface) compatible external recording device, an external display or an external recording device having a video signal interface receiving a video output signal.

The interface board 25 is connected to the main board 22 through cable members (not shown) such as predetermined lead wires for conducting electrical signals.

Mounted on the stroboscopic power supply board 26 is a power supply circuit which controls a power supply battery 18a held in a battery holder 18 to be discussed later, or power supplied from an external power supply connection terminal of the connection terminals 25a mounted to the above-mentioned interface board 25. Also mounted on the stroboscopic power supply board 26 is a stroboscopic circuit for controlling a flash emission device. A stroboscopic capacitor 26b for storing electricity for causing the emitter 16 of the flash emission device to flash is connected to the stroboscopic power supply board 26 through a cable member 26a.

The stroboscopic power supply board 26 and the main board 22 are respectively provided with interconnect connectors 26c and 22c, and the two boards are connected to each other through the interconnect connectors 26c and 22c.

The battery holder 18 for housing a plurality of power supply batteries 18a serving as a main power supply is arranged on a predetermined location close to one end of the camera 1 within the casing of the camera 1, on the left-hand side of the camera 1 when viewed from the front of the camera 1. The battery holder 18 includes electrical members (not shown) such as battery contacts for receiving power supplied by the power supply batteries 18a. These electrical members are connected to the above-mentioned stroboscopic power supply board 26 using typically available connection means (not shown). In this way, the power of the power supply batteries 18a is fed to the stroboscopic power supply board 26.

The display device 27 such as a liquid-crystal display (LCD) is mounted at a predetermined location within the casing of the camera 1 substantially in the center on the back of the camera 1. A display board (not shown), on which a display circuit for controlling the display device 27 is mounted, is arranged in the vicinity of the display device 27. The display device 27 is connected to the main board 22 through the display board.

The photographing optical system arranged in the photographing lens unit 14 in the camera 1 of this embodiment is discussed below.

Figure 4:
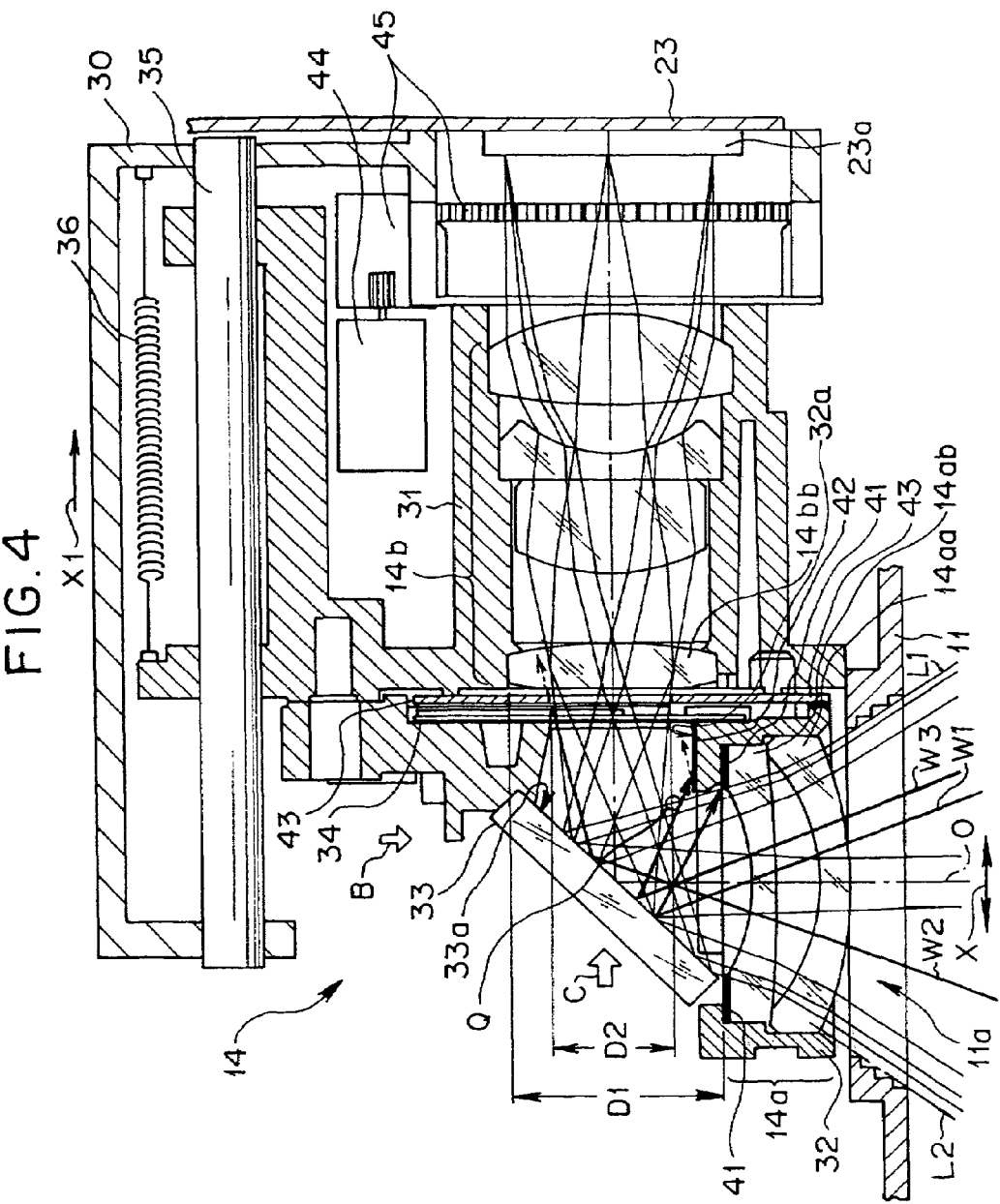
FIG. 4 is a sectional view of the internal structure of a photographing optical lens unit of the camera illustrated in FIG. 1, taken along line IV-IV in FIG. 2.

FIG. 4 is a cross-sectional view of the internal structure of the photographing lens unit 14 in the camera 1 of this embodiment, taken along line IV-IV in FIG. 2. FIG. 2 illustrates members closely related to the present invention, namely, mainly the layout of the photographing optical system and components arranged in the optical path thereof, and components loosely related to the present invention, for example, some components in the photographing lens unit 14, are not shown for simplicity of the drawing.

Referring to FIG. 4, the photographing optical system formed of a plurality of lenses is arranged in the photographing lens unit 14 of the camera 1 of this embodiment.

The photographing optical system includes the plurality of lenses, and a reflective mirror 33 as reflective means for bending the optical axis O of the photographing optical system arranged in the optical path of these lenses into a desired direction by 90 degrees (approximately at a right angle).

The plurality of lenses includes two lenses (a first lens 14aa and a second lens 14ab) forming the first lens unit 14a arranged at a predetermined location closer to the subject end than the reflective mirror 33, and four lenses (a third lens 14bb and other lenses) forming a second lens unit 14b arranged at a predetermined location closer to the image pickup device 23a than the reflective mirror 33. In this case, the frontmost lens of the first lens unit 14a arranged on the camera 1 closer to the subject end than the reflective mirror 33 is the first lens 14aa. A lens of the first lens unit 14a closest to the reflective mirror 33 is the second lens 14ab. A lens of the second lens unit 14b, arranged on the side of the image pickup device 23a with respect to the reflective mirror 33, closest to the reflective mirror 33 is the third lens 14bb.

The first lens unit 14a is held by a retainer member 32. The first lens unit 14a is mounted at a predetermined location within the casing of the camera 1 with the optical axis thereof substantially perpendicular to the front plane of the camera 1. The first lens 14aa of the first lens unit 14a held by the retainer member 32 is placed immediately behind the lens opening 11a of the front cover 11.

The reflective mirror 33 is arranged substantially at 45 degrees with respect to the optical axis behind the first lens unit 14a. The reflective mirror 33 is supported by an unshown fixing member from behind. The reflective surface 33a of the reflective mirror 33 faces the image pickup device 23a.

The subject image light beam incident on the lens opening 11a is transmitted through the first lens unit 14a, and is reflected from a reflective surface 33a of the reflective mirror 33. The optical axis is thus bent at about 90 degrees (approximately at a right angle). In this way, the subject image light beam travels to the second lens unit 14b, is transmitted through the second lens unit 14b, and is guided to the photoreceiving surface of the image pickup device 23a.

The reflective mirror 33, installed in the optical path of the photographing optical system formed of the first and second lens units 14a and 14b, serves as a so-called bending optical system for bending the optical path.

Figure 5:
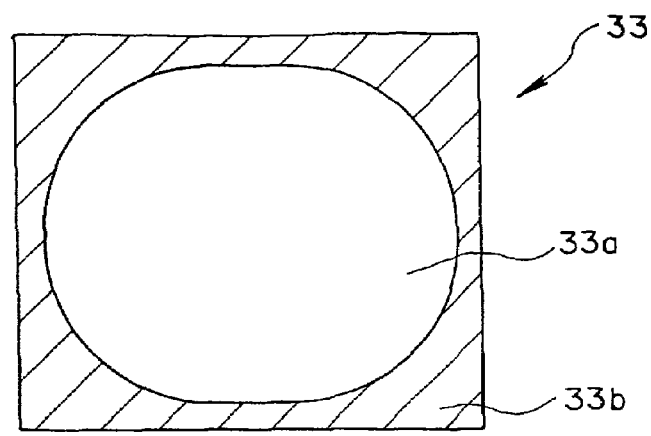
FIG. 5 is a plan view illustrating the reflective surface of a reflective mirror, taken out of the components of the photographing optical system in the camera of FIG. 1.

An unwanted ray-of-light reflection prevention member 33b as unwanted ray-of-light reflection prevention means (see FIG. 5) for preventing rays of light from being reflected is mounted on a region, other than the region on which the subject image light beam to enter the reflective mirror 33 is incident, in the reflective surface 33a as the reflective means at the reflective mirror 33. FIG. 5 illustrates the reflective mirror 33 only taken out of the components in the photographing optical system in the camera 1 of the present invention with the side of the reflective surface 33a of the reflective mirror 33 shown.

Referring to FIG. 5, the reflective mirror 33 has the reflective surface 33a in a predetermined area substantially in the center thereof facing the first lens unit 14a and the second lens unit 14b. The unwanted ray of light reflection prevention member 33b is formed at a predetermined location near the periphery of the reflective mirror 33, other than the location of the reflective surface 33a. The reflective surface 33a as the reflective means of the reflective mirror 33 is arranged only on the region on which the light beam for forming the subject image (the subject image light beam) is incident.

A shutter diaphragm unit 34 is arranged in the optical path of the ray of light bent by the reflective mirror 33, in the vicinity of the reflective mirror 33. The shutter diaphragm unit 34 includes a shutter member and a diaphragm member for controlling the incident light quantity by limiting the subject image light beam incident on the photographing optical system.

The second lens unit 14b is arranged behind the shutter diaphragm unit 34. As already described, the second lens unit 14b includes the four lenses. The four lenses are arranged side by side predetermined positions in parallel with respect to the front surface of the camera 1. Each lens is supported at the predetermined position thereof by a lens barrel member 31.

The image pickup device 23a is secured behind the second lens unit 14b. As already discussed, the image pickup device 23a is mounted on the image pickup board 23. In this way, the subject image light beam entering through the lens opening 11a into the photographing lens unit 14, is transmitted through the first lens unit 14a, the reflective mirror 33, the shutter diaphragm unit 34, and the second lens unit 14b, and then reaches the image pickup device 23a. The subject image is thus formed on the photoreceiving surface.

The photographing optical system in the photographing lens unit 14 thus constructed is movably disposed as represented by the arrow X in FIG. 4 with a focus adjustment mechanism 45 including a motor 44. The focus adjustment operation is thus performed.

In this embodiment, the image pickup device 23a and the image pickup board 23 are integrally secured to stationary members (a frame member) in the photographing lens unit 14 within the casing of the camera 1.

The focus adjustment operation in the camera 1 of this embodiment is performed by varying the distance between the reflective mirror 33 and the image pickup device 23a in response to the distance to the subject with the above-mentioned focus adjustment mechanism 45.

Movable members including the reflective mirror 33, the first lens unit 14a, and the second lens unit 14b and the retainer member 32 and the lens barrel member 31 respectively supporting the first and second lens units 14a and 14b in the photographing lens unit 14 are moved with respect to the stationary member (the frame member) in the photographing lens unit 14 in the arrow X direction shown in FIG. 4 in step with the focus adjustment operation.

The movable members of the photographing lens unit 14 are integrated into a unitary body, and the integrated movable members are suspended by a guide shaft 35 supported in an arm 30 formed in the stationary member (the frame member) of the photographing lens unit 14. A compressible elastic member 36 such as a coil spring is loaded between the movable members and the stationary member (the frame member). In this way, an elastic force continuously works on the movable members of the photographing lens unit 14 in the arrow X1 direction as shown in FIG. 4.

The focus adjustment mechanism 45 including the motor 44 for integrally moving the movable members of the photographing lens unit 14 is arranged between the proximal end of the lens barrel member 31 and the image pickup device 23. In response to a predetermined command signal such as a command signal from the shutter release switch (not shown) interlocked with the shutter release button 17, the focus adjustment mechanism 45 starts a predetermined focus adjustment operation.

When the predetermined focus adjustment mechanism 45 moves the photographing optical system in the photographing lens unit 14 of the camera 1 in a predetermined direction for focus adjustment, the optical axis of the first lens unit 14a moves in a predetermined direction (in the arrow X direction shown in FIG. 4).

In the camera 1 of this embodiment, the opening shape of the lens opening 11a corresponding to the first lens unit 14a is rectangular with the long sides thereof aligned with the direction represented by the arrow X. Specifically, the lens opening 11a as the subject image light beam window has the opening dimension that permits the subject image light beam incident on the first lens unit 14a to be transmitted therethrough. Furthermore, the dimensions of the long sides of the rectangular lens opening 11a are determined to permit the subject image light beam incident on the first lens unit 14a to be transmitted therethrough, regardless of when the distance between the reflective mirror 33 and the image pickup device 23a, to be varied in response to the focus adjustment operation, is shortest or when the distance between the reflective mirror 33 and the image pickup device 23a is longest. Referring to FIG. 4, each of the light beam L1 when the reflective mirror 33 and the image pickup device 23a is shortest and the light beam L2 when the reflective mirror 33 and the image pickup device 23a is longest is transmitted through the lens opening 11a.

The length of the long sides of the lens opening 11a is set in accordance with the range within which the first lens unit 14a is moved.

In a general tendency, the shorter the focal length set by the photographing optical system, in other words, the wider the angle of view, the shorter the distance of travel of the lenses in the photographing optical system in the focus adjustment operation. It is widely known that the distance of travel of the lens required to perform the focus adjustment operation from infinity to the nearest range is short with a wide-angle lens.

It is also known that if the nearest range to which the focus adjustment operation is performed is set to be slightly longer, for example, to about 1 m, the focus adjustment operation from infinity to the nearest range is performed with a substantially short distance of travel of the lens compared with the case in which the nearest range is set shorter than 1 m.

In this embodiment, the optical axis O of the above-mentioned first lens unit 14a is moved with respect to the casing of the camera 1 in the X direction as illustrated in FIG. 4. In view of the above point, the focus adjustment operation of the photographing optical system can be performed with the lens travel distance set to be sufficiently short.

The photographing optical system having a bending optical mechanism thus constructed is subject to the generation of unwanted rays of light which become the cause of ghost and flare contributing nothing to the formation of the subject image, caused by light beams reflected in unintended directions from the reflective mirror 33.

It is known that the photographing optical system having a bending optical mechanism with the reflective mirror 33 in this embodiment is more susceptible to unwanted rays of light than the conventional photographing optical system in which the optical axis is linear.

The photographing lens unit 14 in the camera 1 of this embodiment has the following mechanism to control unwanted rays of light generated in the vicinity of the reflective mirror 33.

Figure 6:
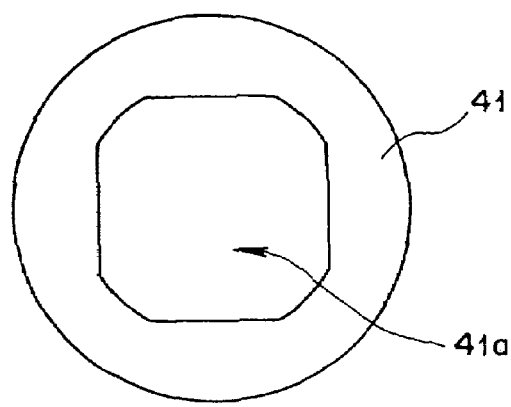
FIG. 6 is a plan view illustrating the shape of a first reflection prevention member viewed from an arrow B in FIG. 4.

Specifically, a first reflection prevention member 41 as first diaphragm means having the shape as shown in FIG. 6 is arranged on the surface of the second lens 14ab of the first lens unit 14a arranged closest to and facing the reflective mirror 33. The first reflection prevention member 41 is a thin circular member having a diameter substantially equal to that of the second lens 14ab. The first reflection prevention member 41 has, in the center thereof, a substantially square cutout portion 41a with the four corners thereof rounded. FIG. 6 shows the shape of the first reflection prevention member 41, viewed from the arrow B in FIG. 4.

The first reflection prevention member 41 blocks unwanted rays of light other than the light beam that contributes to the formation of the subject image on the image-forming surface of the image pickup device 23a, for example, blocks an oblique ray of light designated by a reference symbol W1 in FIG. 4. The surface of the first reflection prevention member 41 has a reflection prevention finish such as a matte finish.

Third diaphragm means is arranged in the vicinity of the surface of the third lens 14bb of the second lens unit 14b closest to and facing the reflective mirror 33. The third diaphragm means blocks unwanted rays of light other than the light beam that contributes to the formation of the subject image, for example, blocks an oblique ray of light designated by a reference symbol W2 as shown in FIG. 4.

The third diaphragm means in this embodiment is formed of a third reflection prevention member 43 having an opening which limits a portion of the subject image light beam reflected from the reflective mirror 33, and allows only the light beam contributing to the formation of the subject image to be incident on the third lens 14bb. The third reflection prevention member 43 is arranged, between the third lens 14bb and the reflective mirror 33, in the vicinity of the surface of the third lens 14bb facing the reflective mirror 33. The shape of the third reflection prevention member 43 is substantially identical to that of the opening 41a of the first reflection prevention member 41.

In this arrangement, a small gap is yielded between the third reflection prevention member 43 and the third lens 14bb. A portion of the ray of light, transmitted through the opening of the third reflection prevention member 43 and incident on the third lens 14bb, may be reflected in the vicinity of the periphery of the third lens 14bb and may become unwanted reflections of light contributing nothing to the formation of the subject image.

In this embodiment, the diameter of the third lens 14bb (designated by a reference symbol D1 as shown in FIG. 4) is set to be larger than the inner diameter of the opening (designated by a reference symbol D2 as shown in FIG. 4) of the third diaphragm means (the third reflection prevention member 43). In this way, the third lens 14bb transmits the ray of light incident thereon through substantially the center thereof, while preventing a portion of the ray of light from being reflected from the peripheral portion thereof. Like the first reflection prevention member 41, the surface of the third reflection prevention member 43 has a reflection prevention finish such as a matte finish.

A second reflection prevention member 42 as second diaphragm means is arranged on a predetermined wall surface present in the space between the first lens unit 14a and the second lens unit 14b, namely, a wall surface 32a of the retainer member 32 holding the first lens unit 14a, which could receive light beams reflected from the reflective mirror 33. The second reflection prevention member 42 blocks an unwanted ray of light W3 that travels outside a predetermined position (designated by a reference symbol Q as shown in FIG. 4) at which the subject image light beam traveling from the first lens unit 14a to the reflective mirror 33 intersects the subject light beam reflected from the reflective mirror 33 and then traveling to the second lens unit 14b.

Figure 7:
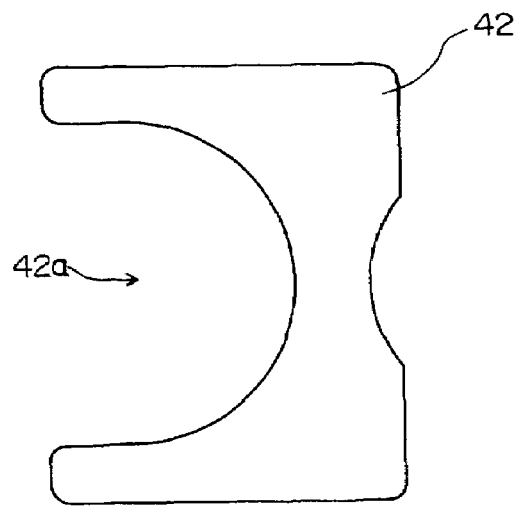
FIG. 7 is a plan view illustrating the shape of a second reflection prevention member viewed from an arrow B in FIG. 4.

The second reflection prevention member 42 is fabricated of a substantially U-shaped thin member having a cutout portion 42a on one side thereof as shown in FIG. 7. The semicircular cutout portion 42a is opened from substantially the center to the one end thereof. FIG. 7 shows the shape of the second reflection prevention member 42, viewed from the arrow B in FIG. 4.

The second reflection prevention member 42 thus formed blocks rays of light other than the light beam contributing to the formation of the subject image on the image formation surface of the image pickup device 23a, namely, an oblique ray of light W3 shown in FIG. 4. Like the first reflection prevention member 41, the surface of the second reflection prevention member 42 has a reflection prevention finish such as a matte finish.

As discussed above, in accordance with the first embodiment, the reflective mirror 33 is arranged in the optical path between the first lens unit 14a and the second lens unit 14b to bend the optical path of the subject image light beam transmitted through the first lens unit 14a by an approximately right angle toward the second lens unit 14b, and the subject image light beam transmitted through the second lens unit 14b is thus guided to the photoreceiving surface of the image pickup device 23a. The subject image is formed there. In this case, a minimum necessary light collection function is performed by a minimum number of lens elements in the first lens unit 14a that is arranged before the subject image light beam is bent by the reflective mirror 33. In addition, a sufficient focus adjustment function is performed with the photographing optical system moved in the arrow X direction shown in FIG. 4. In these arrangements, the thin design is introduced in the casing of the camera 1 in the fore-aft direction. A substantial improvement in portability of the camera 1 thus results.

To block or control unwanted rays of light, a plurality of diaphragm members (the first reflection prevention member 41, the second reflection prevention member 42, and the third reflection prevention member 43) are arranged at the predetermined location at which the subject image light beam is about to enter the reflective mirror 33, and at the location at which the subject image light beam reflected from the reflective mirror 33 is just output. The unwanted ray-of-light reflection prevention member 33b is arranged on the reflective surface 33a of the reflective mirror 33 to totally block or control the unwanted rays of light. A subject image light beam in a good state is easily obtained.

The camera 1 of this embodiment is a so-called digital still camera having the image pickup device 23a as the subject image capturing means. The present invention is not limited to this arrangement. The present invention is easily applied to an ordinary camera that uses a camera film as the subject image capturing means.

As described above, the camera having the photographing optical system with the bending optical mechanism including the reflective means in the optical path blocks an unwanted ray of light unnecessary to form the subject image, out of the incident light beams, thereby forming a subject image in an excellent state on the image-forming surface.

With the photographing optical system having the axis bending optical mechanism employed, the fore-aft dimension of the camera is reduced. The photographing optical system thus helps miniaturize the entire camera structure.

Second Embodiment

A second embodiment of the present invention is discussed below with reference to the drawings.

Figure 8:
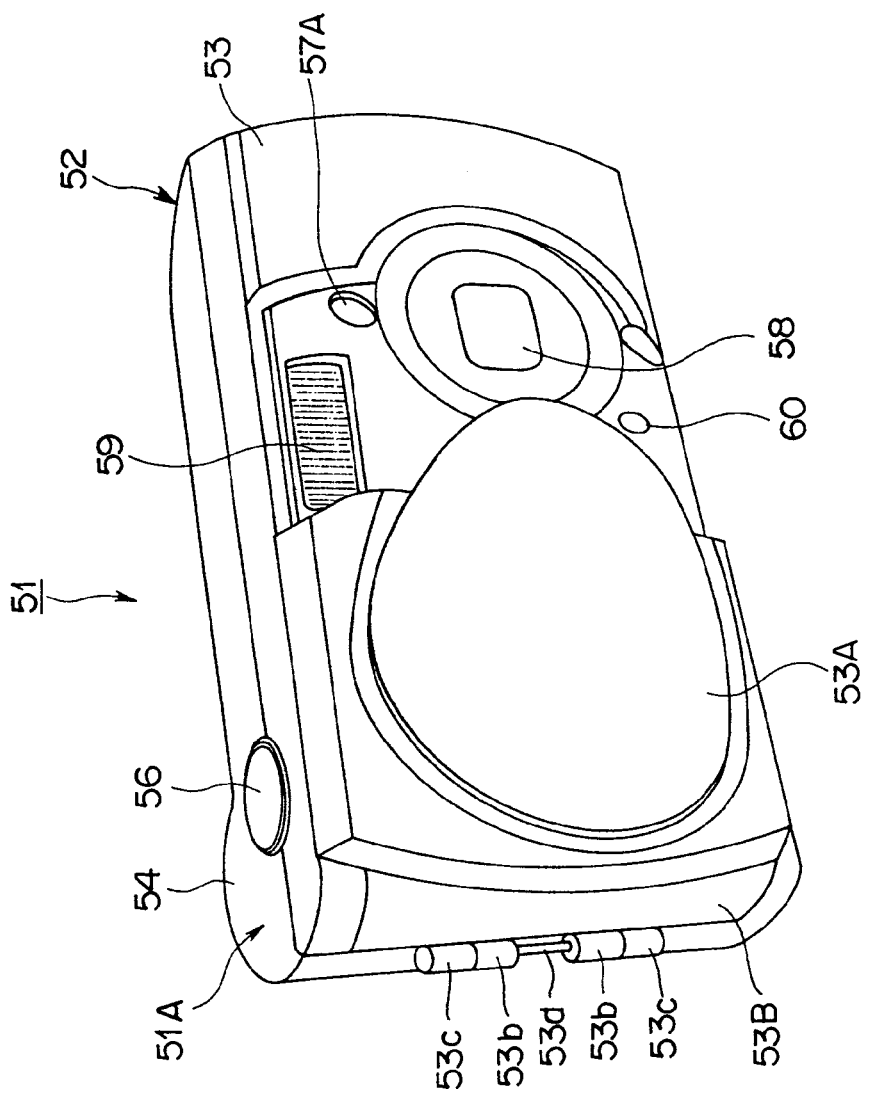
FIG. 8 is an external perspective view of the camera of the second embodiment of the present invention, viewed from the front thereof.
Figure 9:
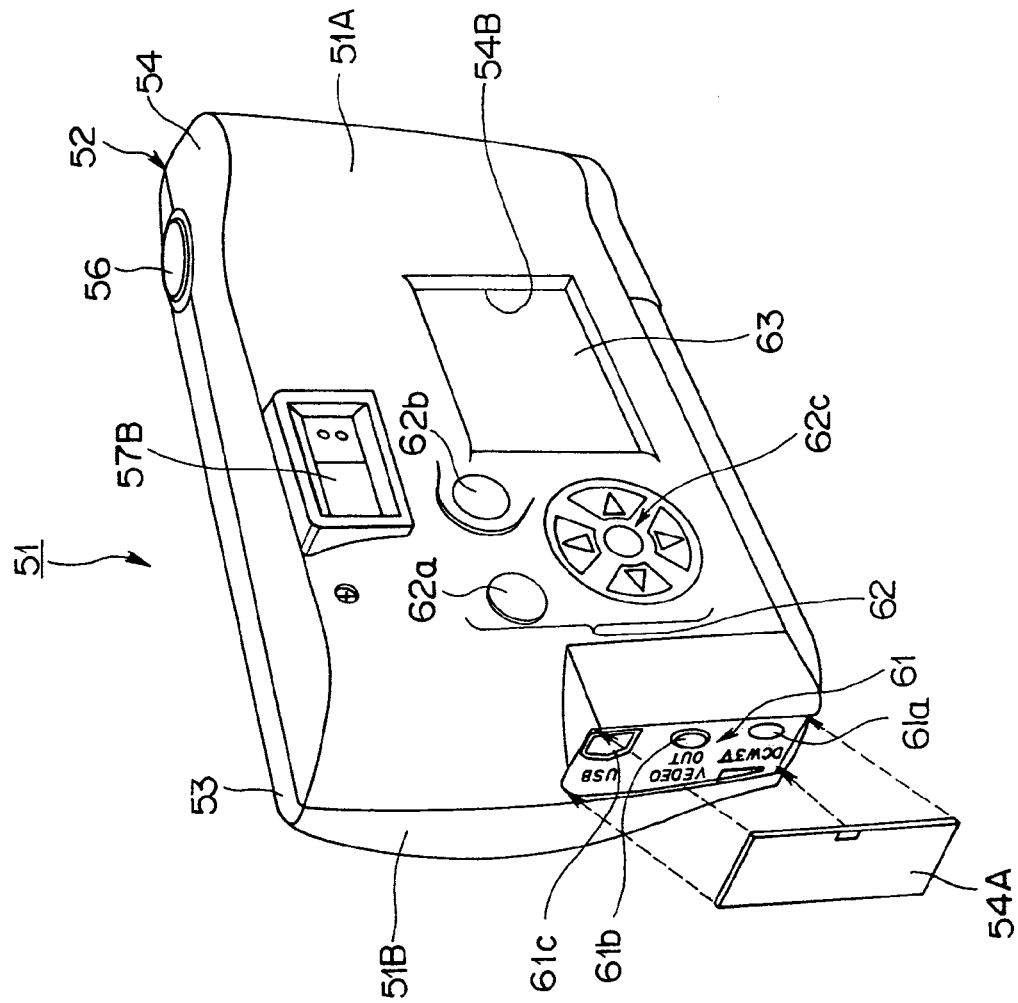
FIG. 9 is an external perspective view of the camera illustrated in FIG. 8, viewed from behind.
Figure 10:
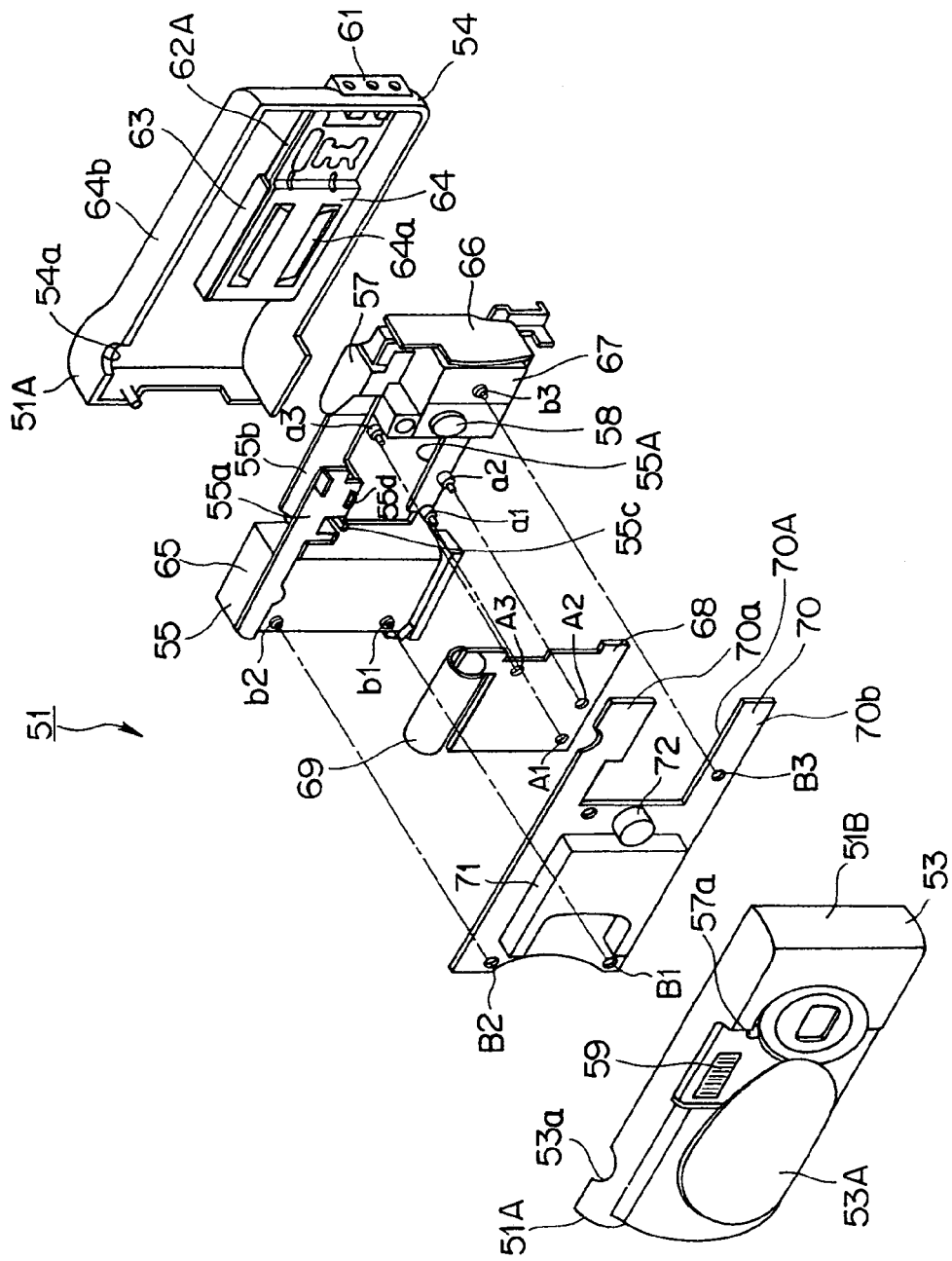
FIG. 10 is an exploded perspective view illustrating the internal structure of the camera of FIG. 8.
Figure 11:
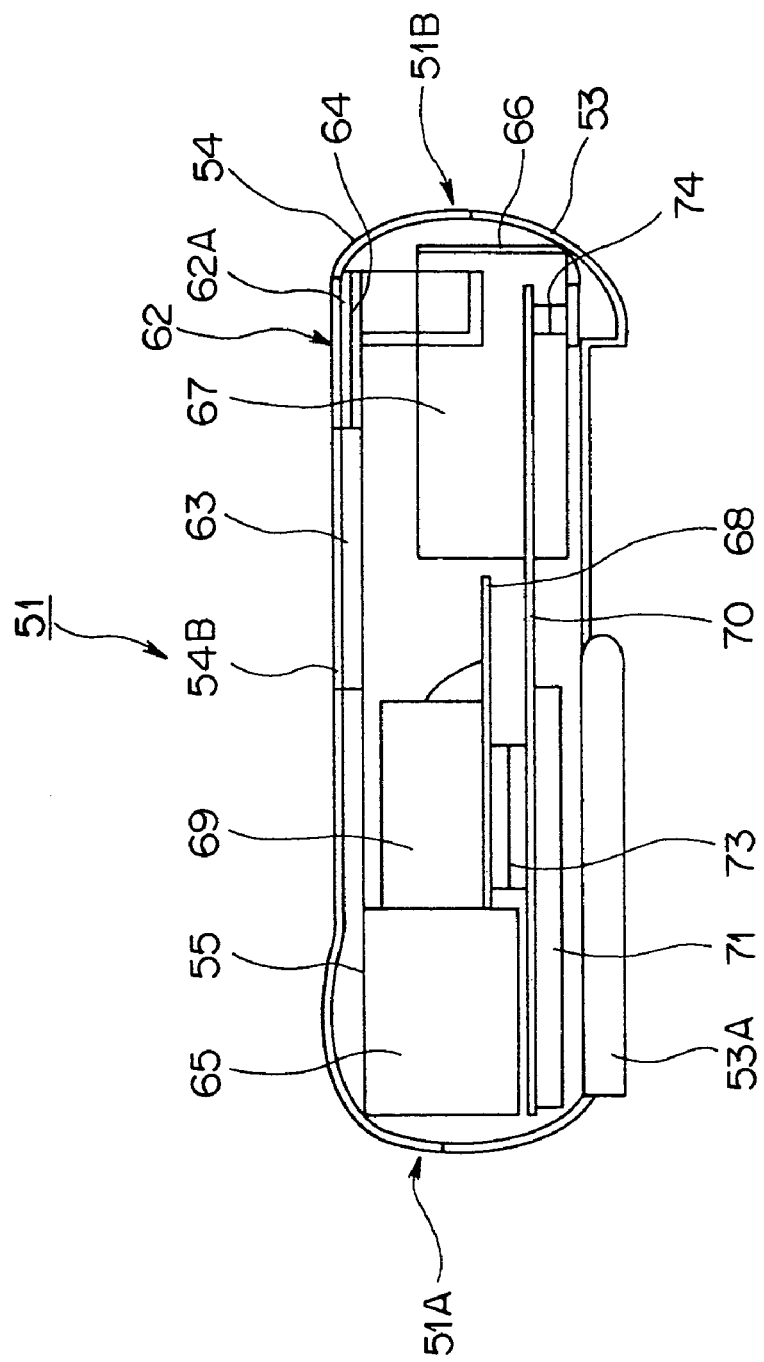
FIG. 11 illustrates the layout of the camera characteristic of the camera of the second embodiment.

FIG. 8 through FIG. 11 illustrate a camera in accordance with the second embodiment of the present invention, FIG. 8 is an external perspective view of the camera of the second embodiment of the present invention, viewed from the front thereof, FIG. 9 is an external perspective view of the camera viewed from behind, FIG. 10 is an exploded perspective view illustrating the internal structure of the camera of FIG. 8, and FIG. 11 illustrates a layout constituting the characteristic of the camera of this embodiment.

Referring to FIG. 8, the camera 51 of this embodiment includes mainly a casing 52 having a flat and elongated structure. The casing 52 is formed of a front side cover (hereinafter referred to as a front cover) 53 and a back side cover (hereinafter referred to as a back cover) 54 as outer housing members for sandwiching a chassis 55 on which optical members and electronic circuit components required to take picture, as will be discussed later, are mounted.

With the front cover 53 and the back cover 54 secured to each other, the casing 52 forms a first grip portion 51A near a release button 56 appearing on the left end thereof, and a second grip portion 51B arranged on the other end thereof (on the right end thereof as shown).

The first grip portion 51A is mainly formed as a part of the back cover 54. The corresponding portion on the back cover 54 becomes the thickest in the thickness of the flat configuration when viewed toward the length direction thereof. The thickest portion of the back cover 54 forms the first grip portion 51A, which can be firmly gripped by a user. This arrangement prevents the camera 51 from being trembled during photographing, and is appropriate for a one-handed picture taking operation. The user typically holds the camera 51 with the first and second grip portions 51A and 51B respectively gripped by both hands.

The release button 56 is arranged on the top surface of the first grip portion 51A of the casing 52. The release button 56 is switching means, and upon being pressed, the release button 56 executes the picture taking operation. The release button 56 is mounted on the chassis 55 to be discussed later, and is exposed through cutout portions 53a and 54a (see FIG. 10) respectively formed in the front cover 53 and the back cover 54, which are secured to each other.

A barrier main switch 53A is arranged on the front cover 53 of the front of the casing 52, and remains laterally slidable with respect to the front cover 53. When the barrier main switch 53A is moved in a leftward direction when viewed from the front of the camera as shown in FIG. 8, the barrier main switch 53A, interlocked with a power switch (not shown) arranged on a main board 70 within the camera 51, turns on the power supply of the camera 51.

While the camera 51 is not used during the carrying or keeping thereof, the barrier main switch 53A, interlocked with the power switch, is slid in a rightward direction when viewed from the front of the camera 51 as shown in FIG. 8, thereby turning off the power of the camera 51. In its position, the barrier main switch 53A covers and protects components such as a finder window 57A, a photographing lens 58, and a self-timer LED 60 arranged on one side of the front of the camera 51.

In the camera 51 of this embodiment, the above-mentioned finder window 57A and the photographing lens 58 in the photographing optical system, and components such as a stroboscopic light emission unit 59, and the self-timer LED 60 to be used in photographing are arranged on the front cover 53 on the right-hand side of the casing 52 when viewed from the front of the camera 51.

Arranged on the other side of the front cover 53, namely, the left-hand side of the front of the casing 52, when viewed from the front of the camera 51, is a media slot cover 53B which is opened and closed to the outside to load and unload a memory card as a recording medium for recording a captured picture video.

Two shaft locks 53b and 53b are formed on the base of the media slot cover 53B. The media slot cover 53B is closed or opened with a shaft 53d, supported by two shaft sockets 53c and 53c formed on the front cover 53, and engaged with the shaft locks 53b and 53b. As shown, the media slot cover 53B is held in a closed state with unshown lock means.

The media slot cover 53B is opened and closed when a memory card as a recording medium, such as a smart medium, is loaded into or unloaded from a media slot (a media socket) arranged at a corresponding location inside the casing 52.

Arranged on the back cover 54 forming the casing 52 are a finder 57B, an operation switch group 62, and a display 63 as shown in FIG. 9.

The finder 57B is mounted on near the top edge of the back cover 54 close to the second grip portion 51B. The user looks into the finder 57B to observe a subject.

The operation switch group 62 is arranged on the back cover 54 near the second grip portion 51B of the casing 52. The operation switch group 62 includes a plurality of switches 62a to 62c to perform a variety of modes. Each of the plurality of switches 62a to 62c may be fabricated of a push-type switch. The switch 62a is a menu selection switch for selecting a menu of a photograph mode of the camera 51. The switch 62b is an LCD drive switch for turning on and off the display 63. An operation switch 62c, including at least four switching elements, performs detailed settings for the determined photograph mode and other settings. For example, upper and lower switching elements may perform electronic zoom-in and zoom-out operations, and right and left switching elements may select a stroboscopic light emission mode and may operate a macro photograph mode (a close-up photograph mode).

The display 63 is arranged near the operation switch group 62. Like the operation switch group 62, the display 63 is arranged on the back cover 54 near the second grip of the casing 52. For example, the display 63 may be manufactured of a transmissive type TFT LCD, and its screen is exposed through a cutout portion 54B in the back cover 54. The display 63 displays a photographed image formed based on a captured video signal or a recorded video signal, in addition to a various types of setting information and other photographing information etc.

A connection terminal bank 61 is arranged on the bottom portion of the second grip portion 51B of the back cover 54. The connection terminal bank 61 includes DC power supply terminals 61a to receive DC power, video output terminals 61b to output a captured video signal to an external device, and USB terminals 61c. The connection terminal cover 54A is detachably fitted to cover the connection terminal bank 61.

The internal structure of the camera 51 of this embodiment will be detailed with reference to FIG. 10.

The camera 51 of this embodiment features the adoption of a bending type photographing optical system to effectively incorporate a thin design thereinto.

The bending type photographing optical system refers to an optical system in which the subject image light beam (an incident light beam) transmitted through the photographing lens 58 arranged in the front cover is bent at an approximately right angle by the reflective mirror, and is formed on the image-forming surface of a CCD arranged on the end of the elongated casing 52. Unlike the conventional optical system, the bending type photographing optical system bends the subject image light beam at an approximately right angle with respect to the optical axis of the photographing lens to form the subject image light beam on the CCD. The bending type photographing optical system thus provides an advantage that the dimension of the camera 51 in the optical axis, namely, the depth dimension of the camera 51 is reduced.

A lens unit 67 incorporating such a bending type photographing optical system is arranged on the end of right-hand side portion of the chassis 55 sandwiched between the front cover 53 and the back cover 54 as shown in FIG. 10.

The lens unit 67 has the photographing lens 58 disposed on the front thereof, and has in its inside a reflective mirror for reflecting and thus bending the subject image light beam, a plurality of optical lens units, an AF (auto focusing) drive mechanism including a drive motor for performing an AF operation, and an image pickup board 66 having a CCD.

The image pickup board 66, including the CCD and a processing circuit for converting the subject image formed on the CCD into a video signal, is mounted on one side of the lens unit 67. The two opposed sides of the image pickup board 66 are arranged to be respectively close to the front side and the back side of the casing 52 when the front cover 53 and the back cover 54 are assembled together.

The subject image light beam from the photographing lens 58 is reflected and bent by an unshown reflective mirror and is then formed on the unshown CCD mounted on the image pickup board 66. The formed subject image is converted into a video signal through the processing circuits (not shown) of the image pickup board 66, and is then fed to major processing circuits on the main board 70 as shown.

An optical finder unit 57 is mounted on the lens unit 67. Along with the lens unit 67, the optical finder unit 57 is mounted on the chassis 55 on the right-hand side thereof when viewed from the front of the camera 51.

A battery holder 65 for housing a power supply battery serving as a power supply for the camera 51 is integrally formed with the other end of the base portion of the chassis 55. Specifically, the battery holder 65 is arranged on the chassis 55 in a location on the other side of the location of the lens unit 67. The battery holder 65, formed on the back side of the chassis 55, has a minimum depth size capable of housing the power supply battery.

The chassis 55 has, in the center thereof between the battery holder 65 and the lens unit 67, a cutout portion 55A. Formed above the cutout portion 55A are a holding wall 55a and a seat 55b for holding a capacitor 69.

The camera 51 of this embodiment has a stroboscopic light emission function. The capacitor 69 is required to store much charge for flash emission. To promote thin design, the manner of mounting of the capacitor 69 is also important.

In this embodiment, the capacitor 69 is engaged in the lying position thereof within the holding wall 55a and the seat 55b integrally formed with the chassis 55. With the capacitor 69 engaged, the spacing between the holding wall 55a and the seat 55b is almost equal to the depth size of the battery holder 65. This arrangement greatly contributes to the thin design of the camera 51.

The capacitor 69 is mounted on the upper side of a power board 68 on which a charging circuit for storing charge in the capacitor 69 and a plurality of circuits such as a trigger circuit for triggering a stroboscopic light emission unit 69 are fabricated, and is thus electrically connected to these circuits.

When the power board 68 is assembled onto the chassis 55, the capacitor 69 seated on the upper portion thereof is engaged into the holding wall 55a and the seat 55b while the power board 68 is pivoted toward the cutout portion 55A of the chassis 55. In this case, the power board 68 is positioned with a mounting hole A1 and alignment holes A2 and A3 respectively being engaged into mounting projection a1 and alignment projections a2 and a3 arranged at the respective positions of the chassis 55. Furthermore, the top edge of the power board 68 is pressed against an abutment portion 55d formed on the outside of the holding wall 55a until it is locked by a claw of an elastic hook 55c. The power board 68 is thus positioned in alignment.

The power board 68 is mounted to the chassis 55 in a manner that permits slight degrees of vertical and horizontal looseness so that the power board 68 is easily connected to a main board 70 through connectors 73 (see FIG. 11).

In this embodiment, the main board 70 for the camera 51 is mounted on the chassis 55 so that the main board 70 overlaps the entire area of the power board 68.

The main board 70 has a horizontally aligned U-shaped cutout portion with a pair of opposing first and second lip portions 70a and 70b, which abut from above and from below the lens unit 67, and fully covers the front of the chassis 55. In other words, the main board 70 is sized and configured in a shape appropriate for miniaturization and thin design, and is mounted in a location also appropriate for miniaturization and thin design. The main board 70 is maximized in area with respect to the compact camera 51.

Mounted on the main board 70 are a variety of circuits, at appropriate locations, such as a control circuit for performing substantially all functions of the camera 51, an interlock switch (not shown) which is interlocked with the barrier main switch 53A, the self-timer LED, and a buzzer 72 which generates its sound in response to a camera operation.

In this embodiment, a media slot (a media socket) 71, through which a memory card as a recording medium, such as a smart medium, is installed in a detachable manner, is on the left-hand side of the main board 70 when viewed from the front of the camera 51.

To mount the main board 70 on the chassis 55, the main board 70 is positioned in alignment, with respective mounting projections b1 and b2 and alignment projection b3 arranged at respective positions on the chassis 55 inserted into respective mounting holes B1 and B2 and alignment hole B3, with the power board 68 being attached onto the chassis 55.

The main board 70 is electrically connected to the power board 68, with a connector (not shown) mounted on the back surface of the main board 70 being mated to a connector mounted on the surface of the power board 68. Since the power board 68 is tentatively fixed with a slight degree of looseness permitted, the mating of the connectors is easily performed. Screws are driven around the mounting projections b1 and b2 of the chassis 55, securing the power board 68 and the main board 70 to the chassis 55.

With the main board 70 secured to the chassis 55, a battery holder 65 comes behind the media slot 71. The battery holder 65 and the media slot 71 are arranged on the left-hand side of the chassis 55 when viewed from the front of the camera 51. The power board 68 is arranged behind the center portion of the main board 70.

A display 63 and a switch board 62A are arranged on the inner surface of the back cover 54 which clamps the chassis 55 against the front cover 53 as shown in FIG. 10. The display 63 and the switch board 62A are arranged on the right-hand side of the back cover 54 when viewed from the front of the camera 51, namely, on the corresponding side of the lens unit 67 of the chassis 55 that is accommodated in the back cover 54.

A switch board 62A is electrically connected to the operation switch group 62 arranged on the back surface of the back cover 54. The operation switch group 62 generates an operation signal in response to the operation of each switch, and feeds it to the main board 70.

A metal plate 64 is arranged to cover the display 63 and the switch board 62A. The back light for the display 63 is driven by a high voltage. The metal plate 64 controls, on other circuits, the effect of noise that could be generated by the back light driven by the high voltage. A pair of plate springs 64a and 64b is formed on the metal plate 64. With their elastic force, the plate springs 64a and 64b absorb the looseness arisen between the back cover 54 and the display 63 when both components are assembled to each other. Contacts, although not shown, are extended from the top edge of the metal plate 64, and grounding is established more easily using the contacts than in the conventional art.

The chassis 55 thus constructed is sandwiched between the front cover 53 and the back cover 54, and then this assembly is screwed from behind the back cover 54 using screws. The assembly of the camera 51 of this embodiment is now complete.

Referring to FIG. 11, in the camera 51 of this embodiment, the battery holder 65 and the media slot 71 are arranged close to the first grip portion 51A in the flat casing 52, the lens unit 67 is arranged close to the second grip portion 51B opposed to the side of the first grip portion 51A, and the operation switch group 62 and the switch board 62A are arranged behind the lens unit 67.

The battery holder 65 is arranged in alignment with the direction of depth of the flat casing 52 that accommodates the first grip portion 51A as shown. The media slot 71, with the main board 70 sandwiched between itself and the battery holder 65, is also arranged in alignment with the direction of depth of the flat casing 52 that accommodates the first grip portion 51A.

At least one of the operation switch group 62 and the display 63 is stacked on the lens unit 67 in the direction of depth of the casing 52. The operation switch group 62 and the display 63 are arranged not to overlap each other in a projection plane of the casing 52 when viewed from the subject end.

The lens unit 67 is arranged not to overlap any of the battery holder 65 and the media slot 71 in a front projection plane of the casing 52 when viewed from the subject end.

Referring to FIG. 11, a reference numeral 74 designates a connector for electrically connecting the main board 70 to the image pickup board 66. A reference numeral 73 designates a connector for electrically connecting the main board 70 to the power board 68.

In accordance with this embodiment, the optical system itself is thinned by mounting the lens unit 67 incorporating the bending optical system. This arrangement allows one of the operation switch group 62 and the display 63 to overlap the lens unit 67 from behind. Furthermore, by arranging the battery holder 65 and the media slot 71 in the casing 52 on the side of the first grip portion 51A, the entire camera is easily thinned and the projection area of the casing 52 is minimized when viewed from the front thereof.

The power supply battery, which is a very important component, is housed in the battery holder 65 arranged in the first grip portion 51A. The power supply battery assures weight balance with the camera 51 held in the hands, thereby substantially improving the ease of use.

In its manufacturing process, the camera 51 is assembled by clamping the chassis 55 having the major components already mounted thereon, between the front cover 53 and the back cover 54. This arrangement simplifies the assembly steps, thereby improving assembly yields. With the simplified assembly steps, manufacturing costs are substantially reduced, leading to a low-cost camera 51.

(Modifications)

In the operation of the camera 51, the user maybe photographs a subject with the camera 51 with the first grip portion 51A held by one hand only. In such an operation, a variety of operational steps can be performed with the first grip portion 51A gripped in one hand. If the LCD of the display 63 is further thinned in the present invention and the operation switch group 62 is arranged in the vicinity of the first grip portion 51A, one-handed operation becomes possible. Such an embodiment is illustrated in FIGS. 12 and 13.

Figure 12:
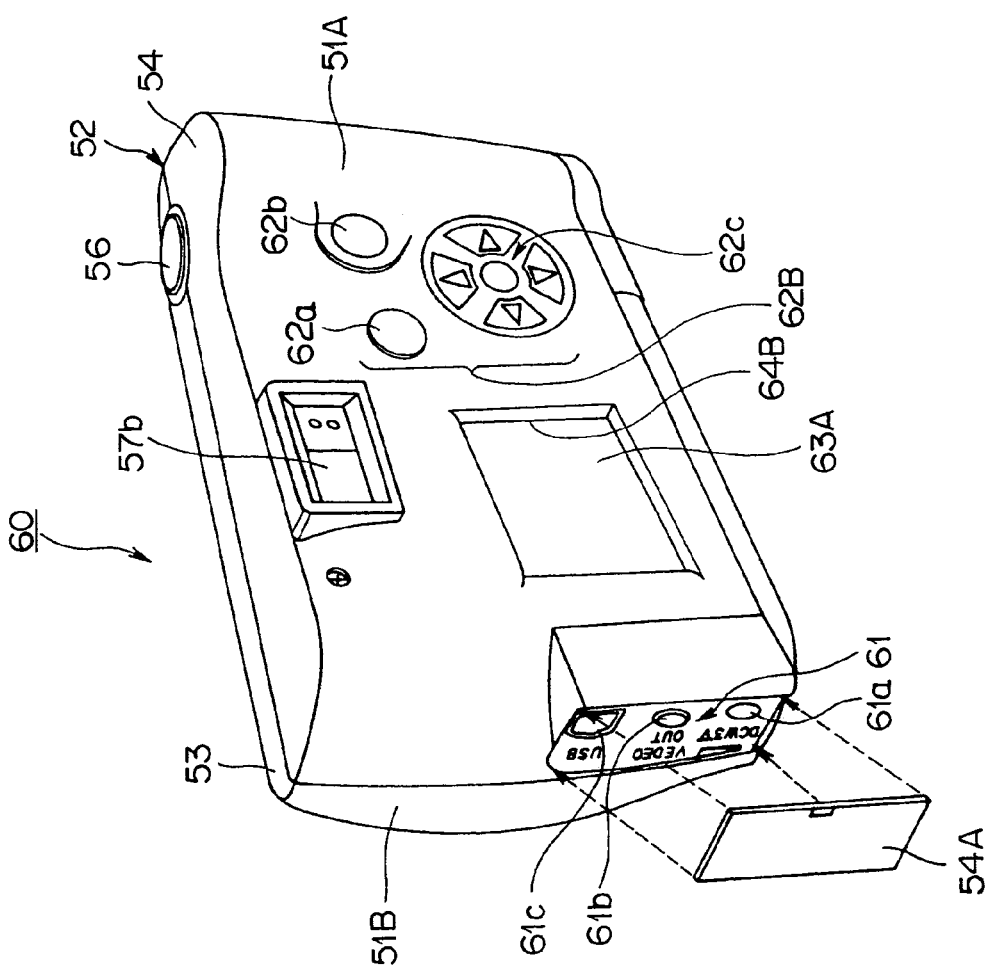
FIG. 12 is a perspective view illustrating the external structure of a camera in accordance with a modification of the second embodiment of the present invention, viewed from behind the camera.
Figure 13:
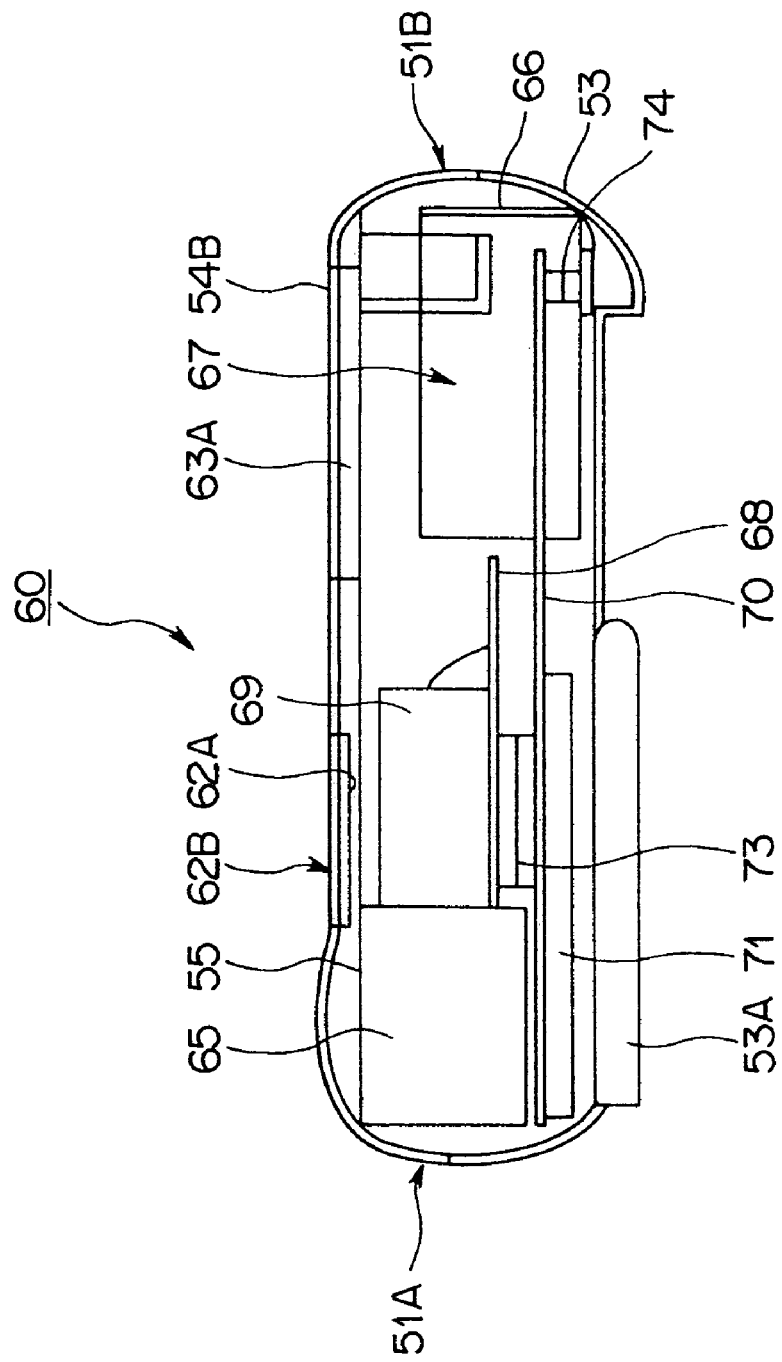
FIG. 13 illustrates the layout of the camera characteristic of the modification of the second embodiment of the present invention.

FIGS. 12 and 13 illustrate a modification of the second embodiment of the camera of the present invention. FIG. 12 is a perspective view illustrating the external structure of the camera in accordance with the modification of the second embodiment of the present invention, viewed from behind the camera, and FIG. 13 is a sectional view of the camera, illustrating the layout of the camera characteristic of the modification of second embodiment of the present invention. In FIGS. 12 and 13, components identical to those discussed in connection with the camera 51 of the above-reference embodiment are designated with the same reference numerals, and the discussion thereof is omitted here, and difference only is discussed below.

In accordance with the modification of the second embodiment, an even thinner LCD display 63A is used instead of the display 63 used in the preceding embodiment. The display 63A is arranged behind the bending type optical lens unit 67, and an operation switch group 62B is arranged on the back cover 54 close to the first grip portion 51A.

The general construction of a camera 60 of this embodiment is identical to that of the camera 51 of the preceding embodiment. Referring to FIG. 12, the operation switch group 62B is arranged on the back cover 54 close to the first grip portion 51A of the casing 52, and the thin type display 63A is arranged on the back cover 54 close to the second grip portion 51B on the opposite side of the casing 52.

The layout of the camera 60 is discussed in detail referring to FIG. 13. In the flat casing 52 of the camera 60, the battery holder 65, the media slot 71, and the operation switch group 62B including the switch board 62A are arranged close to the first grip portion 51A, and the lens unit 67 is arranged close to the second grip portion 51B opposite from the side of the first grip portion 51A, and the display 63A is arranged behind the lens unit 67.

The display 63A, which is improved to be thinner, is stacked on the lens unit 67 in the direction of depth of the casing 52. As in the preceding embodiment, the display 63A and the operation switch group 62B are arranged not to overlap each other in the projection area when viewed from the subject. The rest of the construction of the second embodiment remains unchanged from that of the preceding embodiment.

The modification of the second embodiment provides the same advantages as those of the preceding embodiments. The operation switch group 62B, arranged near the first grip portion 51A, is within easy reach of the fingers of the user with the first grip portion 51A held by one hand of the user. The user thus easily performs a one-handed operation on the camera 60.

In accordance with the present embodiment, the camera employs the lens unit 67 including the bending type optical system. If thinner and more compact designs are incorporated in a variety of components such as the power supply battery and the display LCD, these components may be combined in an appropriate layout.

In accordance with the present embodiment, the thin design is incorporated, the projection area of the camera when viewed from the projection optical axis is minimized, and the ease of use of the camera is assured. The ease of assembly is also promoted, resulting in a low-cost and compact camera.

Third Embodiment

A third embodiment of the present invention will now be discussed referring to the drawings.

FIG. 8, FIG. 9, FIG. 10, FIG. 14 through FIG. 17 illustrate the third embodiment of the present invention.

Figure 14:
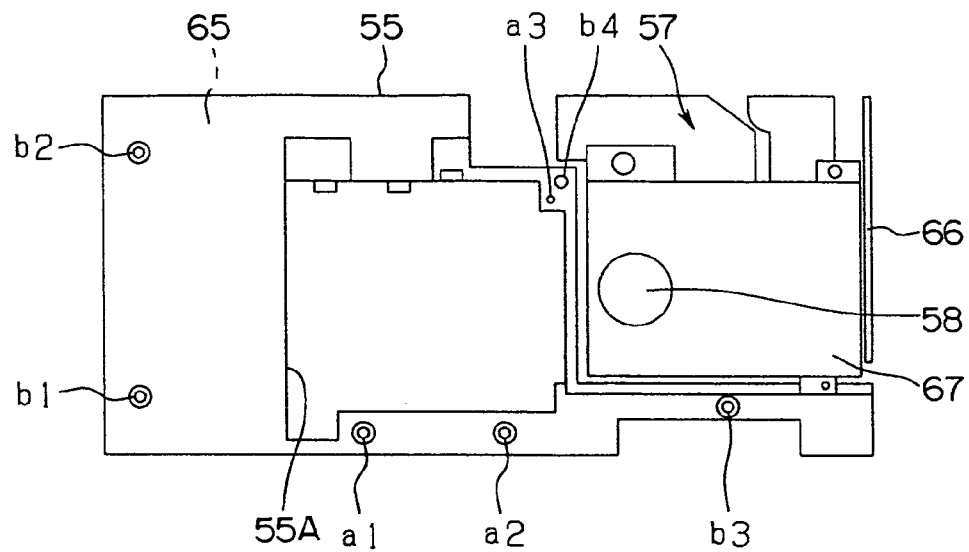
FIG. 14 is a plan view illustrating a chassis, on which an optical system having an image pickup board thereon is mounted, in a camera in accordance with a third embodiment of the present invention.
Figure 15:
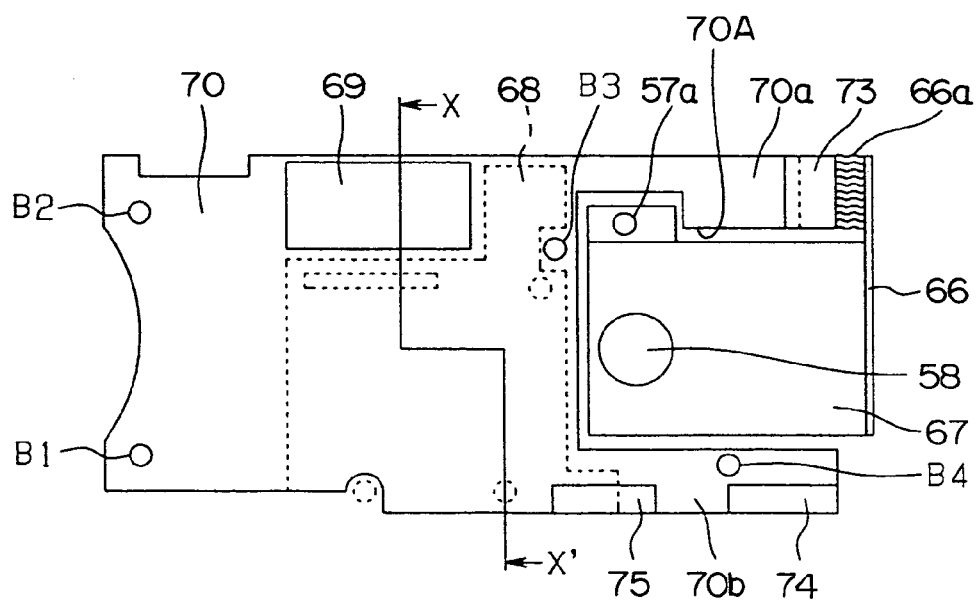
FIG. 15 is a plan view illustrating the layout of an optical system apparatus, a main board, and a power board in the camera of the third embodiment of the present invention.
Figure 16A:
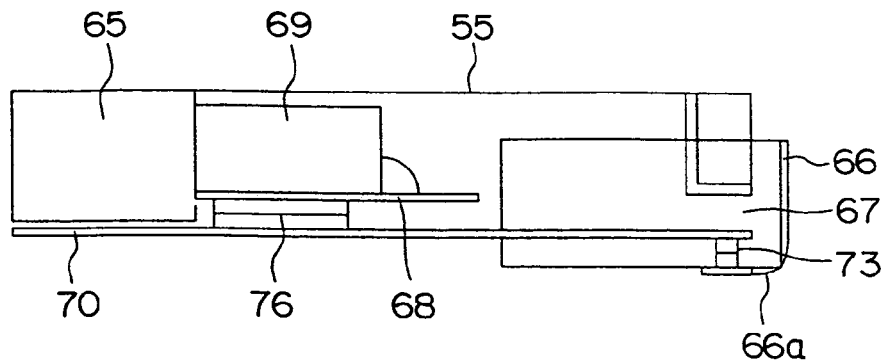
FIG. 16A is a top view illustrating the chassis, on which components, such as the optical device, the main board, and the power board are mounted, in the camera of the third embodiment of the present invention.
Figure 16B:
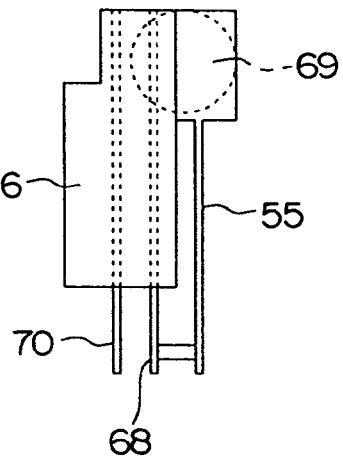
FIG. 16B is a side view of the chassis in FIG. 16A, viewed from the image pickup board.

FIG. 14 through FIG. 16B show the layout of the camera of the third embodiment of the present invention, FIG. 14 is a plan view illustrating a chassis, on which an optical system having an image pickup board thereof is mounted, in the camera, FIG. 15 is a plan view illustrating the layout of the optical device, a main board, and a power board in the camera, FIG. 16A is a top view illustrating the chassis, on which components, such as the optical device, the main board, and the power board are mounted, in the camera, and FIG. 16B is a side view of the chassis in FIG. 16A, viewed from the image pickup board.

FIG. 8, FIG. 9, and FIG. 10 have been already discussed in connection with the second embodiment, and the discussion thereof is omitted here.

The layout characteristic of this embodiment of the present invention will be detailed with reference to FIG. 14 through FIG. 16B.

FIG. 14 is the plan view of the chassis 55 on which the lens unit 67, illustrated in FIG. 10, is mounted. As shown, in the camera 51 of this embodiment, the lens unit 67 having a bending type optical system is arranged on a chassis 65 close to the right-hand side of the camera 51. An image pickup board 66, to which an output signal from the CCD is fed, is attached to the sidewall of the lens unit 67. In this case, the image pickup board 66 is substantially parallel with the image pickup surface (not shown) of the CCD arranged on the image pickup surface of the lens unit 67.

As already discussed, the battery holder 65 is arranged near the other end of the chassis 55, opposite from the lens unit 67. In this case, the battery holder 65 is arranged in alignment with the direction of depth of the flat casing 52 in the vicinity of the first grip portion 51A.

Specifically, in this embodiment, the image pickup board 66 is arranged on the sidewall of the lens unit 67, and the lens unit 67 and the battery holder 65 are arranged not to overlap each other in the projection plane of the casing 52 when viewed from the front of the camera 51.

By the way, the circuit scale of a processing and control circuit for performing a series of processes on video signals, recording the video signal on the recording medium, and controlling actuators and sensors becomes large in general in digital cameras. For this reason, the circuit is split among a plurality of circuit boards, which are then mutually connected through a number of connectors.

The processing and control circuits are closely related to each other in function, and it would be advantageous to accommodate all circuits on a single board from the standpoint of circuit arrangement and circuit board construction. Such an arrangement substantially contributes to the miniaturization of the camera, but no such effort has been made.

In this embodiment of the present invention, the processing and control functions are concentrated on a single main board 70, while the main board 70 is shaped into an optimum configuration so as to meet the dual purposes of maximizing the area of the main board 70 within the camera and of thinning the camera.

Specifically, as shown in FIG. 15, the main board 70 has a cutout portion 70A which is defined by first and second opposed lip portions 70a and 70b. The main board 70 substantially coextends with the front of the chassis 55 in a manner such that no portion thereof overlaps the lens unit 67 when viewed in the direction of depth of the casing 52.

The lens unit 67 is received into the cutout portion 70A between the first and second lip portions 70a and 70b, in other words, interposed between the first and second lip portions 70a and 70b so that no portion of the main board 70 overlaps the lens unit 67. This arrangement allows the main board 70 to be maximized in area within the camera. The resulting main board 70 helps miniaturize and thin the camera 51.

In this embodiment, the image pickup board 66 having the CCD as described above is attached on the sidewall of the lens unit 67. Signal processing circuits for pre-processing signals prior to outputting to the main board 70 are arranged on the image pickup board 66. This arrangement reduces the circuit scale of the main board 70 to some degree, thereby reducing the size of the main board 70.

The processing circuits required to convert the subject image from the CCD into a video signal are mounted on the image pickup board 66 and these processing circuits perform pre-processing steps as much as possible to lighten signal processing function to be performed on the main board 70. As a result, the main board 70 is reduced in size, and remains to be a single board, eliminating the need for splitting the main board 70.

Arranged on the end of the first lip portion 70a of the main board 70 is a connector 73 which is electrically connected to the image pickup board 66 as shown in FIG. 15. The connector 73 electrically connects the image pickup board 66 to the main board 70 via sheet-like interconnect lines 66a extending from the top edge of the image pickup board 66. The connector 73 is thus arranged in accordance with the layout of the image pickup board 66 and the main board 70, thereby shortening the electrical path between the image pickup board 66 and the main board 70. The resulting electrical connection serves the purpose of thinning the casing, and dispenses with redundant wiring.

Arranged on the end of the second lip portion 70b of the main board 70 are a connector 74 and a connector 75 arranged side by side. The connector 74 is electrically connected to the switch board 62A (see FIG. 10) arranged on the back of the back cover 54. The connector 75 is electrically connected to the display 63 to exchange video data such as the video signal with the display 63. The electrical paths to the display 63 and the switch board 62A are also shortened. The resulting electrical connection serves the purpose of thinning the casing, and dispenses with redundant wiring.

The main board 70 in this embodiment on the other end thereof overlaps the battery holder 65, opposite from the first and second 70a and 70b as shown in FIG. 16A, when viewed in the direction of depth of the casing. A connector 76 is mounted on the center of the main board 70 on its back surface, and the main board 70 is electrically connected through the connector 76 to a power board 68 which is mounted at a location appropriate for thinning the structure of the camera.

In the camera 51 of this embodiment, the lens unit 67 and a variety of components are mounted on the chassis 55, and the battery holder 65 (and the media slot 71 although not shown) is then arranged on the chassis 55 housed in the casing 52 as shown in FIG. 16A close to the first grip portion 51A. The lens unit 67 is arranged on the chassis 55 close to the second grip portion 51B, opposite from the first grip portion 51A. The image pickup board 66 is attached on the sidewall of the lens unit 67.

The main board 70 is stacked on the battery holder 65 of the chassis 55 when viewed in the direction of depth of the casing 52, and receives the lens unit 67 in the cutout portion thereof, therefore not stacked on the lens unit 67 when viewed in the direction of depth of the lens unit 67. The main board 70 generally coextends with the projection plane of the casing 52 when viewed from the subject. The two sides of the image pickup board 66 are respectively arranged to be close to the front surface and the back surface of the casing 52. Subsequent to its assembly, the switch board 62A, although not shown, is arranged to be at least partly stacked on the lens unit 67 when viewed in the direction of depth of the casing 52.

In this arrangement, the chassis 55 with the components mounted thereon as shown in FIG. 16B is thin, thereby leading to a thin and compact camera 51.

The power supply battery becomes large in size for its power requirement in digital cameras. A capacitor for emitting a stroboscopic light needs to be mounted. The arrangement of these components and the mounting of boards in a high density within a camera is issues to be addressed. With the above arrangement in accordance with this embodiment, however, the camera is successfully thinned and miniaturized.

With the lens unit 67 having the bending type optical system, the image pickup board 66 becomes perpendicular to the main board 70. Therefore, the image pickup board 66 coextending with the cross-sectional area of the camera 51 is used. The large-scale main board 70 is accordingly reduced in size. Connectors in use are simply mated with the mutually perpendicular faces thereof connected to each other. The connectors are simplified in structure and miniaturized in size, leading to a further compact camera 51. Since a media slot 71 is arranged on the main board 70 at a predetermined location with connection terminals directly mounted on the main board 70, no additional wiring is required. The camera is thus further miniaturized.

The camera 51 is assembled by clamping the chassis 55 having major components thereon between the front cover 53 and the back cover 54. This arrangement simplifies the assembly steps, thereby improving assembly yields. With the simplified assembly steps, manufacturing costs are substantially reduced, leading to a low-cost camera 51.

(Modifications)

Figure 17:
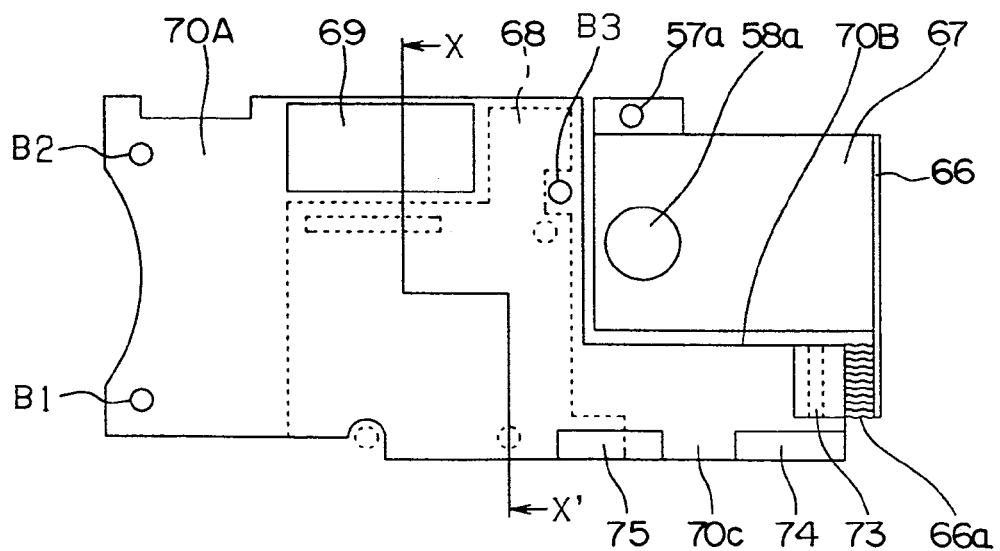
FIG. 17 is a plan view of the layout of the mounting position of the optical device, and the shape of the main board, in a modification of the third embodiment of the present invention.

FIG. 17 is a plan view of a camera in accordance with a modification of the third embodiment of the present invention, illustrating the layout of the mounting position of the optical device, and the shape of the main board. Referring to FIG. 17, components identical to those discussed in connection with the camera 51 of the above-reference embodiment are designated with the same reference numerals, and the discussion thereof is omitted here, and difference only is discussed below.

In this embodiment, the main board 70 has, at one corner thereof, a cutout portion 70B which is defined by a lip portion 70c, and receives the lens unit 67 in the cutout portion 70B. The mounting position of the lens unit 67 is thus different from that in the preceding embodiment. The rest of the construction of this modification is substantially identical to that of the camera 51 of the third embodiment.

Specifically, referring to FIG. 17, the main board 70 has the cutout portion 70B, thereby forming the one lip portion 70c. The main board 70 generally coextends with the front of the chassis 55 in a manner such that the main board 70 does not stack on the lens unit 67 when viewed in the direction of depth of the casing 52.

With the lens unit 67 fitted into the cutout portion 70B of the main board 70, in other words, with the lens unit 67 received in the cutout portion 70B of the main board 70, the main board 70 is free from overlapping the lens unit 67. The main board 70 is thus maximized in area within the camera.

The image pickup board 66 is attached to the sidewall of the lens unit 67 as in the preceding embodiment, and the image pickup board 66 extends down to its bottom portion along with the lens unit 67. As in the preceding embodiment, a connector 73 is arranged on the end of the lip portion 70c of the main board 70. The connector 73 electrically connects the image pickup board 66 to the main board 70 through the sheet-like lines 66a extending from the bottom portion of the image pickup board 66. The electrical path between the image pickup board 66 and the main board 70 is shortened. The resulting electrical connection serves the purpose of thinning the casing, and dispenses with redundant wiring.

As in the preceding embodiment, a connector 74 and a connector 75 are arranged on the lip portion 70c on predetermined locations. The connector 74 is electrically connected to the switch board 62A (see FIG. 10). The connector 75 is electrically connected to the display 63 to exchange video data of video signals with the display 63. The resulting electrical connection serves the purpose of thinning the casing, and dispenses with redundant wiring.

In this arrangement, the resulting main board 70 has a configuration appropriate for the miniaturization and thinning of the camera 51. The rest of the construction of the camera 51 remains unchanged from that of the preceding embodiment. However, in accordance with the modification in the layout of the lens unit 67, a variety of components may be changed in their shapes and mounting locations as necessary.

In accordance with this modification, the main board 70 has, on the one corner of the one end, the cutout portion 70B which is defined by the lip portion 70c and receives the lens unit 67. The lens unit 67 arranged in the modified position provides the same advantages as those of the preceding embodiment, thereby greatly contributing to the thin and compact design of the camera 51.

The present invention is not limited to the third embodiment and the modification thereof, and a combination and a change of these embodiments fall within the scope of the present invention.

In this embodiment, the image pickup board 66 is attached on the sidewall of the lens unit 67. The present invention is not limited to this arrangement. Depending on the mounting position of the lens unit 67, the image pickup board 66 may be mounted on the top surface or the bottom surface of the lens unit 67. The main board 70 may be shaped into an optimum configuration, according to the mounting position of the image pickup board 66. The electrical connection therebetween is thus established through connectors.

In accordance with the present embodiment, the camera employs the lens unit 67 including the bending type optical system. In the camera, if thinner and more compact designs are incorporated in a variety of components such as the power supply battery and the display LCD, these components may be combined in an appropriate layout.

In accordance with the above-referenced present embodiment, with the circuit boards, the optical device, and the battery skillfully arranged, the projection area of the camera is minimized when viewed from the projection optical axis, and the ease of use of the camera is assured. Further, the ease of assembly is promoted, resulting in a low-cost and compact camera.

Fourth Embodiment

A fourth embodiment of the present invention will now be discussed with reference to the drawings.

FIG. 8, FIG. 9, FIG. 10, FIG. 14, FIG. 15, FIG. 18A and FIG. 18B illustrate the fourth embodiment of the camera of the present invention.

Figure 18A:
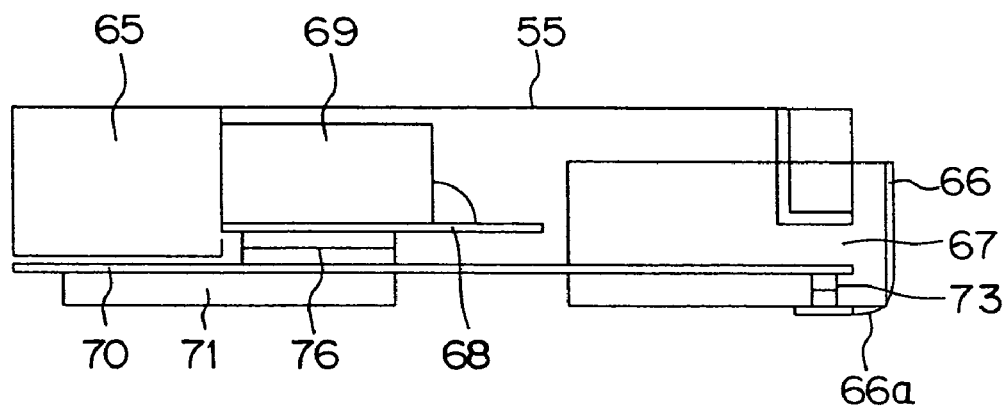
FIG. 18A is a top view illustrating a chassis, on which components, such as an optical device, a main board, and a power board are mounted, in a camera in accordance with a fourth embodiment of the present invention.
Figure 18B:
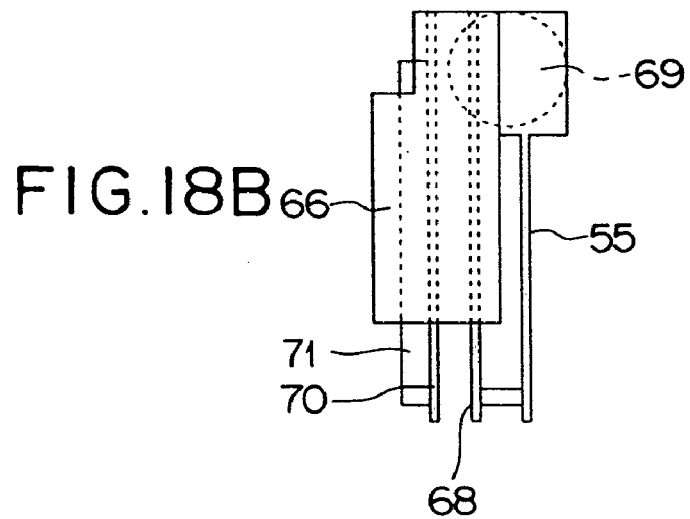
FIG. 18B is a side view of the chassis of FIG. 18A, viewed from an image pickup board.

FIG. 18A is a top view illustrating a chassis, on which components, such as an optical device, a main board, and a power board are mounted, and FIG. 18B is a side view of the chassis of FIG. 18A, viewed from an image pickup board.

FIG. 8, FIG. 9, FIG. 10, FIG. 14 and FIG. 15 have already been discussed in connection with the second and third embodiments, and the discussion thereof is omitted here.

The camera 51 of this embodiment is equipped with a stroboscopic light emission function, and needs a capacitor 69 that stores a great deal of charge to emit a stroboscopic light. The manner of how the capacitor 69 is mounted is important to promote thin design. The arrangement of the power board 68 as a second circuit board on which the capacitor 69 is mounted is also important.

In accordance with the present embodiment, the capacitor 69 is held in the lying position thereof in a holding wall 55a and a holding seat 55b, which are integrally formed with the chassis 55. With the capacitor 69 held, the spacing between the holding wall 55a and the holding seat 55b is almost equal to the depth size of the battery holder 65. This arrangement substantially contributes to the thin design of the camera 51.

The capacitor 69 is mounted on the upper side of the power board 68 as the second circuit board. The power board 68 and the capacitor 69 are electrically connected to each other.

The power board 68 includes a charging circuit for storing charge in the capacitor 69, a trigger circuit for triggering a stroboscopic light emission unit 59, and a power supply circuit for controlling the power supply battery.

In accordance with the present embodiment, the power board 68 has an area smaller than the area of the main board 70 to thin the camera 51. The power board 68 is received in a cutout portion 55A in the center of the chassis 55, and stacks on the main board 70 therewith.

The power board 68 is mounted on the chassis 55 with slight degrees of looseness in both horizontal and vertical directions so that connectors 76 (see FIG. 18A) electrically connects the power board 68 to the main board 70 in a smooth manner.

The camera 51 is substantially thinned by arranging the power board 68 having the capacitor 69 mounted thereon in this configuration.

The layout characteristic of this embodiment of the present invention will be discussed in detail referring to FIG. 14, FIG. 15, FIG. 18A, and FIG. 18B.

FIG. 14 is a plan view of the chassis 55 with the lens unit 67 shown in FIG. 10 mounted thereon. As shown, in the camera 51 of this embodiment, the lens unit 67 having the bending type optical system is arranged close to the right-hand end of a chassis 65, and the image pickup board 66 fed with the output signal from the CCD is arranged on the sidewall of the lens unit 67. In this case, the image pickup board 66 is substantially parallel with the image pickup surface (not shown) of the CCD arranged on the image pickup surface of the lens unit 67.

As already discussed, the battery holder 65 is arranged near the other end of the chassis 55, opposite from the lens unit 67. In this case, the battery holder 65 is arranged in alignment with the direction of depth of the flat casing 52 in the vicinity of the first grip portion 51A.

In this embodiment, the image pickup board 66 is arranged on the sidewall of the lens unit 67, and the lens unit 67 and the battery holder 65 are arranged not to overlap each other in the projection plane of the casing 52 when viewed from the front of the camera 51.

The scale of a circuit for processing and control circuit for performing a series of processes on video signals, recording the video signal on the recording medium, and controlling actuators and sensors becomes typically large in a digital camera. For this reason, the circuit is split among a plurality of circuit boards, which are then mutually connected through a number of connectors. Circuits other than those for the control function, for example, a circuit of allowing a large current for stroboscopic control and battery control to flow therethrough is also split among a plurality of boards and mixed with a circuit for control functions there.

Processing and control circuits handling no large current, which are typically closely related to each other, are preferably integrated in a single circuit board from the standpoint of circuit arrangement and circuit board construction. Concurrently, circuits handling large current for stroboscopic control and battery control are preferably in a single circuit board from the standpoint of circuit arrangement and circuit construction. Such an arrangement greatly contributes to the miniaturization of the camera, but no such effort has been made.

In this embodiment of the present invention, the processing and control functions are concentrated on a single main board 70, while the main board 70 is shaped into an optimum configuration that serves the dual purposes of maximizing the area of the main board 70 within the camera and thinning the camera. The power board 68 handling a high current for stroboscopic control and battery control requires space smaller than the main board 70. The power board 68, which is shaped into a configuration appropriate to thin the camera 51, is arranged at a location not to overlap the battery holder 65 in the direction of depth of the battery holder 65. To help thin the camera, the power board 68 is interposed between the battery holder 65 and the lens unit in the chassis 55.

Specifically, referring to FIG. 15, the main board 70 has a cutout portion 70A and first and second opposed lip portions 70a and 70b. The main board 70 generally coextends with the front of the chassis 55 in a manner such that no portion thereof overlaps the lens unit 67 when viewed in the direction of depth of the casing 52.

The lens unit 67 is received into the cutout portion 70A between the first and second lip portions 70a and 70b, in other words, interposed between the first and second lip portions 70a and 70b so that no portion of the main board 70 overlaps the lens unit 67. This arrangement allows the main board 70 to be maximized in area within the camera. The resulting main board 70 helps miniaturize and thin the camera 51.

In this embodiment, the image pickup board 66 having the CCD as described above is attached on the sidewall of the lens unit 67. Signal processing circuits for pre-processing signals prior to outputting to the main board 70 are arranged on the image pickup board 66. This arrangement reduces the circuit scale of the main board 70 to some degree, thereby reducing the size of the main board 70.

The processing circuits required to convert the subject image from the CCD into a video signal are mounted on the image pickup board 66 and these processing circuits perform pre-processing steps as much as possible to lighten signal processing function to be performed on the main board 70. As a result, the main board 70 is reduced in size, and remains to be a single board, eliminating the need for splitting the main board 70.

Arranged on the end of the first lip portion 70a of the main board 70 is a connector 73 which is electrically connected to the image pickup board 66 as shown in FIG. 15. The connector 73 electrically connects the image pickup board 66 to the main board 70 via sheet-like interconnect lines 66a extending from the top edge of the image pickup board 66. The connector 73 is thus arranged in accordance with the layout of the image pickup board 66 and the main board 70, thereby shortening the electrical path between the image pickup board 66 and the main board 70. The resulting electrical connection serves the purpose of thinning the casing, and dispenses with redundant wiring.

Arranged side by side on the end of the second lip portion 70b of the main board 70 are a connector 74 and a connector 75. The connector 74 is electrically connected to the switch board 62A (see FIG. 10) arranged on the back of the back cover 54. The connector 75 is electrically connected to the display 63 to exchange video data such as the video signal with the display 63, thereby shortening the electrical paths to the display 63 and the switch board 62A. The resulting electrical connection serves the purpose of thinning the casing, and dispenses with redundant wiring.

The main board 70 in this embodiment stacks the battery holder 65 on the opposite end of the first and second lips 70a and 70b as shown in FIG. 18A, when viewed in the direction of depth of the casing. A media slot 71 is arranged on the main board 70 behind the battery holder 65. A connector 76 is mounted in the center of the main board 70 on its back surface, and the main board 70 is electrically connected through the connector 76 to the power board 68 which is mounted at a location appropriate for thinning the structure of the camera.

In this embodiment, as discussed above, the above-mentioned power board 68 is smaller in area than the main board 70 as shown in FIG. 15, and the battery holder 65 and the lens unit 67 do not overlap each other when viewed in the direction of depth of the casing 52. The power board 68, interposed between the battery holder 65 and the lens unit 67 in the chassis 55, is appropriate for miniaturizing and thinning the camera 51.

In the camera 51 of this embodiment, the lens unit 67 and a variety of other components are mounted on the chassis 55. As shown in FIG. 18A, the battery holder 65 and the media slot 71 are arranged close to the first grip portion 51A on the chassis 55 accommodated in the casing 52. The lens unit 67 is arranged on the chassis 55 close to the second grip portion 51B, opposite from the first grip portion 51A, and the image pickup board 66 is attached on the sidewall of the lens unit 67.

The main board 70 is stacked on the battery holder 65 of the chassis 55 when viewed from the direction of depth of the casing 52. The lens unit 67, received in the cutout portion 70A, is not stacked on the main board 70 when viewed in the direction of depth of the lens unit 67. The main board 70 substantially coextends with the projection plane of the casing 52 when viewed from the subject end. The two opposed edges of the image pickup board 66 are respectively arranged close to the front side and the back side of the casing 52. When mounted, the switch board 62A, although not shown, is arranged to be at least partly stacked on the lens unit 67 when viewed from the direction of depth of the casing 52.

The power board 68 is not stacked on the battery holder 65 and the lens unit 67 when viewed from the direction of depth of the casing 52. The two opposed edges of the power board 68 are arranged to be respectively close to two sides of the casing 52 after a completion of the assembly of the camera.

In this arrangement, the chassis 55 with the components mounted thereon as shown in FIG. 18B is thin, thereby leading to a thin and compact camera 51.

The power supply battery typically becomes large in size for its power requirement in digital cameras. The arrangement of these components and the mounting of boards in a high density within a camera are issues to be addressed. In accordance with this embodiment, with the above arrangement, however, the camera is successfully thinned and miniaturized.

With the lens unit 67 having the bending type optical system, the image pickup board 66 becomes perpendicular to the main board 70. Therefore, the image pickup board 66 coextending with the cross-sectional area of the camera 51 is used. The large-scale main board 70 is accordingly reduced in size. Connectors in use are simply mated with the mutually perpendicular faces thereof connected to each other. The connectors are simplified in structure and miniaturized in size, leading to a further compact camera 51. Since the media slot 71 is arranged on the main board 70 at a predetermined location with connection terminals directly mounted on the main board 70, no additional wiring is required. The camera is thus further miniaturized.

In its manufacturing process, the camera 51 is assembled by clamping the chassis 55 having the major components already mounted thereon, between the front cover 53 and the back cover 54. This arrangement simplifies the assembly steps, thereby improving assembly yields. With the simplified assembly steps, manufacturing costs are substantially reduced, leading to a low-cost camera 51.

The present invention is not limited to the above-embodiment, and a modification thereof falls within the scope of the present invention.

In this embodiment, the image pickup board 66 is attached on the sidewall of the lens unit 67. The present invention is not limited to this arrangement. Depending on the mounting position of the lens unit 67, the image pickup board 66 may be mounted on the top surface or the bottom surface of the lens unit 67. The main board 70 may be shaped into an optimum configuration, according to the mounting position of the image pickup board 66. The electrical connection therebetween is thus established through connectors.

In accordance with the present embodiment, the camera employs the lens unit 67 including the bending type optical system. In the camera, if thinner and more compact designs are incorporated in a variety of components such as the power supply battery and the display LCD, these components may be combined in an appropriate layout.

In accordance with the above-referenced present embodiment, with the circuit boards skillfully arranged, the projection area of the camera is minimized when viewed from the projection optical axis, and the ease of use of the camera is assured. Further, the ease of assembly is promoted, resulting in a low-cost and compact camera.

Fifth Embodiment

A fifth embodiment of the present invention will now be discussed referring to the drawings.

Figure 19:
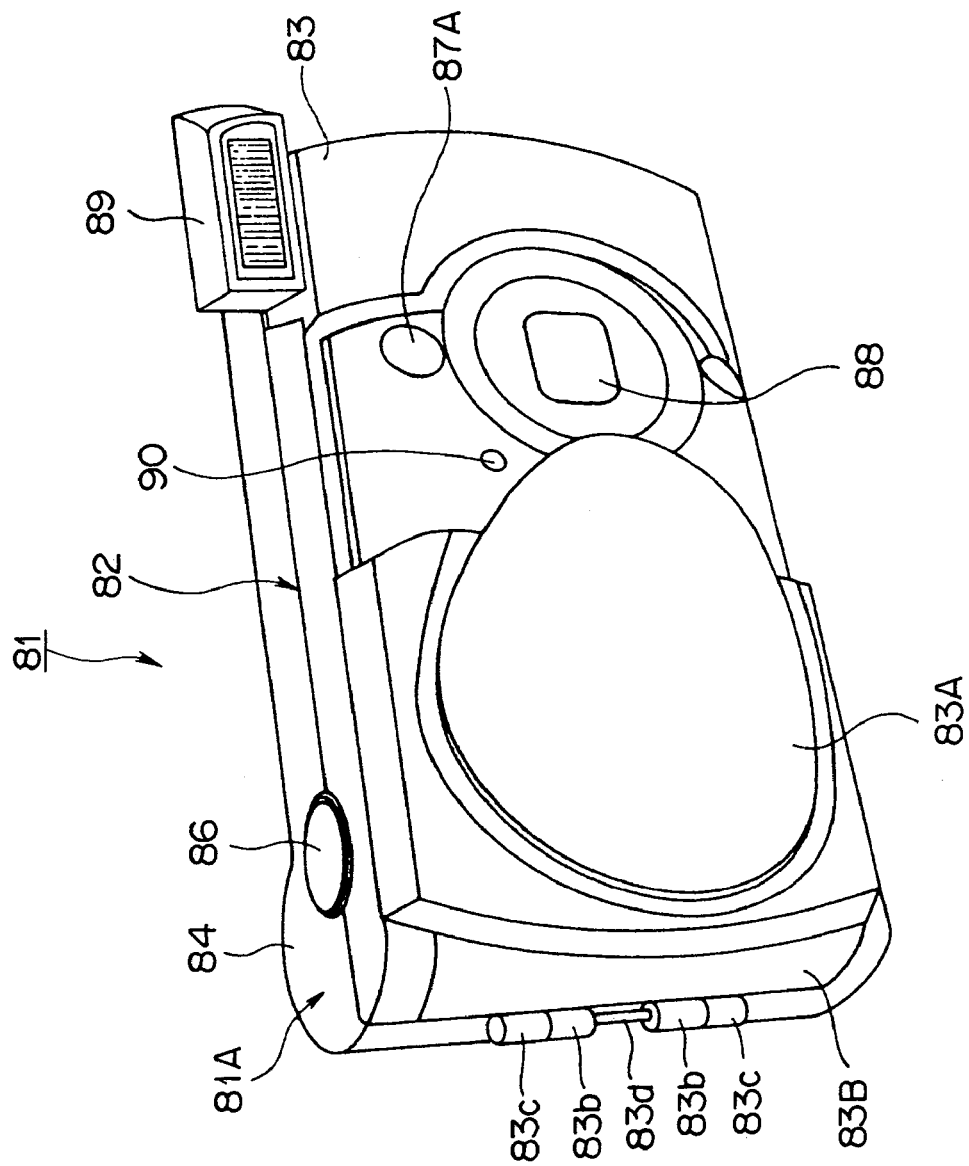
FIG. 19 is a perspective view illustrating the external structure of a camera in accordance with a fifth embodiment of the present invention, viewed from the front thereof.
Figure 20:
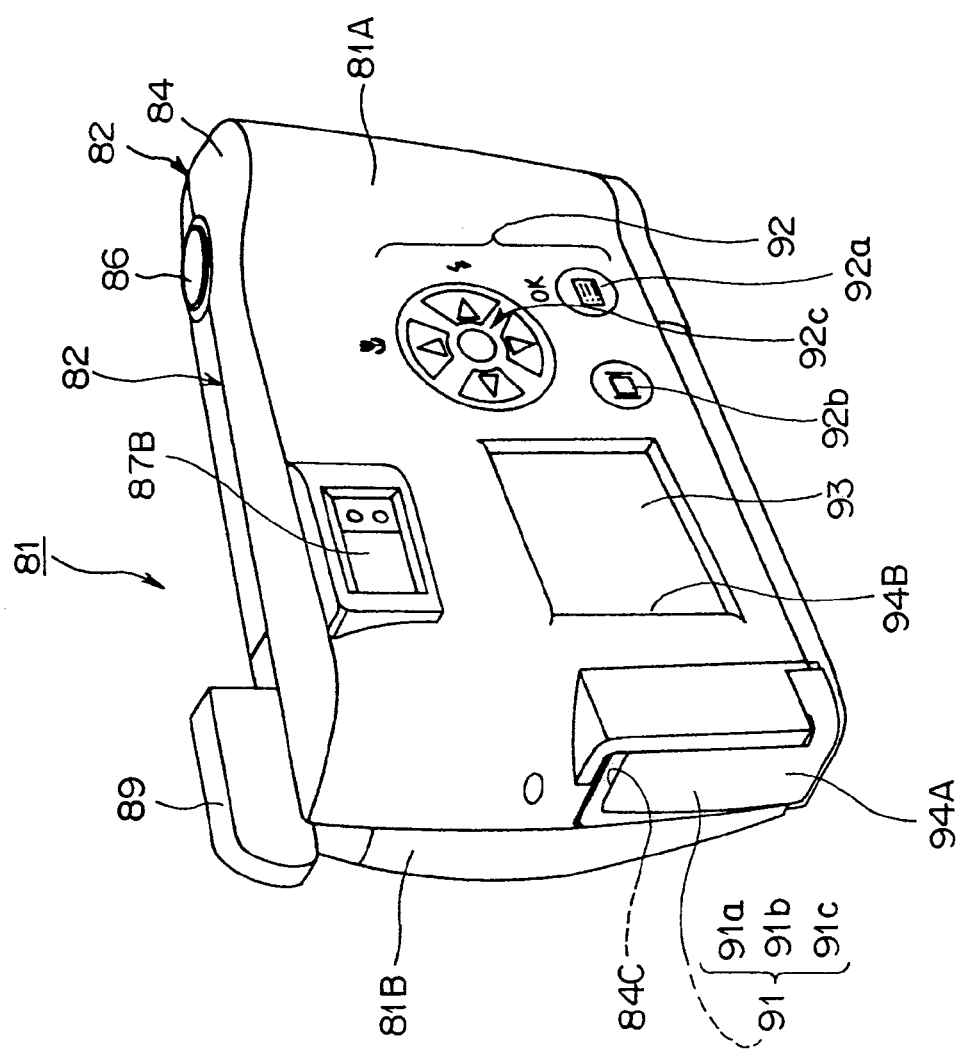
FIG. 20 is a perspective view illustrating the external structure of the camera in accordance with the fifth embodiment of the present invention, viewed from behind the camera.
Figure 21:
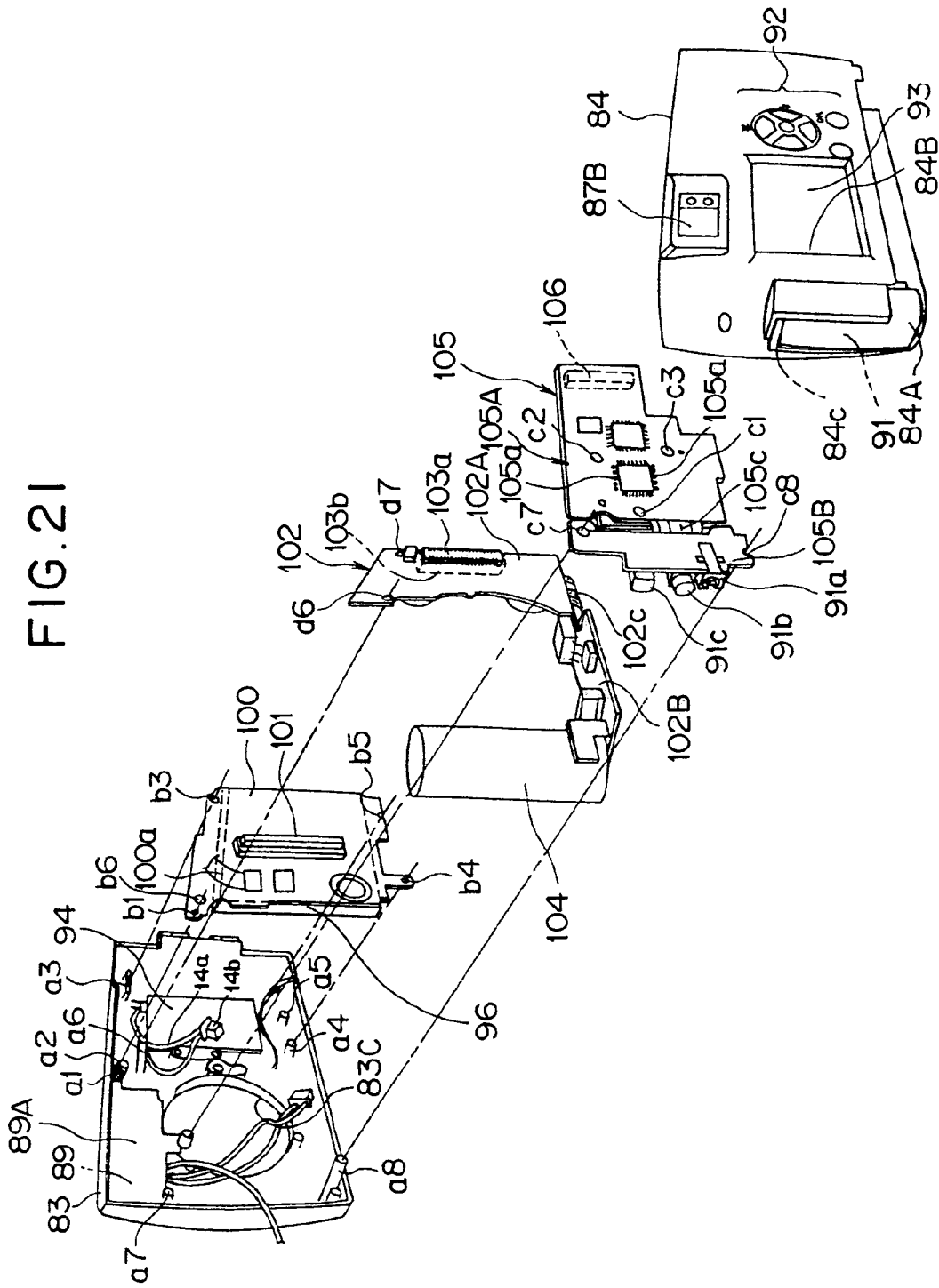
FIG. 21 is an exploded perspective view roughly illustrating the internal structure of the camera illustrated in FIG. 19, explaining an assembly method of the camera of the fifth embodiment of the present invention.
Figure 22:
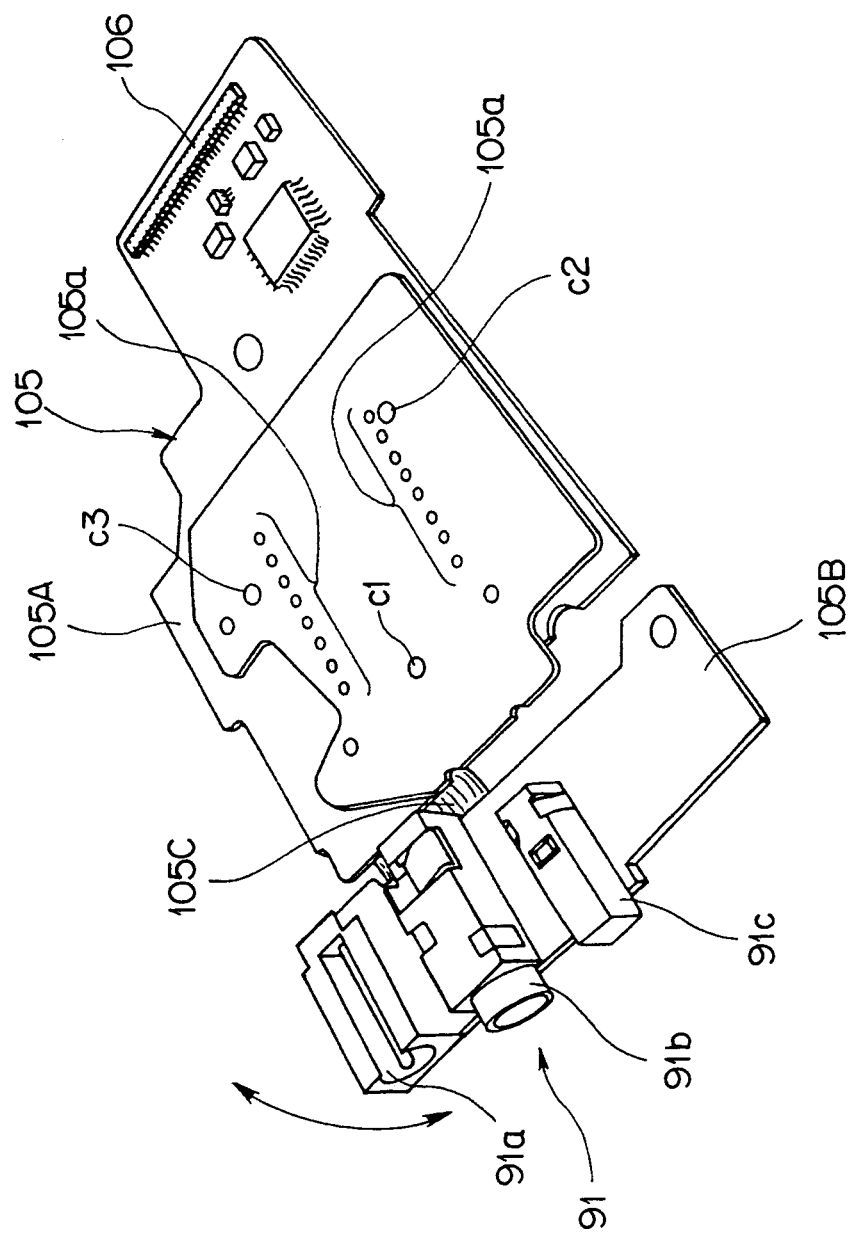
FIG. 22 is a perspective view of the structure of an image pickup board shown in FIG. 21.
Figure 23:
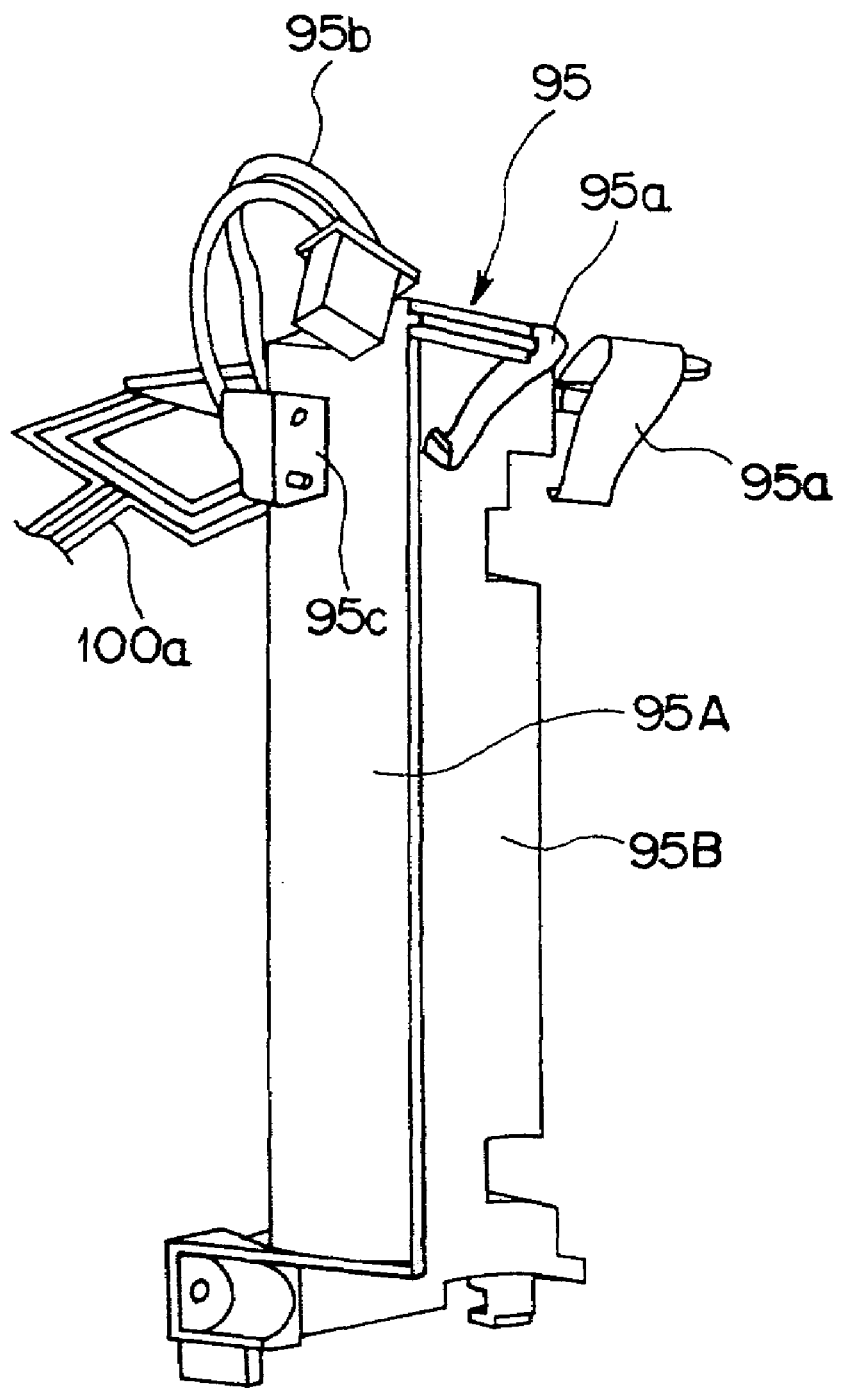
FIG. 23 is a perspective view illustrating the structure of a battery holder mounted in a front cover close to a grip illustrated in FIG. 21.
Figure 24:
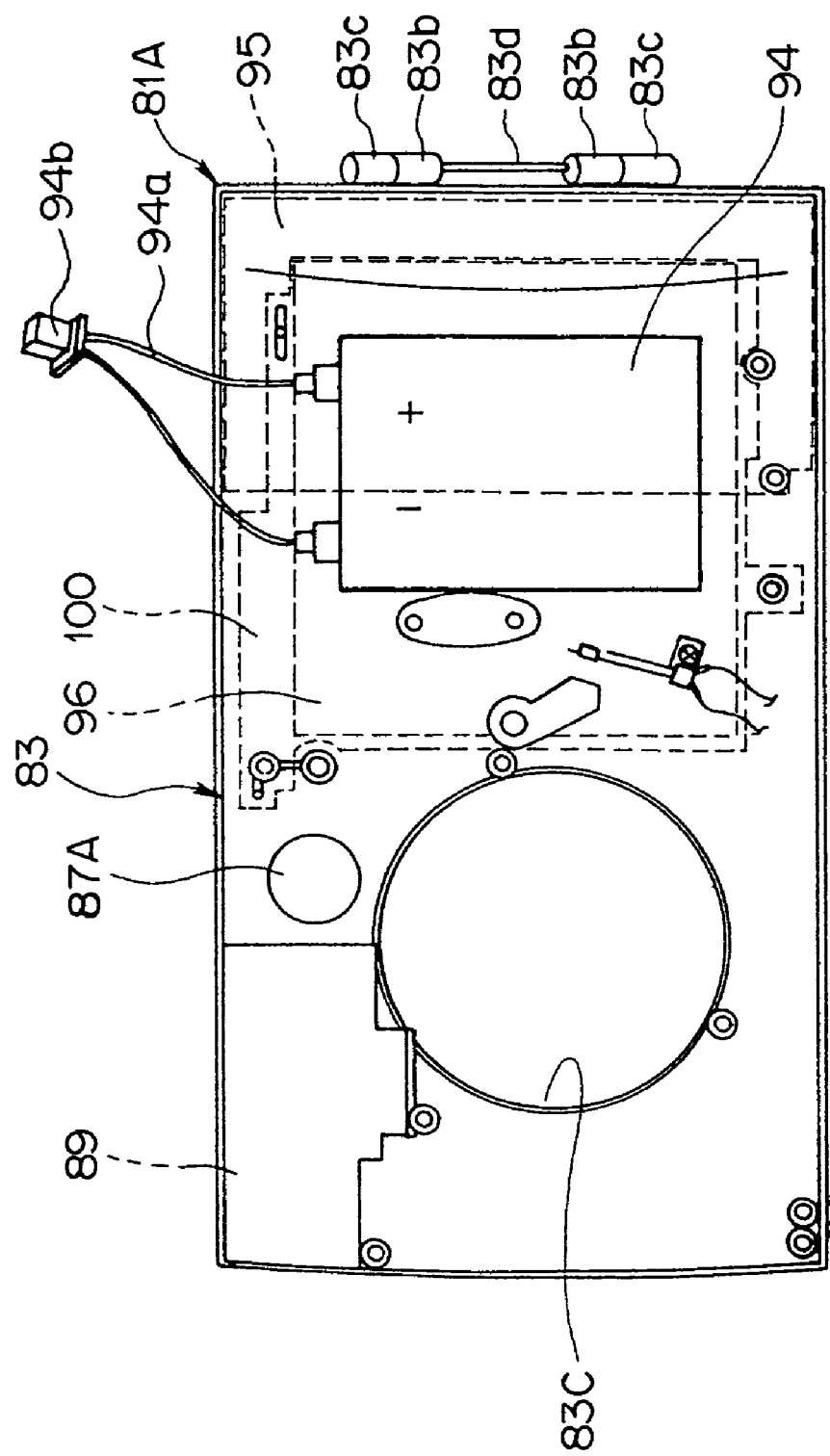
FIG. 24 is a plan view illustrating the front cover, on which a variety of components such as an electrical-double-layer capacitor are mounted to explain a layout characteristic of the fifth embodiment of the present invention.

FIG. 19 through FIG. 24 illustrate the fifth embodiment of the present invention. FIG. 19 is a perspective view illustrating the external structure of the camera viewed from the front thereof, FIG. 20 is a perspective view illustrating the external structure of the camera, viewed from behind the camera, FIG. 21 is an exploded perspective view roughly illustrating the internal structure of the camera illustrated in FIG. 19 to explain an assembly method of the camera, FIG. 22 is a perspective view of the structure of an image pickup board shown in FIG. 21, FIG. 23 is a perspective view illustrating the structure of a battery holder mounted in a front cover close to a grip illustrated in FIG. 21, and FIG. 24 is a plan view illustrating the front cover, on which a variety of components such as an electrical-double-layer capacitor are mounted, to explain a layout characteristic of the fifth embodiment of the present invention.

Referring to FIG. 19, the camera of this embodiment, namely, an electronic camera 81 includes a casing 82 which is flat and elongated. The casing 82 is formed of a front side cover (a front cover) 83 and a back side cover (a back cover) 84 as outer housing members for sandwiching optical members required to take picture and a variety of circuit boards on which electronic circuit components are mounted, as will be discussed later.

With the front cover 83 and the back cover 84 secured to each other, the casing 82 forms a first grip portion 81A near a release button 86 appearing on the left end thereof, and a second grip portion 81B arranged on the other end thereof (on the right end thereof when viewed from the front of the camera, and see FIG. 20).

The first grip portion 81A is mainly formed of the back cover 84 in such that the corresponding portion of the back cover 84 becomes the thickest in the thickness of the flat configuration when viewed in the length direction of the casing 82. The thickest portion of the back cover 84 forms the first grip portion 81A, which can be firmly gripped by a user. This arrangement prevents the camera 81 from being trembled during photographing, and is appropriate for a one-handed picture taking manipulation. The user typically holds the camera 51 with the first and second grip portions 81A and 81B respectively gripped by both hands.

The release button 86 is arranged on the top surface of the first grip portion 81A of the casing 82. The release button 86 is switching means, and upon being pressed, the release button 86 executes the picture taking operation. The release button 86 is mounted on the front cover 83, and is exposed through cutout portions respectively formed in the front cover 83 and the back cover 84, which are secured to each other.

A barrier main switch 83A is arranged on the front cover 83 of the front of the casing 82, and remains laterally movable with respect to the front cover 83. When the barrier main switch 83A is moved in a leftward direction when viewed from the front of the camera as shown in FIG. 19 during a photographing operation of the electronic camera 81, the barrier main switch 83A, interlocked with a power switch (not shown) arranged on the back surface of the front cover 83, turns on the power of the camera 81.

While the camera 81 is not used during the carrying or storage thereof, the barrier main switch 83A, interlocked with the power switch, is slid in a rightward direction when viewed from the front of the camera 81 as shown in FIG. 19, thereby turning off the power of the camera 81. In its position, the barrier main switch 83A covers and protects components such as an image pickup optical system 88 including a finder window 87A and a photographing lens, and a self-timer LED 90 arranged on one side of the front of the camera 81.

In the camera 81 of this embodiment, the above-mentioned finder window 87A and the image (image formation) optical system 88 including the photographing lens, and components such as a stroboscopic light emission unit 89, and the self-timer LED 90 to be used in photographing are arranged on the front cover 83 on the right-hand side of the casing 82 when viewed from the front of the camera 81.

The stroboscopic light emission unit 89 arranged on the front cover 83 of the casing 82 is a popup type flash emission unit which is retracted within the casing 82 when not flashing and pops up when flashing. The stroboscopic light emission unit 89 is projected to the photographing position thereof by a drive link mechanism in interlock with the projection motion of a lens barrel (not shown) to the photographing position thereof in response to the switching on of the power supply of the camera. In response to the switching off of the power supply of the camera, the stroboscopic light emission unit 89 is retracted into a retraction position thereof in interlock with the retraction operation of the lens barrel (not shown).

Arranged on the other end of the front cover 83, namely, the left-hand side of the front of the casing 82, when viewed from the front of the camera 81, is a media slot cover 83B which is opened and closed to the outside to load and unload a memory card as a recording medium for recording a captured video signal.

Two shaft locks 83b and 83b are formed on the proximal end of the media slot cover 83B. The media slot cover 83B is closed or opened with a shaft 83d, supported by two shaft sockets 83c and 83c formed on the front cover 83, and engaged with the shaft locks 83b and 83b. As shown, the media slot cover 83B is held in a closed state with unshown lock means.

For example, the media slot cover 83B is opened and closed when a memory card as a recording medium, such as a smart medium, is loaded into or unloaded from a media slot (a media socket) 96 (see FIG. 21) arranged at a corresponding location in the casing 82.

Arranged on the back cover 84 forming the casing 82 are a finder 87B, an operation switch group 92, and a display 93 as shown in FIG. 20.

The finder 87B is mounted on near the top edge of the back cover 84 close to the second grip portion 81B. The user looks into the finder 87B to observe a subject.

The operation switch group 92 is arranged on the back cover 84 near the first grip portion 81A of the casing 82. The operation switch group 92 includes a plurality switches 92a to 92c to perform a variety of modes of the camera 81. Each of the plurality of switches 92a to 92c may be fabricated of a push-type switch. The switch 92a is a menu selection switch for selecting a menu of a photograph mode of the camera 81. The switch 92b is an LCD drive switch for turning on and off the display 93. An operation switch 92c, including at least four switching elements, performs detailed settings for the determined photograph mode and other settings. For example, upper and lower switching elements may perform electronic zoom-in and zoom-out operations, and right and left switching elements may select a stroboscopic light emission mode and may operate a macro photograph mode (a close-up photograph mode).

The display 93 is arranged near the operation switch group 92, on the back cover 84 near the second grip 81B of the casing 82. For example, the display 93 may be manufactured of a transmissive type TFT LCD, and its screen is exposed through a cutout portion 84B in the back cover 84. The display 93 displays a variety of pieces of information and other picture taking information and an image based on a captured video signal or a recorded video signal.

An opening 84C is formed in the bottom of the back cover 84 close to the second grip portion 81B. Connection terminals 91 are arranged in the opening 84C. The connection terminals 91 include a DC power supply terminal 91a to receive DC power as will be discussed later, video output terminal 91b to output a captured video signal to an external device, and a USB terminal 91c (see FIG. 21). A connection terminal cover 84A is detachably fitted in the opening 84C to cover the connection terminal 91.

The internal structure of the camera 81 of this embodiment will be detailed with reference to FIG. 21.

To achieve the above objectives, the camera 81 of this embodiment includes a high-capacitance and flat-shaped electrical-double-layer capacitor that compensates for a sharp voltage drop during a peak power consumption. The electrical-double-layer capacitor is disposed at the most optimal place to realize the miniaturization of and weight balance of the camera to assure the ease of use of the camera.

The camera 81 of this embodiment has a structure that is easy to miniaturize and thin, requires no chassis space, and has a plurality of circuit boards stacked each other. To electrically connect the circuit boards, a board-to-board connector having a number of connection terminals mounted on the surface of each circuit board is used.

Specifically, referring to FIG. 21, the camera 81 of this embodiment includes, as the major components thereof: the image pickup optical system 88 (not shown), the front cover 83 on which a plurality of circuit boards and a variety of mechanical components are mounted; a main board 100 as a first circuit board on which a variety of circuits such as a control circuit for performing almost all functions of the camera 81, and a variety of processing circuits for processing video signals are mounted; a power board 102 as a second circuit board on which a variety of circuits for performing power control and stroboscopic control for the camera 81, and electronic components are mounted; an image pickup board 105 which is stacked on the power board 102 stacked on the main board 100 and electrically connected and mechanically fixed to the image pickup optical system; and the back cover 84 which is mated with the front cover 83 to sandwich the main board 100, the power board 102, and the image pickup board 105 therebetween.

A mounting hole 83C is formed in the front cover 83 close to the second grip portion 81B to receive the image pickup optical system 88. The image pickup optical system 88 received in the mounting hole 83C includes, as major components thereof, a plurality of lens units including a photographing lens within a lens barrel, although not shown, an AF drive mechanism driving system such as a drive motor for performing AF, and a CCD. The CCD, although not shown, is mounted beforehand on the proximal end of the mounting side of the image pickup optical system 88, and a plurality of terminals for electrically connecting to the image pickup board 105 is projected from the CCD.

A stroboscopic unit 89A having a stroboscopic light emission unit 89 is mounted on the front cover 83 above the mounting hole 83C.

A high-capacitance capacitor 94 that compensates for a sharp voltage drop in the voltage value during the peak power consumption is arranged within the front cover 83 close to the first grip portion 81A. The capacitor 94 is an electrical-double-layer capacitor and is configured in a flat and thin structure appropriate for promoting miniaturization and weight balance of the camera 81. In its electrical connection, the electrical-double-layer capacitor 94 is connected in parallel with battery contacts 95a of the battery holder 95 sandwiching the main board 100 between itself and the electrical-double-layer capacitor 94. Specifically, a connector 94b (see FIG. 24) of lead wires 94a extending from the electrical-double-layer capacitor 94 is connected to a corresponding connector arranged behind a power supply board section 102A of the power board 100. The mounting of the electrical-double-layer capacitor 94 will be discussed in detail later.

Alignment projections a1, and a3, and mounting projections a2, and a4 for mounting and aligning the main board 100 and a power board 102 to be stacked, and a mounting projection a5 for mounting the battery holder 95 are arranged on the front cover 83 in the vicinity of the electrical-double-layer capacitor 94. Also arranged on the front cover 83 in the vicinity of the mounting hole 83C are mounting projections a7 and a8 for mounting a terminal board 105B included in the image pickup board 105 to be stacked.

The main board 100 generally coextends with the inner area of the front cover 83 except the mounting hole 83C to promote thin design. Specifically, the main board 100 is shaped into a configuration and placed at a position, most appropriate for promoting the compact and thin design in the camera 81.

The main board 100 has alignment holes b1 and b3 to be aligned with the alignment projections a1 and a3 of the front cover 83, and mounting holes b4, b5, and b6 through which screws are driven into the mounting projections a2 and a4 in the front cover 83. When fixed, the main board 100 is stacked on the capacitor 94 and is then fixed to the front cover 83.

A board-to-board type connector 101 having a number of connection terminals is mounted on the surface of the main board 100. Referring to FIG. 23, a battery holder 95 includes a holding wall 95A for holding a power supply battery, a holder compartment 95B for holding the power supply battery, two battery contacts 95a attached on the top portion of the holder 95, a connector 100a for feeding the power of the loaded power supply battery to the power board 102, lead wires 95b for feeding the power of the loaded power supply battery to the power board 102, and a connection block 95c which is fixed to the power board 102 with screws when the battery holder 95 is assembled into the front cover 83. The battery holder 95 is fixed to the front cover 83 in such a manner that the battery holder 95 is stacked on the surface of the main board 100.

A media slot (a media socket) 96, arranged on the back side of the main board 100, allows a memory card such as a smart medium as a recording medium to be loaded and unloaded thereinto or therefrom.

A connector 101 of the main board 100 is mated to a connector 103b mounted on the back of a power supply board section 102A of a power board 102. In other words, the power board 102 is stacked and mounted on the main board 100.

As shown, the power board 102 includes a power supply board section 102A on which circuits for performing power supply control are mounted, a stroboscopic board section 102B on which circuits for mainly performing stroboscopic control and a main capacitor 104 required to emit a stroboscopic light are mounted, and a flexible board section 102C for electrically connecting the power supply board section 102A to the stroboscopic board section 102B.

Arranged on the back side of the power supply board section 102A is a connector 103b, which is similar to the connector 101 of the above-mentioned main board 100 and is connected to the connector 101. Another connector 103a is arranged on the front side of the power supply board section 102A at a location corresponding to the mounting position of the connector 103b. The power supply board section 102A has, at predetermined locations thereof, a mounting hole d6 through which a screw is driven into the mounting projection a6 of the front cover 83 for fixing the power supply board section 102A to the front cover 83, and a mounting hole d7 though which a screw is driven into the mounting projection 95c of the installed battery holder 95.

The stroboscopic board section 102B, which is electrically connected to the power supply board section 102A through the flexible board section 102C, is movable so that the plane of the stroboscopic board section 102B becomes perpendicular to the power supply board section 102A by means of the flexible board section 102C. In other words, the stroboscopic board section 102B is sized to meet the thickness of the camera 81. And when mounted to the front cover 83, the stroboscopic board section 102B is fitted on the bottom surface of the front cover 83.

The camera 81 of this embodiment has a stroboscopic light emission function, and needs a capacitor 104 that stores a great deal of charge to emit a stroboscopic light. The manner of how the capacitor 104 is mounted is important to promote thin design.

In accordance with this embodiment, the main capacitor 104 in its attached state to the stroboscopic board section 102B is housed on the bottom portion of the front cover 83 below a stroboscopic unit 89B at the same time when the stroboscopic board section 102B is fitted on the bottom surface of the front cover 83. In this way, the main capacitor 104 is thus accommodated within the thickness of the front cover 83, thereby substantially contributing to the thinning of the camera 81.

The stroboscopic board section 102B has circuits, although not shown, such as a charging circuit for storing charge in the main capacitor 104 and a trigger circuit for triggering the emission of stroboscopic light from the stroboscopic light emission unit 89.

In the camera 81 of this embodiment, the image pickup board 105 is further stacked on the power board 102.

Referring to FIG. 22, the image pickup board 105 includes an image pickup board section 105A having on the back surface thereof a connector 106 which is connected to the connector 103a mounted on the power supply board section 102A of the power board 102, a terminal board section 105B having the connection terminals 91 mounted thereon, and a flexible board section 105C which electrically connects the image pickup board section 105A to the terminal board section 105B while allowing the terminal board section 105B to move to be perpendicular to the circuit plane of the image pickup board section 105A.

The image pickup board section 105A has a variety of circuits for image-pickup processing, and has the connector 106 on the back surface thereof (the top surface in FIG. 22). The image pickup board section 105A has, on predetermined locations, a plurality of connection holes 105a for allowing a plurality of the terminals (not shown) of the CCD, mounted on the end face of the image pickup optical system 88, to be inserted and then soldered, and three mounting holes c1, c2, and c3 through which the image pickup board section 105A is fixed to the end face of the image pickup optical system 88 using screws.

Each of the plurality of connection holes 105a is sized to be larger than each of the terminals of the CCD by a predetermined dimension. By setting the connection hole 105a to be larger than the terminals of the CCD, looseness is allowed therebetween when the image pickup board 105 is mounted in the image pickup optical system 88 which is already fixed to the front cover 83. In this arrangement, the mounting position of the image pickup board 105 is finely adjusted. The image pickup board section 105A is tentatively fixed with screws driven to the mounting holes c1, c2, and c3, and with the image pickup board section 105A held, the CCD terminals are soldered. The image pickup board 105 is thus permanently fixed to the proximal end face of the image pickup optical system 88.

Referring to FIG. 22, a terminal board section 105B, which is connected to the image pickup board section 105A via a flexible board section 105C, includes DC power supply terminals 91a, video output terminals 91b, and USB terminals 91c, forming the connection terminals 91, on the back surface of the terminal board section 105B. The terminal board section 105B has, on the top and bottom proximal end portions thereof, mounting holes c7 and c8 through which screws are driven into to connect to the mounting projections a7 and a8 of the front cover 83.

When the image pickup board 105 thus constructed is installed, the terminal board section 105B is flexibly adjusted in the position thereof in the direction represented by an arrow as shown (and a little in horizontal and vertical directions mainly with respect to the circuit board plane of the image pickup board section 105A) even when it is soldered to the CCD of the image pickup optical system 88. Even if there are variations in the stack structure of the main board 100 and the power board 102, the position of the terminals of the terminal board section 105B is easily adjusted to the position of the opening 84C of the back cover 84 which is closed last.

The back cover 84 is then mated with the front cover 83 with the circuit boards 100, 102, and 105 stacked within the front cover 83.

The assembly method of the camera of this embodiment is discussed below with reference to FIG. 21 and FIG. 22. The assembly method is discussed on the assumption that the electrical-double-layer capacitor is mounted beforehand at the predetermined location thereof in the front cover 83.

The image pickup optical system 88 with the CCD beforehand mounted to the proximal end face thereof, although not shown, is inserted into and fixed the mounting hole 83c of the front cover 83.

The main board 100 is then mounted on the front cover 83. In this case, the main board 100 is secured in alignment with the alignment projections a1 and a3 of the front cover 83 respectively received into the alignment holes b1 and b3 of the main board 100.

With screws driven through the mounting holes b4, b5, and b6 of the main board 100 into the mounting projections a2, a4, and a5 of the front cover 83, the main board 100 is stacked on the capacitor 94 on the front cover 83.

Then, the power board 102 is mounted.

The connector 103b mounted on the back surface of the power supply board section 102A of the power board 102 is connected to the connector 101 of the main board 100, while the stroboscopic board section 102B is fitted on the bottom surface of the front cover 83 in a manner such that the stroboscopic board 102B is bent to make a right angle with the power supply board 102A by means of the flexible board 102C.

The front cover 83 has a holder (not shown) for receiving the main capacitor 104 mounted on the stroboscopic board section 102B, and the holder secures the main capacitor 104 in alignment. Although it is not shown, an absorber member, such as rubber, is glued onto the sidewall of the main capacitor 104. The absorber member allows the main capacitor 104 to be tighten in contact with the sidewall of the front cover 83, and keeps the main capacitor 104 firmly held even when the camera 81 is shaken.

The image pickup board 105 is then mounted.

The CCD terminals of the image pickup optical system 88 fixed on the front cover 83 are inserted through the connection holes 105a formed in the image pickup board section 105A while the image pickup board 105 is moved onto the power supply board section 102A of the power board 102. At the same time, the connector 106 mounted on the back surface of the image pickup board section 105A is mated with the connector 103a mounted on the power supply board section 102A.

The image pickup board section 105A is fixed with screws driven into screw holes (not shown) formed on the proximal end face of the image pickup optical system 88 through the mounting holes c1, c2, and c3 in the image pickup board section 105A.

Since the CCD terminals are received into the plurality of connection holes 105a of the image pickup board section 105A with some degree of looseness allowed therebetween, positional variations of the image pickup board section 105A with respect to the image pickup optical system 88 are accommodated. In this state, each terminal projected through the connection hole 105a is soldered to trace connection patterns surrounding the connection hole 105a. In this way, the image pickup board 105 is fixed to the image pickup optical system 88 without performing positional adjustment.

The terminal board section 105B electrically connected to the image pickup board section 105A through the flexible board section 105C is fixed to the front cover 83.

The terminal board section 105B is fixed to the front cover 83 with screws respectively driven through the mounting holes c7 and c8 on the top and bottom proximal end of the terminal board section 105B into the mounting projections a7 and a8 of the front cover 83. Since the terminal board section 105B is flexibly adjusted in position by means of the flexible board section 105C as represented by the arrow in FIG. 22 (typically to be in perpendicular to the circuit board plane of the image pickup board section 105A). Even if there are variations in the stack structure of the main board 100 and the power board 102, the position of the connection terminals 91 of the terminal board section 105B is easily adjusted to the position of the opening 84C of the back cover 84 which is to be closed.

The back cover 84 is then mated with the front cover 83 with the circuit boards 100, 102, and 105 stacked inside the front cover 83. The assembly of the camera 81 is thus completed.

In the assembly method of the electronic camera, the power board 102 is stacked and mounted subsequent to the mounting of the main board 100 in the front cover 83. The present invention is not limited to this method. Alternatively, the main board 100 is mounted subsequent to the mounting of the power board 102 in the front cover 83. Since the power supply board 102A of the power board 102 is flexibly bent at the flexible board 102C in this embodiment, the main board 100 is mounted later, with the power supply board section 102A bent when the main board 100 is mounted.

The camera 81 assembled in this way has a layout characteristic of this embodiment of the present invention as shown in FIG. 24. As shown, the electrical-double-layer capacitor 94 is arranged close to the first grip portion 81A of the casing 82 in the front cover 83, and at least partly is stacked on all of the main board 100, the media slot 96, and the battery holder 95 arranged on the front cover 83 close to the first grip portion 81A of the casing 82.

The projection area of the electrical-double-layer capacitor 94 when viewed from the front of the casing 82 is smaller than that of the media slot 96. Alternatively, the projection area of the electrical-double-layer capacitor 94 may be set to be equal to that of the media slot 96.

The image pickup optical system 88 mounted in the mounting hole 83C of the front cover 83 has no portion thereof of being stacked on any of the battery holder 95, the main board 100, the power board 102, the image pickup board 105, the media slot 96, and the electrical-double-layer capacitor 94 when viewed in the direction of depth of the casing 82, although this is not shown.

In accordance with this embodiment, the flat and high-capacitance electrical-double-layer capacitor is arranged in the layout appropriate for miniaturizing the camera. Without shortening the service life of a battery, the capacitor compensates for a sharp voltage drop in voltage value in a camera operation sequence during peak power consumption. The camera is normally operated, and is prevented from deterioration of the service life of the battery associated with the sharp voltage drop. The operation of the camera is thus stabilized.

The flat and thin electrical-double-layer capacitor is used. The electrical-double-layer capacitor is stacked in the vicinity of the battery holder in the direction of depth of the camera. This arrangement is preferable from the standpoint of electrical circuit and helps miniaturize and thin the whole camera.

A media slot cover 83B may be arranged close to the first grip portion 81A of the camera, and the electrical-double-layer capacitor 94 may be stacked on the media slot 96. The entire camera is miniaturized by stacking two devices (the media slot 96 and the electrical-double-layer capacitor 94), large in area but small in thickness, on the same position. In this case, the battery holder 95 is also stacked. Since the battery holder 95 housing the power supply battery, which is the heaviest unit, and the electrical-double-layer capacitor 94 are arranged close to the first grip portion 81A, the weight balance is excellent when the user holds the camera 81. This greatly improves the ease of use of the camera. In the layout of the camera, these components do not overlap the image pickup optical system 88 in the projection area when viewed from the front of the camera. A thin structure is thus implemented in the camera.

In accordance with the present embodiment, the camera 81 of this embodiment, having a stack structure formed of a plurality of circuit boards, is easy to miniaturize and thin, and includes a board-to-board connector having a number of connection terminals to connect circuit boards. The connector itself is miniaturized. The assembly process of the camera is thus simplified, and manufacturing costs are reduced. The camera is thus miniaturized at low costs.

The use of the power board 102 and the image pickup board 105 accommodates positional variations, even if such variations arise in the assembly position of the camera due to the stack structure of the plurality of circuit boards. The alignment of the connection terminals 91 with the opening of the back cover 84, which has been conventionally difficult, is easily and reliably performed. Precise assembly is carried out, thereby improving manufacturing yields of the camera.

The main board 100 is connected to the power board 102 through the connector 101 and the connector 103b, and the power board 102 is connected to the image pickup board 105 through the connector 103a and the connector 106. The signal pathway between the circuits is substantially shortened, thereby eliminating complex wiring connections. The manufacturing yields are improved and the manufacturing costs are reduced.

Since the battery holder 95 housing the power supply battery, which is the heaviest unit, and the high-capacitance capacitor 14 are arranged inside the first grip portion 81A, the weight balance is excellent when the camera 81 is held. The ease of use is greatly improved.

The present invention is not limited to this embodiment, and a modification of this embodiment falls within the scope of the present invention.

In this embodiment, the three circuit boards, namely, the main board 100, the power board 102, and the image pickup board 105 are stacked using the connectors. The present invention is not limited to this arrangement. For example, the main board 100 and the power board 102 may be integrated into a single first circuit board 100, and the image pickup board 105 is treated as a second circuit board, and the first and second circuit boards are stacked using connectors.

In this embodiment, the power board 102 is fixed to the front cover 83 and the battery holder 95 using the screws. Alternatively, these components may be connected using connectors 103a and 103b only.

The electrical-double-layer capacitor 94 has the thin and flat configuration. The present invention is not limited to this configuration. Any appropriate configuration may be used for a layout as long as the layout is appropriate for miniaturizing and thinning the camera 81.

Since the high-capacitance electrical-double-layer capacitor is arranged in a layout appropriate for miniaturizing the camera in this embodiment as described above, the devices in the camera are stabilized, and the camera is miniaturized and thinned. The camera is also provided with excellent weight balance.

In accordance with this embodiment, the camera having no chassis in the assembly thereof employs a board-to-board connector, which features improved reliability and compact design. The ease of assembly of the camera is improved, and the miniaturization of the camera is promoted at low costs.

Sixth Embodiment

A sixth embodiment of the present invention is discussed below referring to the drawings.

Figure 25A:
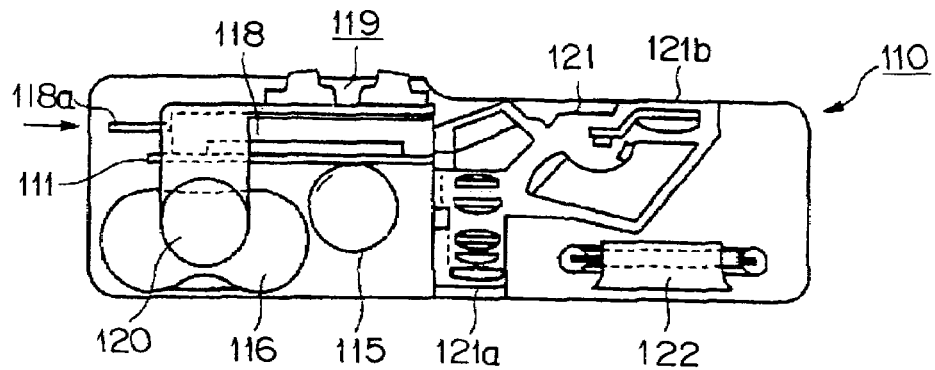
FIG. 25A illustrates the top structure of an electronic camera in accordance with a sixth embodiment of the present invention.
Figure 25B:
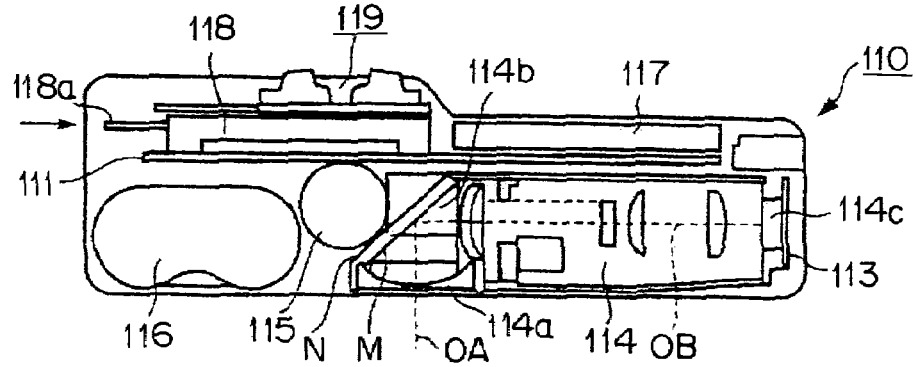
FIG. 25B illustrates the positional relationship between a bending type optical system and a stroboscopic capacitor in the camera of the sixth embodiment of the present invention.
Figure 25C:
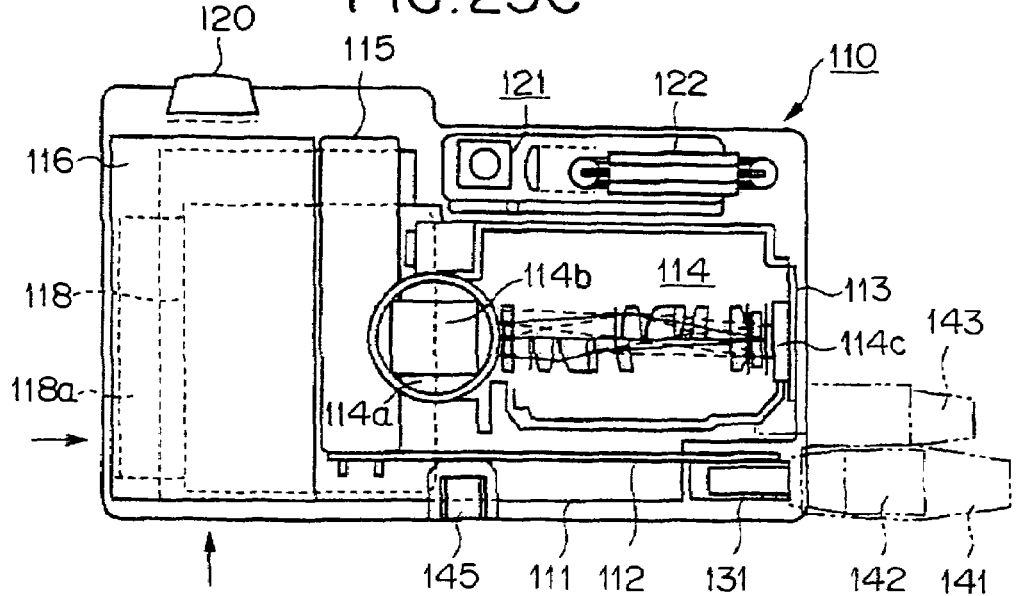
FIG. 25C illustrates the structure of the camera of the sixth embodiment of the present invention, viewed from the front thereof.

FIGS. 25A through 25C illustrate the sixth embodiment of the camera of the present invention. FIGS. 25A through 25C schematically illustrate the construction of the electronic camera in accordance with the sixth embodiment of the present invention. FIG. 25A illustrates the top structure of the camera, FIG. 25B illustrates the positional relationship between a bending type optical system and a stroboscopic capacitor in the camera, and FIG. 25C illustrates the structure of the camera, viewed from the front thereof.

FIGS. 26A through 26C also illustrate the electronic camera in accordance with the sixth embodiment of the present invention, FIG. 26A illustrates the structure of the electronic camera, viewed from the front thereof, FIG. 26B illustrates the structure thereof, viewed from the right-hand side thereof with respect to the front of the camera, and FIG. 26C illustrates the structure of the electronic camera, viewed from the bottom of the camera.

Referring to FIG. 25A through FIG. 26C, there is shown a camera body 110, in which a variety of components are assembled in a predetermined layout within two split outer housing covers as described below. A main board 111 is arranged in the camera body 110 in a manner such that a main board 111 partitions the internal space of the camera body 110 into front and back portions. A bottom board 112 is arranged to be in parallel with and in the vicinity of the bottom inner surface of the camera body 110. An image pickup board 113 is arranged in parallel with the one sidewall of the camera body 110.

An optical axis bending type photographing optical system 114 is arranged at a right-hand half of the main board 111 when viewed from the front of the camera. Referring to FIG. 25B, the photographing optical system 114 includes, in the vicinity of a light entrance area (behind a photographing lens 114a), a prism 114b having a reflective surface M at about 45° with respect to the optical axis OA of an incident light beam. The photographing axis bending type photographing optical system 114 reflects the incident light beam from the reflective surface M, and thus bends the photographing optical axis so that an optical axis OB of the light beam reflected from the reflective surface M is aligned with the direction of width of the camera body 110. In this way, the subject image light beam incident on the photographing lens 114a positioned substantially at the center front of the camera body 110 is reflected from the reflective surface M of the photographing optical system 114, and is guided to the CCD image pickup device 114c on the image pickup board 113 which is arranged on the right-hand end portion of the camera body 110 when viewed from the front of the camera. An inclined surface N which is substantially parallel with the reflective surface M is at the back surface of the prism 114b.

A cylindrical stroboscopic capacitor 115 substantially coextends with the vertical height of the camera body 110. The stroboscopic capacitor 115 is mounted on the bottom board 112 with a part of the circumference thereof in close vicinity with the back surface of the prism 114b, namely, the inclined surface N, and with the length direction thereof perpendicular to the bottom plane of the camera body 110.

A battery pack 116 includes two AA batteries in a unitary body, and is inserted from the bottom surface of the camera body 110 as indicated by an arrow and installed in a region next to the stroboscopic capacitor 115 (a left-hand side region when viewed from the front of the camera).

A photographing image display LCD 117 is arranged at the rear surface of the main board 111 on the right-hand side region (behind the photographing optical system 114) when viewed from the front of the camera and the display screen of the photographing image display LCD 117 is exposed through the back surface of the camera body 110. A media connector 118 is arranged at the rear surface of the main board 111 in parallel with the main board 111 on the left-hand side portion (behind the stroboscopic capacitor 115 and the battery pack 116) when viewed from the front of the camera. A card-type recording medium, namely, a smart medium 118a, is loaded into and unloaded from the left-hand sidewall of the camera body 110 as shown by an arrow.

An operation button of an operation switch 119 is exposed through the back surface of the camera body 110 and is arranged behind the media connector 118. A release button 120 is arranged above the battery pack 116 with the top portion thereof exposed through the top surface of the camera body 110.

An optical finder 121 is arranged above the optical axis bending type photographing optical system 114 and close to the stroboscopic capacitor 115.

The optical finder 121 includes a finder front window 121a on the front of the camera body 110, and a finder eyepiece window 121b on the back of the camera body 110.

A stroboscopic light emission unit 122 is mounted near the optical finder 121 with the light emission window thereof exposed through the front of the camera body 110.

A plurality of jacks 131, 132, and 133 (three jacks in this embodiment) for electrical connection with external devices (not shown) are arranged below the optical axis bending type photographing optical system 114.

The jack 131 is an external power supply jack, the jack 132 is a video output jack, and the jack 133 is a serial bus jack (such as for USB) for signal communication. The two jacks adjacent to each other, namely, the external power supply jack 131 and the video output jack 132, have plug sockets thereof on the right-hand sidewall of the camera body 110, and are arranged side by side below the bottom board 112 mounted in parallel with the bottom plane of the camera body 110.

The two adjacent jacks 131 and 132 are tilted from each other with axes thereof making an predetermined angle $\alpha$ so that plugs 141 and 142 make an angle when the plugs 141 and 142 are respectively inserted into the jacks 131 and 132. In this case, the axis line AX1 of the one jack 131 makes the angle $\alpha$ with respect to the axis line AX2 of the other jack 132. Designated 143 is a plug mated with the jack 133, and 145 is a mounting hole for a tripod.

In the electronic camera of this embodiment, as described above, the stroboscopic capacitor 115 having a relatively large volume, out of the components housed in the camera body 110, is arranged in dead space behind the prism 114b. The utilization of mounting space inside the camera body 110 is thus improved. With the optical axis bending type photographing optical system 114 mounted, the already thin camera is further miniaturized.

The features of the sixth embodiment of the present invention are listed as below.

[1] The electronic camera of this embodiment includes the camera body 110, the optical axis bending type photographing optical system 114 having, in the vicinity of the light entrance area of the camera body 110, the reflective surface M inclined with respect to the optical axis OA of the incident light beam to align an optical axis OB of the light beam reflected from the reflective surface with the direction of width of the camera body 110, and the stroboscopic capacitor 115 mounted with a portion of the circumference thereof in close vicinity with the back surface of the reflective surface M of the optical axis bending type photographing optical system 114, and with the length direction thereof perpendicular to the bottom plane of the camera body 110.

In the electronic camera of this embodiment, the stroboscopic capacitor 115 having a relatively large volume, out of the components housed in the camera body 110, is arranged in dead space behind the reflective surface M. The utilization of mounting space inside the camera body 110 is thus improved. Components surrounding the stroboscopic capacitor 115 close to the optical axis bending type photographing optical system 114 are efficiently installed inside the camera body 110. With the optical axis bending type photographing optical system 114 mounted, the already thin camera is further miniaturized.

[2] In the electronic camera of this embodiment, in accordance with the camera specified in feature [1], the reflective surface M is a reflective surface of the prism 114b in the optical axis bending type photographing optical system 114.

[3] In the electronic camera of this embodiment, in accordance with the camera specified in feature [1], the reflective surface M is a reflective surface of a reflective mirror of the optical axis bending type photographing optical system 114.

[4] In the electronic camera of this embodiment, in accordance with the camera specified in feature [1], the reflective surface M is positioned substantially at the center of the width of the camera body 110.

[5] In the electronic camera of this embodiment, in accordance with the camera specified in feature [2], the stroboscopic capacitor 115 substantially coextends with the vertical height of the camera body 110, and is mounted on the bottom board 112 which is arranged in close vicinity to and in parallel with the bottom plane of the camera.

Since the stroboscopic capacitor 115 relatively large in volume and relatively heavy in weight is stably and reliably fixed substantially at the center inside the camera body 110 in the electronic camera, the center of gravity of the camera lies close to the center of the camera, and the weight balance of the camera is thus excellent.

[6] In the electronic camera of this embodiment, in accordance with the camera specified in one of features [1] through [5], the optical finder 121 is arranged above the photographing optical system 114 and adjacent to the stroboscopic capacitor 115.

In the modification of the this embodiment, a reflective mirror may be substituted for the prism 114b having the reflective surface M.

The sixth embodiment of the present invention provides the electronic camera having the following advantages.

(a) Since the stroboscopic capacitor having a relatively large volume is arranged in dead space behind the reflective surface, mounting space inside the camera body is effectively used in the camera having optical axis bending optical system.

(b) Components surrounding the stroboscopic capacitor close to the optical axis bending type photographing optical system are efficiently installed within the camera body. With the optical axis bending type photographing optical system mounted, the already thin camera is further miniaturized.

Seventh Embodiment

A seventh embodiment of the present invention will now be discussed referring to the drawings.

FIGS. 27A through 37C illustrate the camera of the seventh embodiment of the present invention.

Figure 27A:
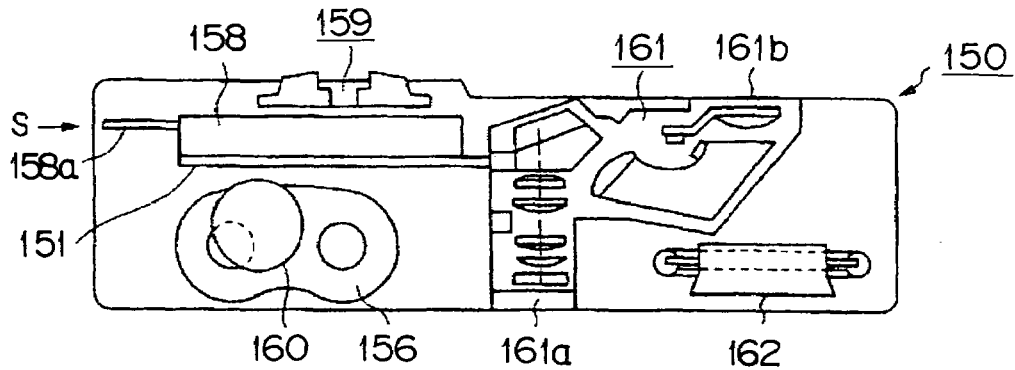
FIG. 27A illustrates the top structure of a camera in accordance with a seventh embodiment of the present invention.

FIGS. 27A through 28C roughly illustrate the construction of the electronic camera in accordance with seventh embodiment of the present invention. FIG. 27A illustrates the top structure of the camera, FIG. 27B illustrates the positional relationship between a bending optical system and a stroboscopic capacitor in the camera, and FIG. 27C illustrates the structure of the camera viewed from the front thereof.

FIGS. 28A through 28C also illustrate the electronic camera in accordance with the seventh embodiment of the present invention, FIG. 28A illustrates the structure of the camera, viewed from the front thereof, FIG. 28B illustrates the structure of the camera, viewed from the right-hand side thereof with respect to the front of the camera, and FIG. 28C illustrates the structure of the camera, viewed from the bottom of the camera.

Referring to FIG. 27A through 28C, there is shown a camera body 150, in which a variety of components is assembled in a predetermined layout within two split outer housing covers as described below. A main board 151 is arranged inside the camera body 150 in a manner such that the main board 151 partitions the internal space of the camera body 150 into front and back portions. A sub-board 151A is arranged in parallel with the main board 151. An image pickup board 153 is arranged in parallel with the right-hand side surface of the camera body 150.

Figure 27B:
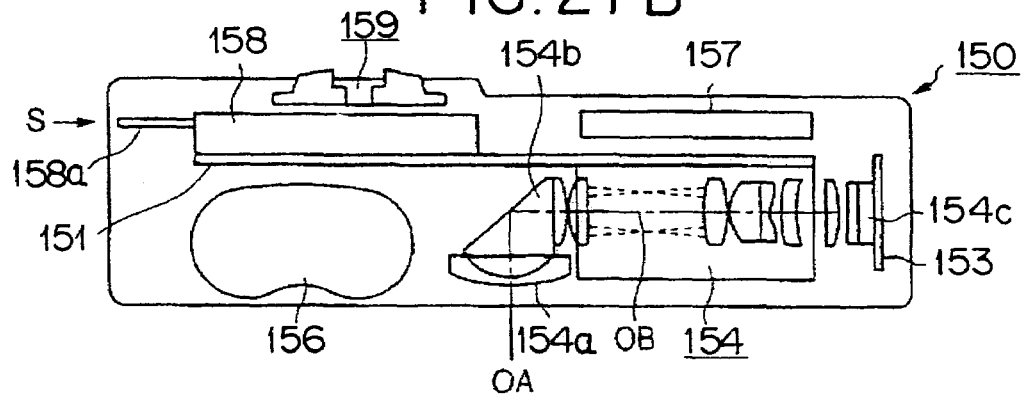
FIG. 27B illustrates the positional relationship between a bending optical system and a stroboscopic capacitor in the camera of the seventh embodiment of the present invention.
Figure 27C:
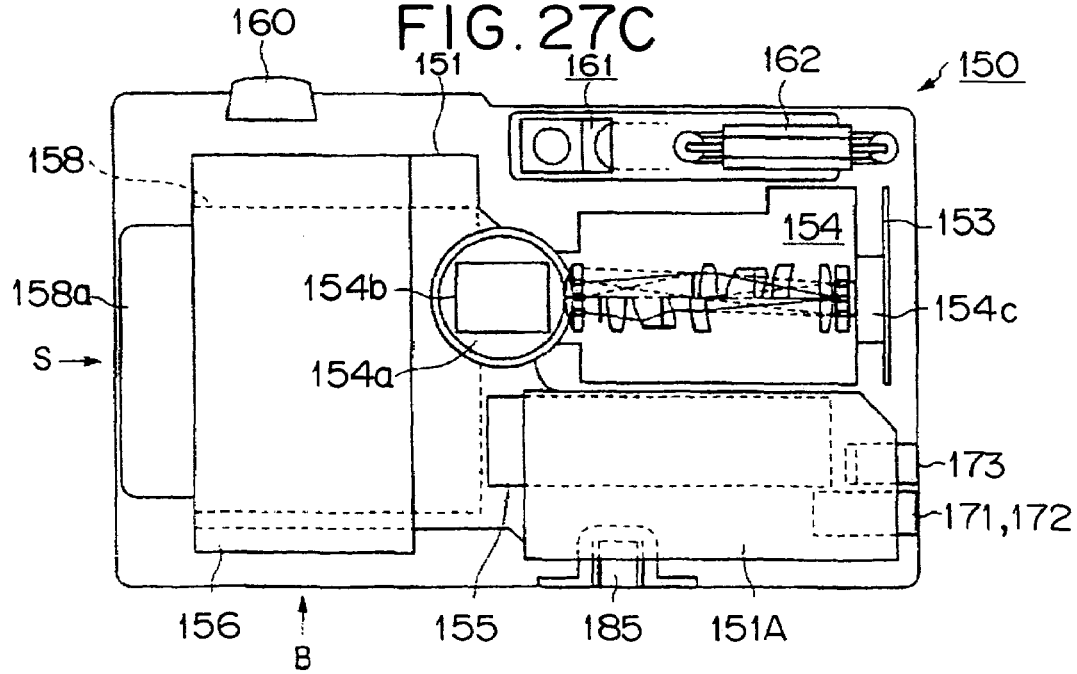
FIG. 27C illustrates the structure of the camera of the seventh embodiment of the present invention, viewed from the front thereof.

An optical axis bending type photographing optical system 154 is arranged in the right half portion of the main board 151 when viewed from the front of the camera. Referring to FIG. 27B, the photographing optical system 154 includes, in the vicinity of a light entrance area thereof (behind a photographing lens 154a), a prism 154b having a reflective surface M at about 45° with respect to the optical axis OA of an incident light beam. The photographing optical system 154 reflects the incident light beam off the reflective surface M, and thus bends the photographing optical axis so that an optical axis OB of the light beam reflected from the reflective surface M is aligned with the direction of width of the camera body 150 (in horizontal width in this embodiment). The direction of the optical axis OB subsequent to reflection is in the length direction of the photographing optical system 154, and the photographing optical system 154 is arranged in the camera body 150 so that the length direction of the photographing optical system 154 is aligned to be parallel with the bottom plane of the camera.

In this way, the subject image light beam incident on the photographing lens 154a positioned substantially at the center of the width of the camera body 150 (the horizontal width in this embodiment) is reflected from the reflective surface M of the photographing optical system 154, and is guided to the CCD image pickup device 154c on the image pickup board 153 which is arranged on the right-hand end of the camera body 150 when viewed from the front of the camera.

An optical finder 161 is arranged above the optical axis bending type photographing optical system 154. As is known, the optical finder 161 includes a bending optical system characteristic of the optical finder, and the longitudinal axis of the optical finder 161 is substantially parallel with the length direction of the photographing optical system 154. The light entrance area of the optical finder 161, namely, a finder front window 161a, is arranged on the front of the camera body 150 in a manner such that the finder front window 161a comes just above the light entrance area of the photographing optical system 154. A finder eyepiece window 161b of the optical finder 161 is arranged on the back surface of the camera body 150.

A stroboscopic light emission unit 162 is mounted adjacent to the optical finder 161 and above an image pickup device 154c arranged at the distal end of the photographing optical system 154, with the light emission window thereof exposed through the front of the camera body 150.

A cylindrical stroboscopic capacitor 155 is mounted on the sub-board 151A, below the photographing optical system 154, with the length direction thereof aligned in parallel with the length direction of the photographing optical system 154.

A battery pack 156 includes two AA batteries in a unitary body, and is inserted from the bottom surface of the camera body 150 as indicated by an arrow B and installed in a region next to the stroboscopic capacitor 155 (a left-hand side region when viewed from the front of the camera).

A photographing image display LCD 157 is arranged on the right-hand side region of the main board 151 (behind the photographing optical system 154) when viewed from the front of the camera and the display screen of the photographing image display LCD 157 is exposed through the back surface of the camera body 150. A media connector 158 is arranged at the rear surface of the main board 151 on the left-hand side portion thereof (behind the battery pack 116) when viewed from the front of the camera. A card-type recording medium, namely, a smart medium 158a, is loaded into and unloaded from the media connector 158 through the left-hand sidewall of the camera body 150 as shown by an arrow S.

An operation switch 159 is arranged behind the media connector 158 with the operation button thereof exposed through the back surface of the camera body 150. A release button 160 is arranged above the battery pack 156 with the top portion thereof exposed through the top surface of the camera body 150.

A plurality of jacks 171, 172, and 173 (three jacks in this embodiment) for electrical connection with external devices (not shown) is arranged below the stroboscopic capacitor 155 on the right-hand side of the camera body 150 when viewed from the front of the camera, with plug sockets thereof opened on the right-hand sidewall of the camera body 150.

The jack 171 is an external power supply jack, the jack 172 is a video output jack, and the jack 173 is a serial bus jack (such as for USB). The external power supply jack 171 is mounted on one side of the sub-board 151A arranged perpendicular to the bottom surface of the camera body 150. The video output jack 172 and the serial bus jack (USB) are arranged in parallel with the back surface of the main board 151. Designated 185 is a tripod hole.

In the electronic camera of this embodiment, as discussed above, a plurality of optical units each having an elongated shape, namely, the optical finder 161, the photographing optical system 154, the stroboscopic capacitor 155, etc. are stacked in parallel with the bottom surface of the camera 150 inside the camera 150, with the length directions thereof aligned. This arrangement leaves less space unused between the stacked optical units. At least the height dimension of the camera body 150 is reduced. With the optical axis bending type photographing optical system 154 mounted, the already thin camera is further miniaturized (with the height dimension reduced).

(First Modification)

Figure 29A:
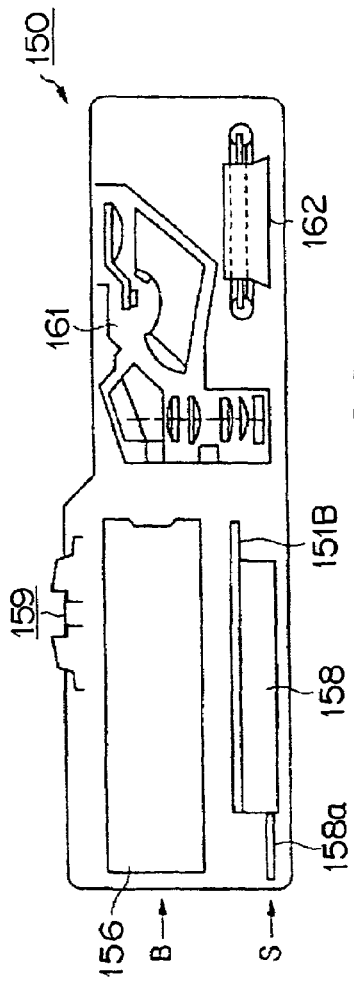
FIG. 29A illustrates the top structure of the camera in accordance with a first modification of the seventh embodiment of the present invention.
Figure 29B:
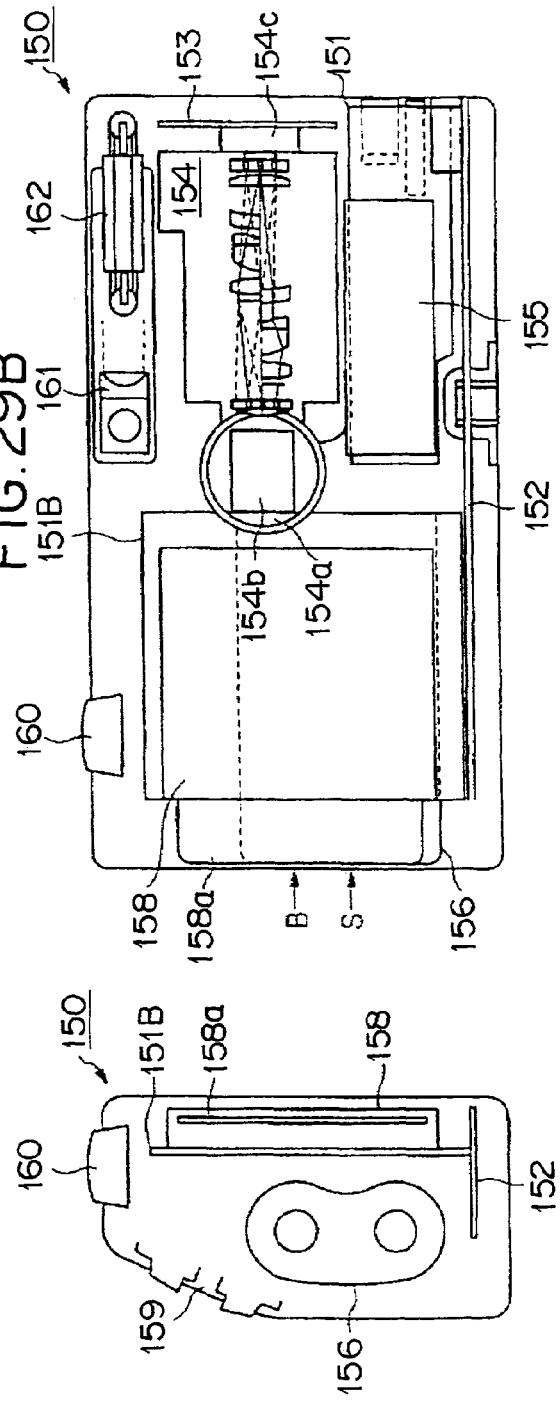
FIG. 29B illustrates the structure of the camera in accordance with the first modification of the seventh embodiment of the present invention, viewed from the front thereof.
Figure 29C:
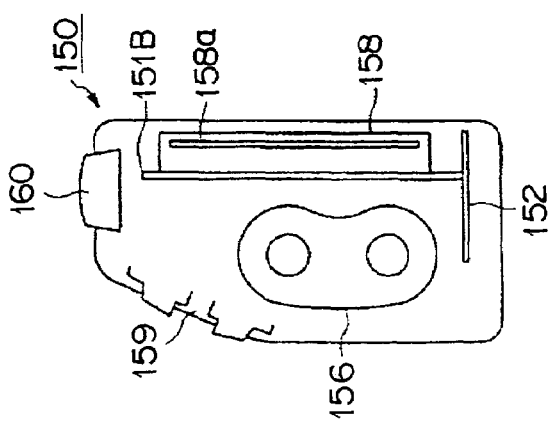
FIG. 29C illustrates the structure of the camera in accordance with the first modification of the seventh embodiment of the present invention, viewed from the left-hand side thereof with respect to the front of the camera.

FIGS. 29A through 30C roughly illustrate an electronic camera in accordance with a first modification of the seventh embodiment. FIG. 29A illustrates the top structure of the camera, FIG. 29B illustrates the front structure of the camera, and FIG. 29C illustrates the structure of the camera, viewed from the left-hand side thereof with respect to the front of the camera.

FIGS. 30A through 30C also schematically illustrate the electronic camera of the first modification of the seventh embodiment. FIG. 30A illustrates the structure of the camera viewed from the front thereof, FIG. 30B illustrates the structure of the camera, viewed from the right-hand side thereof with respect to the front of the camera, and FIG. 30C illustrates the structure of the camera viewed from the bottom side of the camera.

The main difference between the seventh embodiment (hereinafter referred to as a basic embodiment) described with reference to FIGS. 27A through 28C and the first modification thereof lies in that the battery holder is arranged with the length direction thereof aligned in parallel with the bottom surface of the camera so that the battery pack 156 is inserted together with the smart medium 158a to the camera body 150 on the left-hand side of the camera in the directions represented by the arrows B and S. Designated 151B is a sub-board. In accordance with this modification, the battery pack 156 is arranged with the length direction thereof aligned in parallel with the bottom surface of the camera, and the camera height is further reduced compared with the basic embodiment. The construction of the camera of the modification other than this point remains unchanged from that of the basic embodiment, and the discussion thereof is omitted here.

(Second Modification)

Figure 31A:
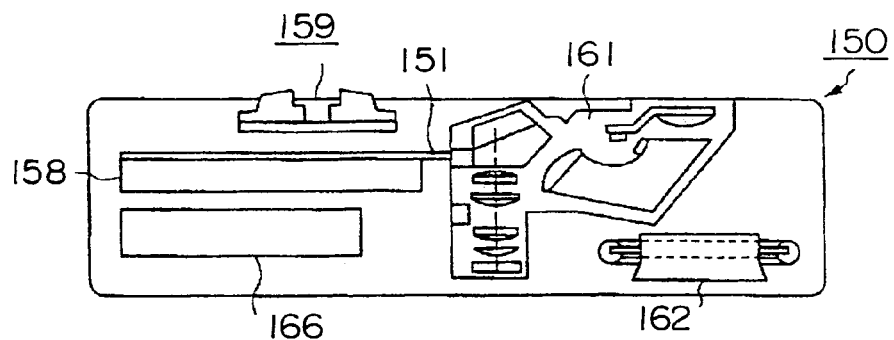
FIG. 31A illustrates the top structure of the camera in accordance with a second modification of the seventh embodiment of the present invention.
Figure 31B:
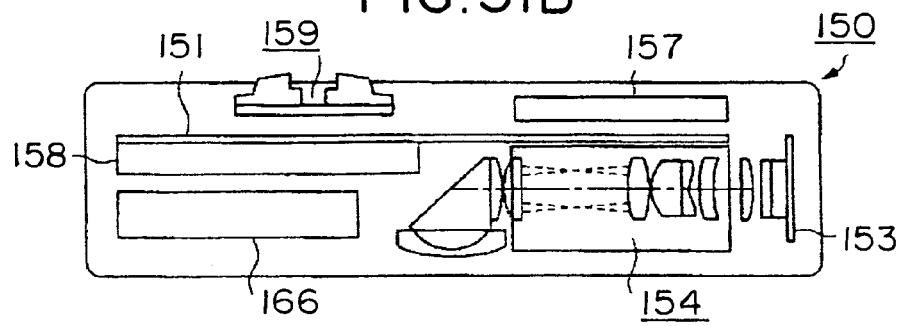
FIG. 31B illustrates the positional relationship between a bending optical system and a stroboscopic capacitor in the camera of the second modification of the seventh embodiment of the present invention.
Figure 31C:
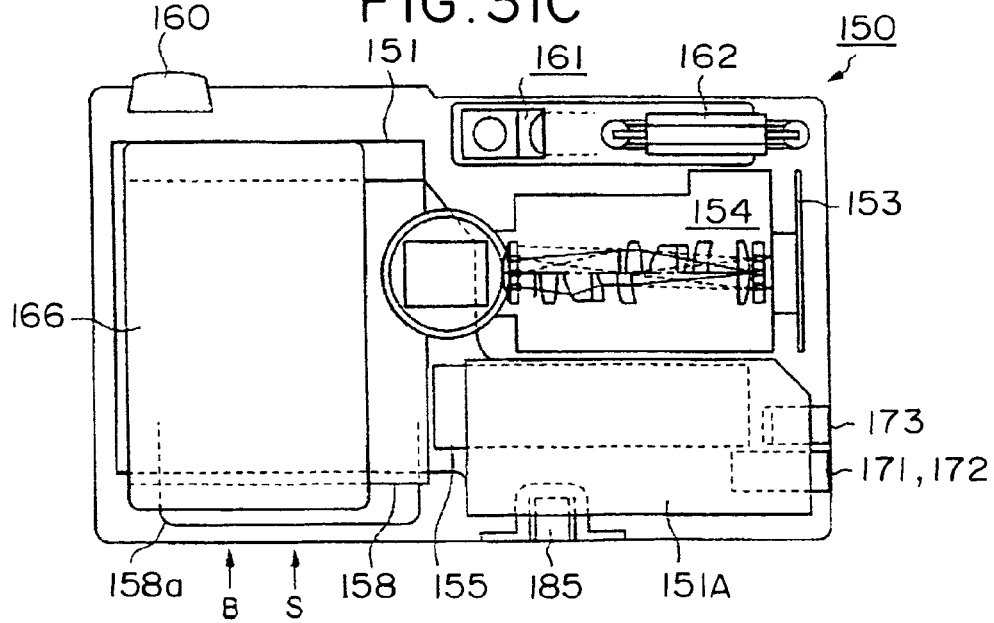
FIG. 31C illustrates the structure of the camera in accordance with the second modification of the seventh embodiment of the present invention, viewed from the front thereof.

FIGS. 31A through 32C schematically illustrate an electronic camera in accordance with a second modification of the basic embodiment. FIG. 31A illustrates the top structure of the camera, FIG. 31B illustrates the positional relationship between a bending optical system and a stroboscopic capacitor in the camera, and FIG. 31C illustrates the structure of the camera viewed from the front thereof.

FIGS. 32A through 32C also illustrate the electronic camera in accordance with the second modification of the seventh embodiment, FIG. 32A illustrates the structure of the camera viewed from the front thereof, FIG. 32B illustrates the structure of the camera viewed from the right-hand side thereof with respect to the front of the camera, and FIG. 32C illustrates the structure of the camera viewed from the bottom side of the camera.

The main difference of the second modification from the basic embodiment is that a box-like battery 166 is used as a battery, and that the media connector 158 is arranged perpendicular to the bottom surface of the camera so that the box-like battery 166 and the smart medium 158a are loaded in and unloaded from the camera body 150 through the bottom surface of the camera body 150 as represented by arrows B and S. Since both the box-like battery 166 and the smart medium 158a are arranged perpendicular to the bottom surface of the camera in accordance with this modification, the width dimension of the camera is reduced compared with the basic embodiment. The construction of the second modification other than this point remains unchanged from that of the basis embodiment, and the discussion thereof is omitted here.

(Third Modification)

FIGS. 33A through 33C illustrate an electronic camera in accordance with a third modification of the basic embodiment. FIG. 33A illustrates the top structure of the camera, FIG. 33B illustrates the structure of the camera viewed from the front thereof, and FIG. 33C illustrates the structure of the camera viewed from the left-hand side thereof with respect to the front of the camera.

The main difference of the third modification from the first modification is that the box-like battery 166 is used as a battery instead of the battery pack 156. In accordance with this modification, as in the first modification, the height dimension of the camera is reduced for the same reason in the first modification. Furthermore, the comparison of FIGS. 29C and 33C clearly shows that the use of the box-like battery 166 further reduces the thickness dimension of the left-half of the camera body 150 housing the box-like battery 166, when viewed from the front of the camera. The construction other than this point remains unchanged from that of the first modification, and the discussion thereof is omitted here.

(Fourth Modification)

Figure 34A:
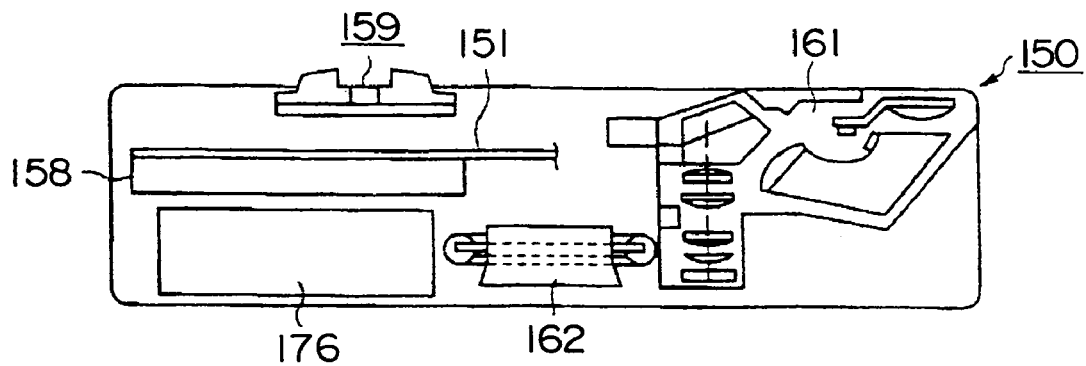
FIG. 34A illustrates the top structure of the camera in accordance with a fourth modification of the seventh embodiment of the present invention.
Figure 34B:
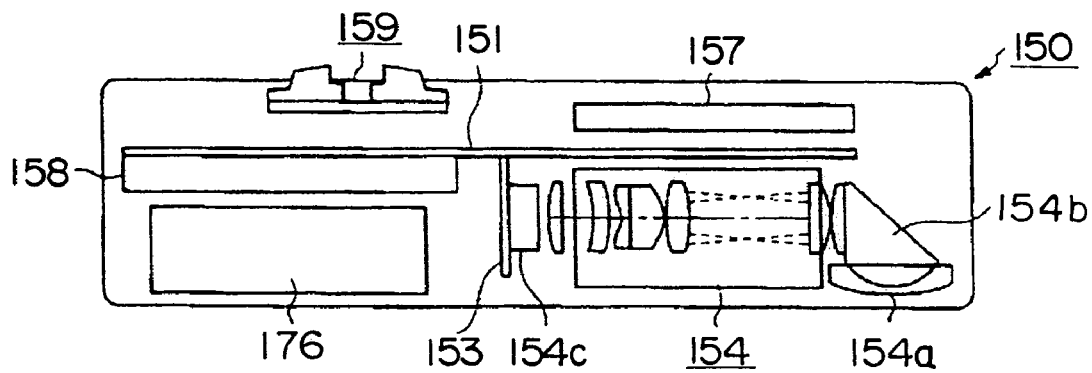
FIG. 34B illustrates the positional relationship between a bending optical system and a stroboscopic capacitor in the camera of the fourth modification of the seventh embodiment of the present invention.
Figure 34C:
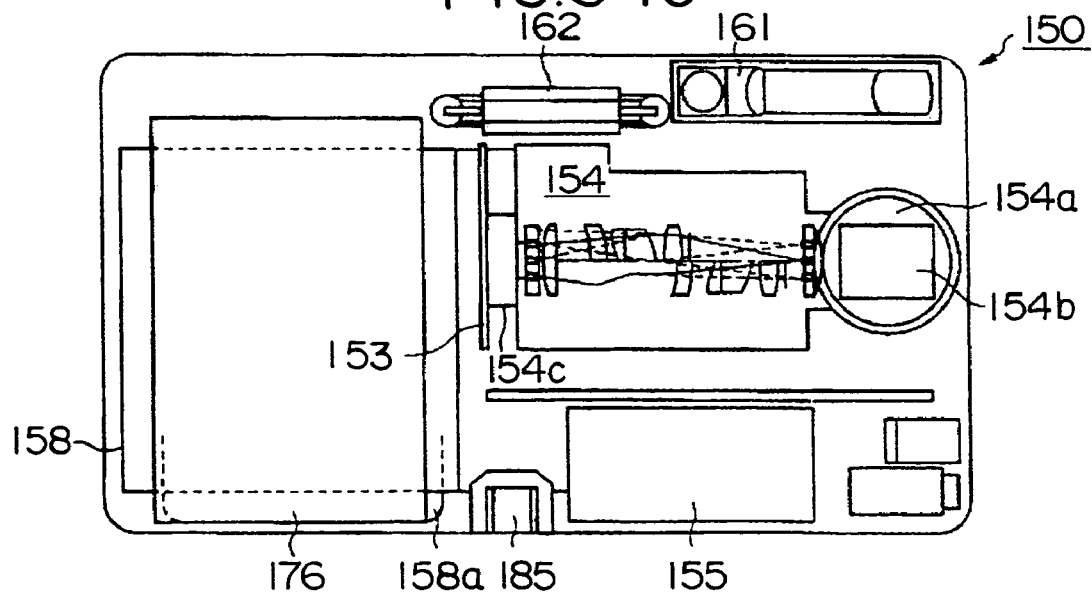
FIG. 34C illustrates the structure of the camera in accordance with the fourth modification of the seventh embodiment of the present invention, viewed from the front thereof.

FIGS. 34A through 35C schematically illustrate an electronic camera in accordance with a fourth modification of the basic embodiment. FIG. 34A illustrates the top structure of the camera, FIG. 34B illustrates the positional relationship between a bending optical system and a stroboscopic capacitor in the camera, and FIG. 34C illustrates the structure of the camera viewed from the front thereof.

FIGS. 35A through 35C also schematically illustrate the electronic camera of the fourth modification of the basic embodiment. FIG. 35A illustrates the structure of the camera viewed from the front thereof, FIG. 35B illustrates the structure of the camera viewed from the right-hand side thereof with respect to the front thereof, and FIG. 35C illustrates the structure of the camera viewed from the bottom side of the camera.

The main difference of the fourth modification from the second modification is that a photographing lens 154a as the light incident area of an optical axis bending type image pickup optical system 154 is arranged close to the right-hand end of the camera body 150 when viewed from the front thereof. In accordance with this modification, the subject image light beam, incident on and transmitted through the photographing lens 154a as the light incident area arranged on the right-hand portion of the camera body 150 when viewed from the front thereof, is reflected from a prism 154b and is guided to a CCD image pickup device 154c on an image pickup board 153 arranged at the center of the width of the camera body 150. Designated 176 is a box-battery having a relatively large capacity. This modification also provides the same advantages as those of the second modification. The construction of this modification other than this arrangement remains unchanged from that of the second modification.

(Fifth Modification)

FIGS. 36A through 37C schematically illustrate an electronic camera in accordance with a fifth modification of the basic embodiment. FIG. 36A illustrates the top structure of the camera, FIG. 36B illustrates the structure of the camera viewed from the front thereof, and FIG. 36C illustrates the structure of the camera viewed from the left-hand side thereof with respect to the front of the camera.

FIGS. 37A through 37C also schematically illustrate the electronic camera of the fifth modification of the basic embodiment, FIG. 37A illustrates the structure of the camera viewed from the front thereof, FIG. 37B illustrates the structure of the camera viewed from the right-hand side of the camera with respect to the front thereof, and FIG. 37C illustrates the structure of the camera viewed from the bottom side of the camera.

The main difference of the fifth modification from the first modification is that the optical axis bending type photographing optical system 154 is arranged on the left-hand side of the camera body 150 with respect to the center thereof (on the side of a grip portion) when viewed from the front thereof, that a battery holder 186 is arranged below the photographing optical system 154, and that a stroboscopic capacitor 155 is arranged right below an optical finder 161 and a stroboscopic light emission unit 162 with a media connector 158 mounted therebelow. In this modification, a battery pack 156 is loaded into the camera body 150 through the left-hand sidewall of the camera body 150 as represented by an arrow B, and a smart medium 158a is loaded into the camera body 150 through the right-hand sidewall of the camera body 150 as represented by an arrow S. Like the optical axis bending type photographing optical system 154 of the fourth modification, the optical axis bending type photographing optical system 154 of this modification includes a photographing lens 154a constituting a light entrance area on the right-hand side of the camera body 150 when viewed from the front thereof, and a CCD image pickup device 154c on the left-hand side of the camera body 150 when viewed from the front thereof.

Since the battery pack 156 and the smart medium 185a are arranged with the length directions thereof aligned in parallel with the bottom plane of the camera in this modification, the fifth modification provides the same advantages as those of the first modification. The construction of the fifth modification other than the above arrangement remains unchanged from that of the first modification, and the discussion thereof is omitted here.

(Features of the Seventh Embodiment)

[1] The electronic camera of this embodiment includes the camera body 150, the photographing optical system 154 having, in the vicinity of the light incident area (the photographing lens 154a) of the camera body 150, the reflective surface M for bending the optical axis so that the optical axis OB of the light beam reflected from the reflective surface M is aligned with the longitudinal axis of the photographing optical system 154 which is in parallel with the bottom plane of the camera, the optical finder 161 arranged above the photographing optical system 154 in a manner such that the length direction thereof is aligned with the length direction of the photographing optical system 154, and the stroboscopic capacitor 155 arranged blow the photographing optical system 154 in a manner such that the length direction thereof is aligned with the length direction of the photographing optical system 154.

In the above electronic camera having the optical axis bending type photographing optical system 154, the plurality of optical units each having an elongated shape, namely, the optical finder 161, and the stroboscopic capacitor 155 are stacked in parallel with the bottom surface of the camera 150 inside the camera 150 with the length directions thereof aligned with the length direction of the photographing optical system 154. This arrangement leaves less space unused between the stacked optical units. At least the height dimension of the camera body 150 is reduced. With the optical axis bending type photographing optical system 154 mounted, the already thin camera is further miniaturized.

[2] In the electronic camera of this embodiment, in accordance with the camera stated in [1], the photographing optical system 154 is arranged so that the light incident area thereof (the photographing lens 154a, etc.) is mounted at the center of the width of the camera body 150.

Since the light incident area is positioned at the center of the width (the horizontal width or vertical height) of the camera body 150, the image pickup device 154c at the back end of the photographing optical system 154 is naturally placed close to one of the two opposed ends of the camera body 150. The photographing optical system 154 is thus housed in the right-hand half or the left-hand half of the camera body 150. The optical units surrounding the photographing optical system 154 are mounted in a more orderly manner.

[3] In the electronic camera of this embodiment, in accordance with the camera stated in feature [1], the photographing optical system 154 is arranged so that the light incident area thereof (the photographing lens 154a, etc.) is mounted at one end of the width of the camera body 150.

Since the light incident area is positioned at the one end of the width (the horizontal width or vertical height) of the camera body 150, the image pickup device 154c at the back end of the photographing optical system 154 is naturally placed close to the center of the width of the camera body 150. The photographing optical system 154 is thus housed in the right-hand half or the left-hand half of the camera body 150. The optical units surrounding the photographing optical system 154 are mounted in a more orderly manner.

[4] In the electronic camera of this embodiment, in accordance with the camera stated in feature [1] or [2] or [3], the light incident area (the front window 161a) of the optical finder 161 is arranged right above the light incident area (the photographing lens 154a) of the photographing optical system 154, and the stroboscopic light emission unit 162 is arranged in the vicinity of the optical finder 161 and above the image pickup device 154c at the back end of the photographing optical system 154.

Since the light incident area (the front window 161a) of the optical finder 161 and the light incident area (the photographing lens 154a) of the photographing optical system 154 are arranged in close vicinity to each other in the electronic camera, a difference in angle of view therebetween is small and a so-called parallax is reduced. Since the spacing between the light incident area (the photographing lens 154a) of the photographing optical system 154 and the stroboscopic light emission unit 162 is large, an angle of irradiation of stroboscopic light with respect to the photographing optical axis OA widens. As a result, the so-called red-eye effect is reduced during stroboscopic light emission.

[5] The electronic camera of this embodiment includes the camera body 150, the photographing optical system 154 having, in the vicinity of the light incident area (the photographing lens 154a) of the camera body 150, the prism 154b for bending the optical axis so that the optical axis OB subsequent to reflection is aligned with the longitudinal axis of the photographing optical system 154 which is in parallel with the bottom plane of the camera, the photographing optical system 154 being arranged on the left-hand side (on the side of the grip portion) with respect to the center of the camera body 150 when viewed from the front of the camera, and a battery holder 186 arranged below the photographing optical system 154.

In the electronic camera of this embodiment, the reflective surface may be substituted for the prism 154b having the reflective surface M.

The seventh embodiment of the present invention provides the electronic camera having the following advantages.

(a) In the electronic camera having the optical axis bending type photographing optical system, the plurality of optical units each having an elongated shape (for example, the optical finder, the stroboscopic capacitor, etc.) are stacked inside the camera in parallel with the bottom surface of the camera, and with the length directions thereof aligned with the length direction of the photographing optical system. This arrangement leaves less space unused between the stacked optical units. At least the height dimension of the camera body is reduced.

(b) With the optical axis bending type photographing optical system 154 mounted, the already thin camera is further miniaturized (with the height dimension reduced).

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A camera comprising:
   a first lens unit, formed of a plurality of lenses, on which a light beam is incident from a subject,
   a reflective member for reflecting a light beam, which has come from the subject and has been transmitted through the first lens unit, in a direction substantially perpendicular to the optical axis of the first lens unit,
   a first diaphragm member which is arranged on a surface of a lens of the first lens unit closest to the reflective member with the surface of the lens facing the reflective member, and which blocks unwanted rays of light other than the light beam that contributes to the forming of the image of the subject on an image formation surface,
   a second lens unit, formed of a plurality of lenses, on which the light beam reflected from the reflective member is incident,
   at least either one of a second diaphragm member or an unwanted ray-of-light reflection prevention member; wherein the second diaphragm member is arranged between the first lens unit and the second lens unit, and blocks unwanted rays of light that travel outside the outermost periphery at which the light beam forming the subject image traveling from the first lens unit to the reflective member intersects the light beam forming the subject image traveling from the reflective member to the second lens unit, and the unwanted ray-of-light reflection prevention member is arranged on the reflective member to prevent rays of light from being reflected from a region thereof other than the region thereof on which the light beam forming the subject image is incident, and
   a third diaphragm member, arranged in the vicinity of a surface of the lens of the second lens unit closest to the reflective member with the surface of the lens facing the reflective member, for blocking unwanted rays of light other than the light beam contributing to the formation of the subject image.

2. A camera comprising:
   a first lens unit, formed of a plurality of lenses, on which a light beam is incident from a subject,
   a reflective member for reflecting a light beam, which has come from the subject and has been transmitted through the first lens unit, in a direction substantially perpendicular to the optical axis of the first lens unit, a first diaphragm member which is arranged on a surface of a lens of the first lens unit closest to the reflective member with the surface of the lens facing the reflective member, and which blocks unwanted rays of light other than the light beam that contributes to the forming of the image of the subject on an image formation surface, a second lens unit, formed of a plurality of lenses, on which the light beam reflected from the reflective member is incident, a second diaphragm member which is arranged between the first lens unit and the second lens unit, and blocks unwanted rays of light that travel outside the outermost periphery at which the light beam forming the subject image traveling from the first lens unit to the reflective member intersects the light beam forming the subject image traveling from the reflective member to the second lens unit, a third diaphragm member, arranged in the vicinity of a surface of the lens of the second lens unit closest to the reflective member with the surface of the lens facing the reflective member, for blocking unwanted rays of light other than the light beam contributing to the formation of the subject image, and an unwanted ray-of-light reflection prevention member which is arranged on the reflective member to prevent rays of light from being reflected from a region thereof other than the region thereof on which the light beam forming the subject image is incident.

3. The camera according to claim 1, wherein the reflective member is arranged on only an area where the light beam forming the subject image is incident.

4. The camera according to claim 1, wherein the diameter of the lens of the second lens unit closest to the reflective member is set to be larger than the inner diameter of the third diaphragm so that a portion of the light beam incident on the lens is prevented from being reflected from the outer periphery of the lens.

5. A camera comprising:

a first lens unit, formed of a plurality of lenses, on which a light beam is incident from a subject, a reflective member for reflecting a light beam, which has come from the subject and has been transmitted through the first lens unit, in a direction substantially perpendicular to the optical axis of the first lens unit, a first diaphragm member which is arranged on a surface of a lens of the first lens unit closest to the reflective member with the surface of the lens facing the reflective member, and which blocks unwanted rays of light other than the light beam that contributes to the forming of the image of the subject on an image-forming surface, a second lens unit, formed of a plurality of lenses, on which the light beam reflected from the reflective member is incident, and at least either one of a second diaphragm member or an unwanted ray-of-light reflection prevention member, wherein the second diaphragm member is arranged between the first lens unit and the second lens unit, and blocks unwanted rays of light that travel outside the outermost periphery at which the light beam forming the subject image traveling from the first lens unit to the reflective member intersects the light beam forming the subject image traveling from the reflective member to the second lens unit, and the unwanted ray-of-light reflection prevention member is arranged on the reflective member to prevent rays of light from being reflected from a region thereof other than the region thereof on which the light beam forming the subject image is incident.

6. A camera comprising:

a first lens unit, formed of a plurality of lenses, on which a light beam is incident from a subject, a reflective member for reflecting a light beam, which has come from the subject and has been transmitted through the first lens unit, in a direction substantially perpendicular to the optical axis of the first lens unit, a first diaphragm member which is arranged on a surface of a lens of the first lens unit closest to the reflective member with the surface of the lens facing the reflective member, and which blocks unwanted rays of light other than the light beam that contributes to the forming of the image of the subject on an image formation surface, a second lens unit, formed of a plurality of lenses, on which the light beam reflected from the reflective member is incident, a second diaphragm member which is arranged between the first lens unit and the second lens unit, and blocks unwanted rays of light that travel outside the outermost periphery at which the light beam forming the subject image traveling from the first lens unit to the reflective member intersects the light beam forming the subject image traveling from the reflective member to the second lens unit, and an unwanted ray-of-light reflection prevention member which is arranged on the reflective member to prevent rays of light from being reflected from a region thereof other than the region thereof on which the light beam forming the subject image is incident.

* * * * *